United States Patent [19]

Sugimura et al.

[11] Patent Number: 5,537,577
[45] Date of Patent: Jul. 16, 1996

[54] INTERLEAVED MEMORY WHEREIN PLURAL MEMORY MEANS COMPRISING PLURAL BANKS OUTPUT DATA SIMULTANEOUSLY WHILE A CONTROL UNIT SEQUENCES THE ADDRESSES IN ASCENDING AND DESCENDING DIRECTIONS

[75] Inventors: Toshio Sugimura, Kadoma; Katsuhiko Ueda, Sakai; Minoru Okamoto, Osaka; Toshihiro Ishikawa, Yokohama; Mikako Yasutome, Moriguchi, all of Japan

[73] Assignee: Matsushita Electric Industrial Co., Ltd., Osaka, Japan

[21] Appl. No.: 58,530

[22] Filed: May 6, 1993

[30] Foreign Application Priority Data

May 11, 1992 [JP] Japan ................................. 4-117580

[51] Int. Cl.$^6$ ............................................ G06F 12/00
[52] U.S. Cl. ................... 395/484; 364/246.4; 364/251; 364/251.1; 364/DIG. 1; 364/960.6; 364/964.33; 364/966.3; 364/DIG. 2; 395/421.09; 395/454; 395/477
[58] Field of Search ........................ 364/246.4, 966.3, 364/251, 251.1, 251.2; 395/421.09, 454, 477, 484

[56] References Cited

U.S. PATENT DOCUMENTS

| | | | |
|---|---|---|---|
| 4,817,054 | 3/1989 | Banerjee et al. | 365/189 |
| 4,903,197 | 2/1990 | Wallace et al. | 395/425 |
| 5,016,226 | 5/1991 | Hiwada et al. | 365/233 |
| 5,261,068 | 11/1993 | Gaskins et al. | 395/425 |
| 5,303,389 | 4/1994 | Hoshino et al. | 395/425 |

FOREIGN PATENT DOCUMENTS

| | | |
|---|---|---|
| 0384620 | 2/1990 | European Pat. Off. . |
| 1-286056 | 11/1989 | Japan . |
| 3-248242 | 11/1991 | Japan . |

OTHER PUBLICATIONS

Handbook of Electric Data Transmission, pp. 1667–1668 (with partial translation), 1988.
Proceedings Of The Conference Of The 1989 International Conference On Parallel Processing: vol. 1 Architecture Aug. 8, 1989, Pennsylvania, USA, pp. 242–246, Rau et al.
Proceedings 1988 International Conference On Computer Design: VSLI In Computers & Processors, Oct. 3, 1988, New York, USA, pp. 586–589, T. A. Misko.

*Primary Examiner*—Tod R. Swann
*Assistant Examiner*—Frank J. Asta
*Attorney, Agent, or Firm*—Price, Gess & Ubell

[57] ABSTRACT

An interleaving memory system having a first memory device including a 0-bank and a 1-bank for simultaneously outputting data at even-numbered addresses from the 0-bank and data at odd-numbered addresses from the 1-bank, a second memory device including a 0-bank and a 1-bank for simultaneously outputting data at even-numbered addresses from the 0-bank and data at odd-numbered addresses from the 1-bank, and a holding device for holding data from one of the banks of one of the first memory device and the second memory device to delay an output of the data for ½ cycle time for sequential addressing. A controller controls first and second selection devices wherein the 0-bank and the 1-bank are alternatively selected when data is outputted either in an ascending order of consecutive addresses from the even-numbered addresses in the first or second memory devices, or in a descending order of consecutive addresses from the odd-numbered addresses in the first or second memory devices. Also, the first holding device and a bank whose output is not held by the first holding device are alternatively selected when data is outputted either in a descending order of consecutive addresses from the even-numbered addresses in the first memory device, or in an ascending order of consecutive addresses from the odd-numbered addresses in the first memory device. The second holding device and a bank whose output is not held by the second holding device are similarly alternatively selected.

8 Claims, 38 Drawing Sheets

FIG. 2
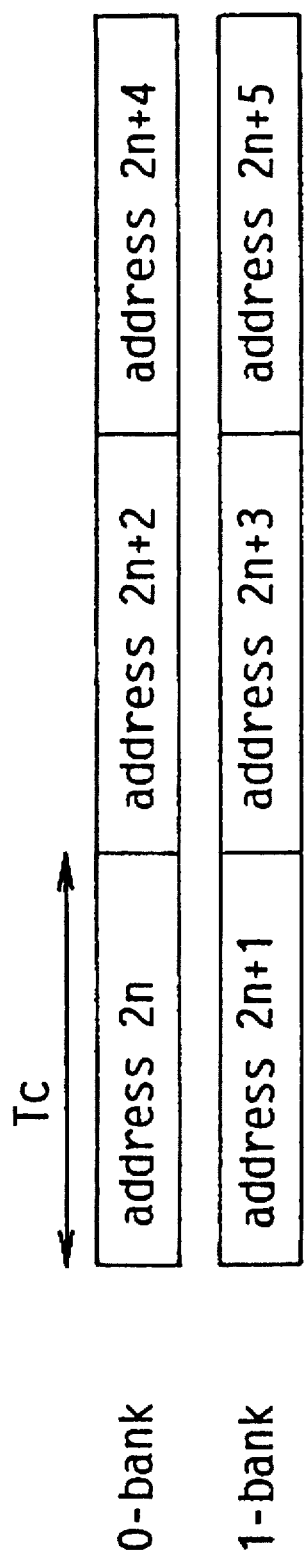
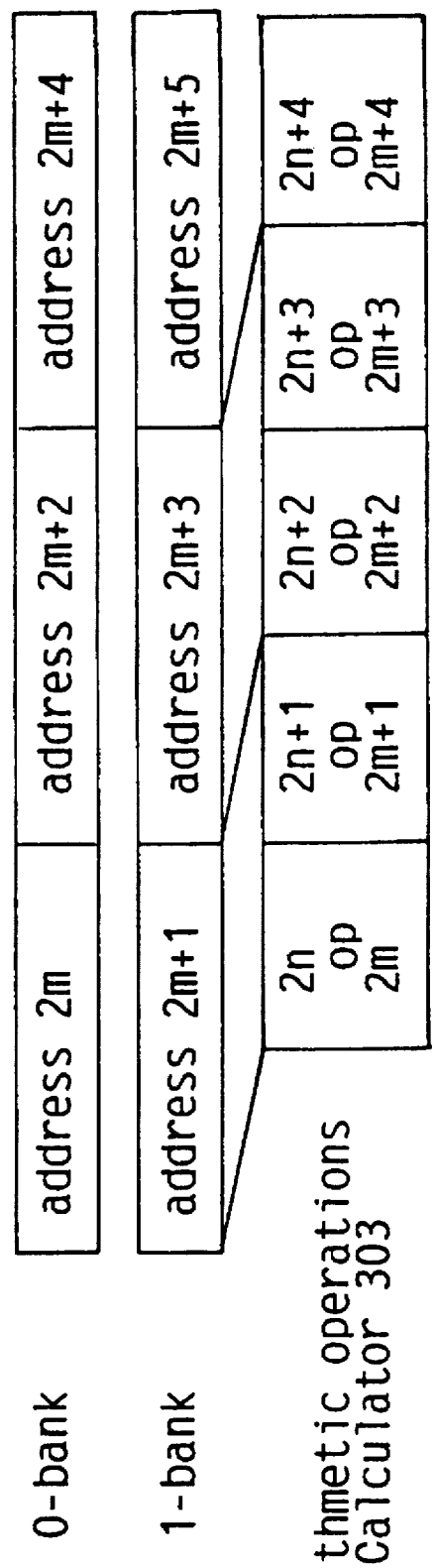

FIG. 3

Output data from First memory 301

0-bank: | address 2n | address 2n+2 | address 2n+4 |

1-bank: | address 2n+1 | address 2n+3 | address 2n+5 |

Output data from Second memory 302

0-bank: | address 2m | address 2m+2 | address 2m+4 |

1-bank: | address 2m+1 | address 2m+3 | address 2m+5 |

| 2n op 2m+1 | 2n+1 op None | 2n+2 op 2m+3 | 2n+3 op None | 2n+4 op 2m+5 | non-executable — non-executable

FIG. 7

| Case No. | 1-1 | | | | 1-2 | | | | 1-3 | | | | 1-4 | | | |
|---|---|---|---|---|---|---|---|---|---|---|---|---|---|---|---|---|
| Tc | First Tc | | Second Tc | | First Tc | | Second Tc | | First Tc | | Second Tc | | First Tc | | Second Tc | |
| Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | | | | | | | | | | | | | | | | |
| LSB of ADRS 113 | 0 | | | | 1 | | | | 0 | | | | 1 | | | |
| DIR 115 | 0 | | | | 1 | | | | 0 | | | | 1 | | | |
| LSB of ADRS 213 | 0 | | | | 1 | | | | 1 | | | | 0 | | | |
| DIR 215 | 0 | | | | 1 | | | | 1 | | | | 0 | | | |
| OUTPUT | | | | | | | | | | | | | | | | |
| MUX CNTL 104 | – | – | – | – | – | – | – | – | – | – | – | – | – | – | – | – |
| MUX CNTL 204 | – | – | – | – | – | – | – | – | – | – | – | – | – | – | – | – |
| MUX CNTL 107 | 2 | 1 | 2 | 1 | 1 | 2 | 2 | 2 | 2 | 1 | 2 | 1 | 1 | 2 | 2 | 1 |
| MUX CNTL 207 | 2 | 1 | 2 | 1 | 1 | 2 | 1 | 2 | 2 | 1 | 1 | 2 | 2 | 1 | 1 | 2 |
| BUS CNTL 109 | 0 | | 1 | | 0 | | 1 | | 0 | | 1 | | 0 | | 1 | |
| BUS CNTL 209 | 0 | | 2 | | 0 | | 2 | | 0 | | 2 | | 0 | | 2 | |
| Remarks | Fig.11 | | | | Fig.12 | | | | Fig.13 | | | | Fig.14 | | | |

FIG. 8

| Case No. | 2-1 | | | | 2-2 | | | | 2-3 | | | | 2-4 | | | |
|---|---|---|---|---|---|---|---|---|---|---|---|---|---|---|---|---|
| Tc | First Tc | | Second Tc | | First Tc | | Second Tc | | First Tc | | Second Tc | | First Tc | | Second Tc | |
|  | φ1 | φ2 | φ1 | φ2 | φ1 | φ2 | φ1 | φ2 | φ1 | φ2 | φ1 | φ2 | φ1 | φ2 | φ1 | φ2 |
| INPUT | | | | | | | | | | | | | | | | |
| Clock | | | | | | | | | | | | | | | | |
| LSB of ADRS 113 | 1 | | | | 0 | | | | 1 | | | | 0 | | | |
| DIR 115 | 0 | | | | 1 | | | | 0 | | | | 1 | | | |
| LSB of ADRS 213 | 1 | | | | 0 | | | | 0 | | | | 1 | | | |
| DIR 215 | 0 | | | | 1 | | | | 1 | | | | 0 | | | |
| OUTPUT | | | | | | | | | | | | | | | | |
| MUX CNTL 104 | – | | | | – | | | | – | | | | – | | | |
| MUX CNTL 204 | – | | | | – | | | | – | | | | – | | | |
| MUX CNTL 107 | 2 | 1 | 1 | 2 | 1 | 1 | 2 | 2 | 2 | 1 | 1 | 2 | 1 | 2 | 2 | 1 |
| MUX CNTL 207 | 2 | 1 | 1 | 2 | 1 | 2 | 2 | 1 | 2 | 1 | 1 | 2 | 2 | 1 | 2 | 1 |
| BUS CNTL 109 | 0 | | 1 | | 0 | | 1 | | 0 | | 1 | | 0 | | 1 | |
| BUS CNTL 209 | 0 | | 2 | | 0 | | 2 | | 0 | | 2 | | 0 | | 2 | |
| Remarks | Fig.15 | | | | Fig.16 | | | | Fig.17 | | | | Fig.18 | | | |

FIG. 9

| Case No. | | 3-1 | | | | 3-2 | | | | 3-3 | | | | 3-4 | | | |
|---|---|---|---|---|---|---|---|---|---|---|---|---|---|---|---|---|---|
| | Tc | First Tc | | Second Tc | | First Tc | | Second Tc | | First Tc | | Second Tc | | First Tc | | Second Tc | |
| | | φ1 | φ2 | φ1 | φ2 | φ1 | φ2 | φ1 | φ2 | φ1 | φ2 | φ1 | φ2 | φ1 | φ2 | φ1 | φ2 |
| INPUT | Clock | | | | | | | | | | | | | | | | |
| | LSB of ADRS 113 | 0 | | | | | 1 | | | | 0 | | | | 1 | | |
| | DIR 115 | 0 | | | | | 1 | | | | 0 | | | | 1 | | |
| | LSB of ADRS 213 | 1 | | | | | 0 | | | | 0 | | | | 1 | | |
| | DIR 215 | 0 | | | | | 1 | | | | 1 | | | | 0 | | |
| OUTPUT | MUX CNTL 104 | 1 | | | | | 0 | | | | 1 | | | | 0 | | |
| | MUX CNTL 204 | - | | | | | - | | | | - | | | | - | | |
| | MUX CNTL 107 | 1 | 0 | 0 | 1 | 2 | 0 | 1 | 0 | 1 | 0 | 0 | 1 | 2 | 0 | 1 | 0 |
| | MUX CNTL 207 | 2 | 1 | 1 | 2 | 1 | 2 | 2 | 1 | 2 | 1 | 1 | 2 | 2 | 1 | 2 | 1 |
| | BUS CNTL 109 | 0 | | 1 | | 0 | | 1 | | 0 | | 1 | | 0 | | 1 | |
| | BUS CNTL 209 | 0 | | 2 | | 0 | | 2 | | 0 | | 2 | | 0 | | 2 | |
| | Remarks | Fig.19 | | | | Fig.20 | | | | Fig.21 | | | | Fig.22 | | | |

FIG. 10

| Case No. | | 4-1 | | | | 4-2 | | | | 4-3 | | | | 4-4 | | | |
|---|---|---|---|---|---|---|---|---|---|---|---|---|---|---|---|---|---|
| | Tc | First Tc | | Second Tc | | First Tc | | Second Tc | | First Tc | | Second Tc | | First Tc | | Second Tc | |
| | Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | LSB of ADRS 113 | | 1 | | | | 1 | | 0 | | 1 | | 1 | | 0 | | 0 |
| | DIR 115 | | 0 | | | | 0 | | 1 | | 0 | | 0 | | 1 | | 1 |
| | LSB of ADRS 213 | | 0 | | | | 0 | | 1 | | 1 | | 1 | | 0 | | 0 |
| | DIR 215 | | 0 | | | | 0 | | 1 | | 1 | | 1 | | 0 | | 0 |
| OUTPUT | MUX CNTL 104 | | - | | 1 | | - | | 0 | | - | | 0 | | - | | 1 |
| | MUX CNTL 204 | | 1 | | | | 0 | | 1 | | 0 | | 1 | | 1 | | 1 |
| | MUX CNTL 107 | 2 | 1 | 2 | 1 | 1 | 2 | 2 | 1 | 2 | 2 | 2 | 1 | 1 | 2 | 1 | 2 |
| | MUX CNTL 207 | 1 | 0 | 0 | 1 | 2 | 0 | 2 | 0 | 2 | 0 | 2 | 0 | 1 | 0 | 1 | 0 |
| | BUS CNTL 109 | 0 | | 0 | 1 | 0 | | 0 | 1 | 0 | | 0 | 1 | 0 | | 0 | 1 |
| | BUS CNTL 209 | 0 | | 0 | 2 | 0 | | 0 | 2 | 0 | | 0 | 2 | 0 | | 0 | 2 |
| Remarks | | Fig.23 | | | | Fig.24 | | | | Fig.25 | | | | Fig.26 | | | |

FIG. 27

| Case No. | | 5-1 | | | | 5-2 | | | | 5-3 | | | | 5-4 | | | |
|---|---|---|---|---|---|---|---|---|---|---|---|---|---|---|---|---|---|
| | Tc | First Tc | | Second Tc | | First Tc | | Second Tc | | First Tc | | Second Tc | | First Tc | | Second Tc | |
| | Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | LSB of ADRS 113 | 0 | | | | 1 | | | | 0 | | | | 1 | | | |
| | DIR 115 | 0 | | | | 1 | | | | 0 | | | | 1 | | | |
| | LSB of ADRS 213 | 0 | | | | 1 | | | | 1 | | | | 0 | | | |
| | DIR 215 | 0 | | | | 1 | | | | 1 | | | | 0 | | | |
| OUTPUT | MUX CNTL 119 | – | | | | – | | | | – | | | | – | | | |
| | MUX CNTL 122 | 0 | | | | 0 | | | | 0 | | | | 0 | | | |
| | MUX CNTL 222 | 0 | | | | 0 | | | | 0 | | | | 0 | | | |
| | MUX CNTL 117 | 2 | 1 | 2 | 1 | 1 | 2 | 1 | 2 | 2 | 1 | 2 | 1 | 1 | 2 | 1 | 2 |
| | MUX CNTL 217 | 2 | 1 | 2 | 1 | 2 | 1 | 2 | 1 | 1 | 2 | 1 | 2 | 2 | 1 | 2 | 1 |
| | BUS CNTL 109 | 0 | 1 | 0 | 1 | 0 | 1 | 0 | 1 | 0 | 1 | 0 | 1 | 0 | 1 | 0 | 1 |
| | BUS CNTL 209 | 0 | 2 | 0 | 2 | 0 | 2 | 0 | 2 | 0 | 2 | 0 | 2 | 0 | 2 | 0 | 2 |
| Remarks | | Fig. 11 | | | | Fig. 12 | | | | Fig. 13 | | | | Fig. 14 | | | |

FIG. 28

| Case No. | | 6-1 | | | | 6-2 | | | | 6-3 | | | | 6-4 | | | |
|---|---|---|---|---|---|---|---|---|---|---|---|---|---|---|---|---|---|
| | Tc | First Tc | | Second Tc | | First Tc | | Second Tc | | First Tc | | Second Tc | | First Tc | | Second Tc | |
| | Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | LSB of ADRS 113 | 1 | | | | 0 | | | | 1 | | | | 0 | | | |
| | DIR 115 | 0 | | | | 1 | | | | 0 | | | | 1 | | | | |
| | LSB of ADRS 213 | 1 | | | | 0 | | | | 0 | | | | 1 | | | | |
| | DIR 215 | 0 | | | | 1 | | | | 1 | | | | 0 | | | | |
| | MUX CNTL 119 | - | | | | - | | | | - | | | | - | | | | |
| | MUX CNTL 122 | 0 | | | | 0 | | | | 0 | | | | 0 | | | | |
| | MUX CNTL 222 | 0 | | | | 0 | | | | 0 | | | | 0 | | | | |
| OUTPUT | MUX CNTL 117 | 2 | 1 | 2 | 1 | 1 | 2 | 1 | 2 | 2 | 1 | 1 | 2 | 1 | 2 | 2 | 1 |
| | MUX CNTL 217 | 2 | 1 | 1 | 2 | 1 | 2 | 2 | 1 | 2 | 1 | 2 | 1 | 2 | 1 | 1 | 2 |
| | BUS CNTL 109 | 0 | | 0 | 1 | 0 | | 1 | | 0 | | 0 | 1 | 1 | | 0 | |
| | BUS CNTL 209 | 0 | | 0 | 2 | 0 | | 0 | 2 | 0 | | 0 | 2 | 0 | | 0 | 2 |
| Remarks | | Fig.15 | | | | Fig.16 | | | | Fig.17 | | | | Fig.18 | | | | |

FIG. 29

| Case No. | 7-1 | | | | 7-2 | | | | 7-3 | | | | 7-4 | | | |
|---|---|---|---|---|---|---|---|---|---|---|---|---|---|---|---|---|
| Tc | First Tc | | Second Tc | | First Tc | | Second Tc | | First Tc | | Second Tc | | First Tc | | Second Tc | |
| Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | | | | | | | | | | | | | | | | |
| LSB of ADRS 113 | 0 | | | | 1 | | | | 0 | | | | 1 | | | |
| DIR 115 | 0 | | | | 1 | | | | 0 | | | | 1 | | | |
| LSB of ADRS 213 | 1 | | | | 0 | | | | 0 | | | | 1 | | | |
| DIR 215 | 0 | | | | 1 | | | | 1 | | | | 0 | | | |
| MUX CNTL 119 | 0 | | | | 0 | | | | 0 | | | | 0 | | | |
| MUX CNTL 122 | 1 | | | | 1 | | | | 1 | | | | 1 | | | |
| OUTPUT | | | | | | | | | | | | | | | | |
| MUX CNTL 117 | 2 | 1 | 2 | 1 | 2 | 1 | 2 | 1 | 2 | 1 | 2 | 1 | 2 | 1 | 2 | 1 |
| MUX CNTL 217 | 2 | 1 | 2 | 1 | 2 | 1 | 2 | 1 | 2 | 1 | 2 | 1 | 2 | 1 | 2 | 1 |
| BUS CNTL 109 | 0 | | | 1 | 0 | | | 1 | 0 | | | 1 | 0 | | | 1 |
| BUS CNTL 209 | 0 | | | 2 | 0 | | | 2 | 0 | | | 2 | 0 | | | 2 |
| Remarks | Fig. 31 | | | | Fig. 32 | | | | Fig. 33 | | | | Fig. 34 | | | |

FIG. 30

| Case No. | | 8-1 | | | | 8-2 | | | | 8-3 | | | | 8-4 | | | |
|---|---|---|---|---|---|---|---|---|---|---|---|---|---|---|---|---|---|
| | Tc | First Tc | | Second Tc | | First Tc | | Second Tc | | First Tc | | Second Tc | | First Tc | | Second Tc | |
| | Clock | φ1 | φ2 | φ1 | φ2 | φ1 | φ2 | φ1 | φ2 | φ1 | φ2 | φ1 | φ2 | φ1 | φ2 | φ1 | φ2 |
| INPUT | LSB of ADRS 113 | 1 | | | | 0 | | | | 1 | | | | 0 | | | |
| | DIR 115 | 0 | | | | 1 | | | | 0 | | | | 1 | | | |
| | LSB of ADRS 213 | 0 | | | | 1 | | | | 1 | | | | 0 | | | |
| | DIR 215 | 0 | | | | 1 | | | | 1 | | | | 0 | | | |
| | MUX CNTL 119 | 1 | | | | 1 | | | | 1 | | | | 1 | | | |
| | MUX CNTL 122 | 0 | | | | 0 | | | | 0 | | | | 0 | | | |
| | MUX CNTL 222 | 1 | | | | 1 | | | | 1 | | | | 1 | | | |
| OUTPUT | MUX CNTL 117 | 2 | 1 | 1 | 2 | 1 | 2 | 2 | 1 | 2 | 1 | 1 | 2 | 1 | 2 | 2 | 1 |
| | MUX CNTL 217 | 2 | 1 | 2 | 1 | 1 | 2 | 1 | 2 | 2 | 1 | 2 | 1 | 2 | 1 | 2 | 1 |
| | BUS CNTL 109 | 0 | | 1 | | 0 | | 1 | | 0 | | 1 | | 0 | | 1 | |
| | BUS CNTL 209 | 0 | | 2 | | 0 | | 2 | | 0 | | 2 | | 0 | | 2 | |
| Remarks | | Fig.35 | | | | Fig.36 | | | | Fig.37 | | | | Fig.38 | | | |

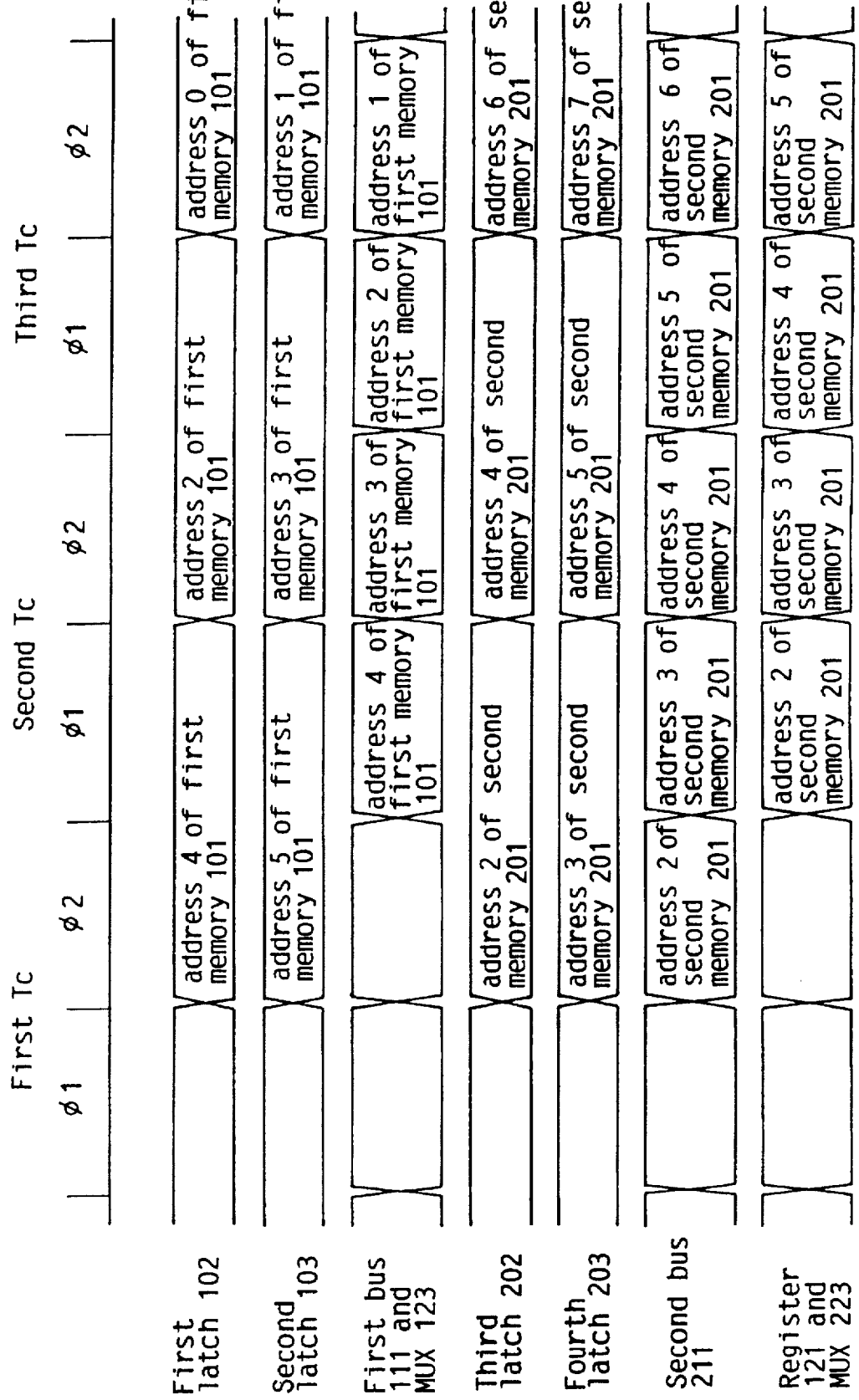

INTERLEAVED MEMORY WHEREIN PLURAL MEMORY MEANS COMPRISING PLURAL BANKS OUTPUT DATA SIMULTANEOUSLY WHILE A CONTROL UNIT SEQUENCES THE ADDRESSES IN ASCENDING AND DESCENDING DIRECTIONS

BACKGROUND OF THE INVENTION (1) Field of the Invention

The present invention relates to an interleaving memory which enables a high-speed-data-output.

(2) Description of the Related Arts

A high-speed data processing such that meets today's need necessitates a high-speed-memory-readout which is by no means easy to realize; for it unavoidably takes a certain time, or a cycle time (Tc) for memory access.

Given these circumstances, a method called interleaving was proposed. A memory employing this method, a so-called interleaving memory, consists of n data banks so that the access width thereof becomes n times as wide as that of a data bus to reduce Tc to Tc/n, thereby increasing the memory-readout speed for sequential addressing [for further information, see "Handbook of Electric Data Transmission", page 1667, 1988, Ohm-sha].

Depicted in FIG. 1 are an interleaving memory for 2-way and a calculator. The interleaving memory comprises a first memory 301 and a second memory 302, each consisting of a 0-bank and a 1-bank which store data at even-numbered addresses and odd-numbered addresses respectively. A calculator 303 carries out arithmetic logic operations (hereinafter, simply referred to as arithmetic operations) of data inputted thereto from the first memory 301 by way of a first bus 304, and from the second memory 302 by way of a second bus 305.

With the first memory 301, data are read out from the 0-bank and 1-bank in the same Tc's, and inputted into the first bus 304 sequentially. For example, when address $2n$ is assigned as a starting address, data at address $2n$ and the following address $2n+1$ are read out in the same Tc; the former are inputted into the first bus 304, and the latter are done so immediately without being read out when address $2n+1$ is assigned subsequently, thereby reducing Tc and hence the memory-readout time by half. With the second memory 302, data are read out and inputted into the second bus 305 synchronously with the first memory 301 in the same manner. As a result, data at contiguous addresses are steadily inputted from each memory into the calculator 303 twice as fast as non-interleaving memories, the illustration of which is shown in FIG. 2.

Data at even-numbered addresses—$2n$, $2n+2$, $2n+4$, . . . —are steadily read out from the 0-bank of the first memory 301, while those at odd-numbered addresses—$2n+1$, $2n+3$, $2n+5$, . . . —from the 1-bank. Thus, the addresses of data read out in the same Tc's are: ($2n$, $2n+1$), ($2n+2$, $2n+3$), ($2n+4$, $2n+5$), ($2n+6$, $2n+7$), ($2n+8$, $2n+9$), . . .

Synchronously, data at even-numbered addresses—$2m$, $2m+2$, $2m+4$, . . . —are steadily read out from the 0-bank of the second memory 302, while those at odd-numbered addresses $2m+1$, $2m+3$, $2m+5$, . . . —from the 1-bank. Thus, the addresses of data read out in the same Tc's are : ($2m$, $2m+1$), ($2m+2$, $2m+3$), ($2m+4$, $2m+5$), ($2m+6$, $2m+7$), ($2m+8$, $2m+9$), . . .

As previously explained, these data are inputted into the calculator 303 consecutively by way of the first bus 304 and second bus 305 in half a time. Thus, the calculator 303 carries out arithmetic operations of data at addressess: ($2n$, $2m$), ($2n+1$, $2m+1$), ($2n+2$, $2m+2$), ($2n+3$, $2m+3$), . . . twice as fast as the non-interleaving memories. In other words, the interleaving memory makes it possible to increase the memory-readout speed hence data processing speed twice as fast.

However, interleaving is effective only for arithmetic operations of data read out from each memory in the same Tc's; otherwise the effects are eliminated as will be explained with referring to FIG. 3.

The data are inputted into the calculator 303 consecutively in the same manner as explained in the above, but the calculator 303 carries out arithmetic operations of data at addresses: ($2n$, $2m+1$), ($2n+1$, $2m+2$), ($2n+2$, $2m+3$), . . . Obviously, not all the data at addresses in brackets are read out in the same Tc's. For example, data at addresses ($2n$, $2m+1$) are read out in the same Tc, but are not the data at the following addresses ($2n+1$, $2m+2$); data at address $2m+2$ are read out one Tc behind those at address $2n+1$. Therefore, in every other operation, data from the second memory 302 have not been read out when the calculator 303 is to carry out the arithmetic operation. For this reason, calculator 303 can carry out only one arithmetic operation per Tc as do the non-interleaving memories, thereby utterly eliminating the effects of interleaving.

Given these circumstances, an interleaving memory such that can increase the memory-readout speed hence data processing speed even when data used for the arithmetic operations are read out in different Tc's has been sought after.

SUMMARY OF THE INVENTION

Accordingly, the present invention has an object to provide an interleaving memory which can increase the data processing speed even when data used for the arithmetic operations are read out in different Tc's.

The above object is fulfilled by an interleaving memory comprising a first memory device consisting of n banks for outputting n data simultaneously, a second memory device consisting of n banks for outputting n data simultaneously, and a holding device for holding n−1 data from n−1 banks of one of the first memory device and the second memory device to delay an output of the data for one cycle time for sequential addressing.

The above object is also fulfilled by an interleaving memory comprising a first memory device consisting of a 0-bank and a 1-bank for simultaneously outputting data at even-numbered addresses from the 0-bank and data at odd-numbered addresses from the 1-bank, a second memory device consisting of a 0-bank and a 1-bank for simultaneously outputting data at even-numbered addresses from the 0-bank and data at odd-numbered addresses from the 1-bank, and a holding device for holding data from one of the banks of one of the first memory device and the second memory device to delay an output. of the data for ½ cycle time for sequential addressing.

Further, the above object is fulfilled by an interleaving memory comprising a first memory device consisting of a 0-bank and a 1-bank for simultaneously outputting data at even-numbered addresses from the 0-bank and data at odd-numbered addresses from the 1-bank, a first selecting device for selecting data from one of the 0-bank and the 1-bank of the first memory device, second memory device consisting of a 0-bank and a 1-bank for simultaneously outputting data at even-numbered addresses from the 0-bank and data at odd-numbered addresses from the 1-bank, a second selecting device for selecting data from one of the 0-bank and the 1-bank of the second memory device, a holding device for holding data from one of the 0-bank and the 1-bank of the first memory device and the 0-bank and the 1-bank of the second memory device to delay an output of the data for ½ cycle time, a third selecting device for selecting data from two of the first selecting device, the second selecting device, and the holding device, and a controlling device for controlling the third selecting device to output data of the first memory device in one of an ascending direction and a descending direction, and to output data of the second memory device in one of the ascending direction and the descending direction.

According to the above construction, even when data used for the arithmetic operations are read out in different Tc's, holding device can hold data from either bank of either memory to match the data-output timing thereof with that of the data read out in a later Tc. As a result, the interleaving memory of the present invention, unlike conventional ones, enables a calculator to do the arithmetic operations twice as fast as the non-interleaving memories for sequential addressing regardless of data-readout timing.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings:

FIG. 2 is a view showing data-output timing thereof;

FIG. 3 is a view showing another data-output timing thereof;

FIG. 7 is a view showing the control unit 114's input/output signals in Cases 1-1 to 1-4 of Embodiment I;

FIG. 8 is a view showing the control unit 114's input/output signals in Cases 2-1 to 2-4 of Embodiment I;

FIG. 9 is a view showing the control unit 114's input/output signals in Cases 3-1 to 3-4 of Embodiment I;

FIG. 10 is a view showing the control unit 114's input/output signals in Cases 4-1 to 4-4 of Embodiment I;

FIG. 27 is a view of the control unit 124's input/output signals in Cases 5-1 to 5-4 of Embodiment II;

FIG. 28 is a view of the control unit 124's input/output signals in Cases 6-1 to 6-4 of Embodiment II;

FIG. 29 is a view of the control unit 124's input/output signals in Cases 7-1 to 7-4 of Embodiment II;

FIG. 30 is a view of the control unit 124's input/output signals in Cases 8-1 to 8-4 of Embodiment II;

FIG. 38 is a view showing data-output timing in Case 8-4 of Embodiment II.

DESCRIPTION OF THE PREFERRED EMBODIMENTS

(EMBODIMENT I)

Figure 1:
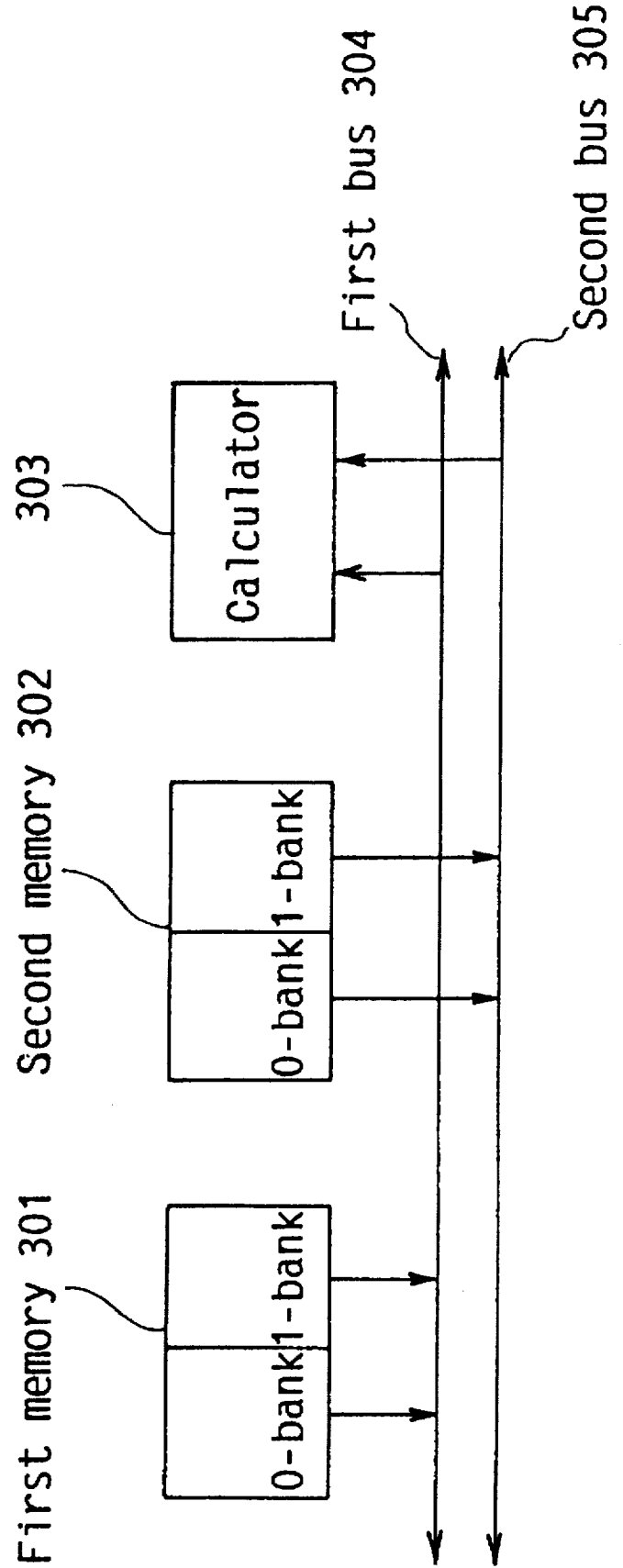
FIG. 1 is a diagram of a conventional interleaving memory.
Figure 4:
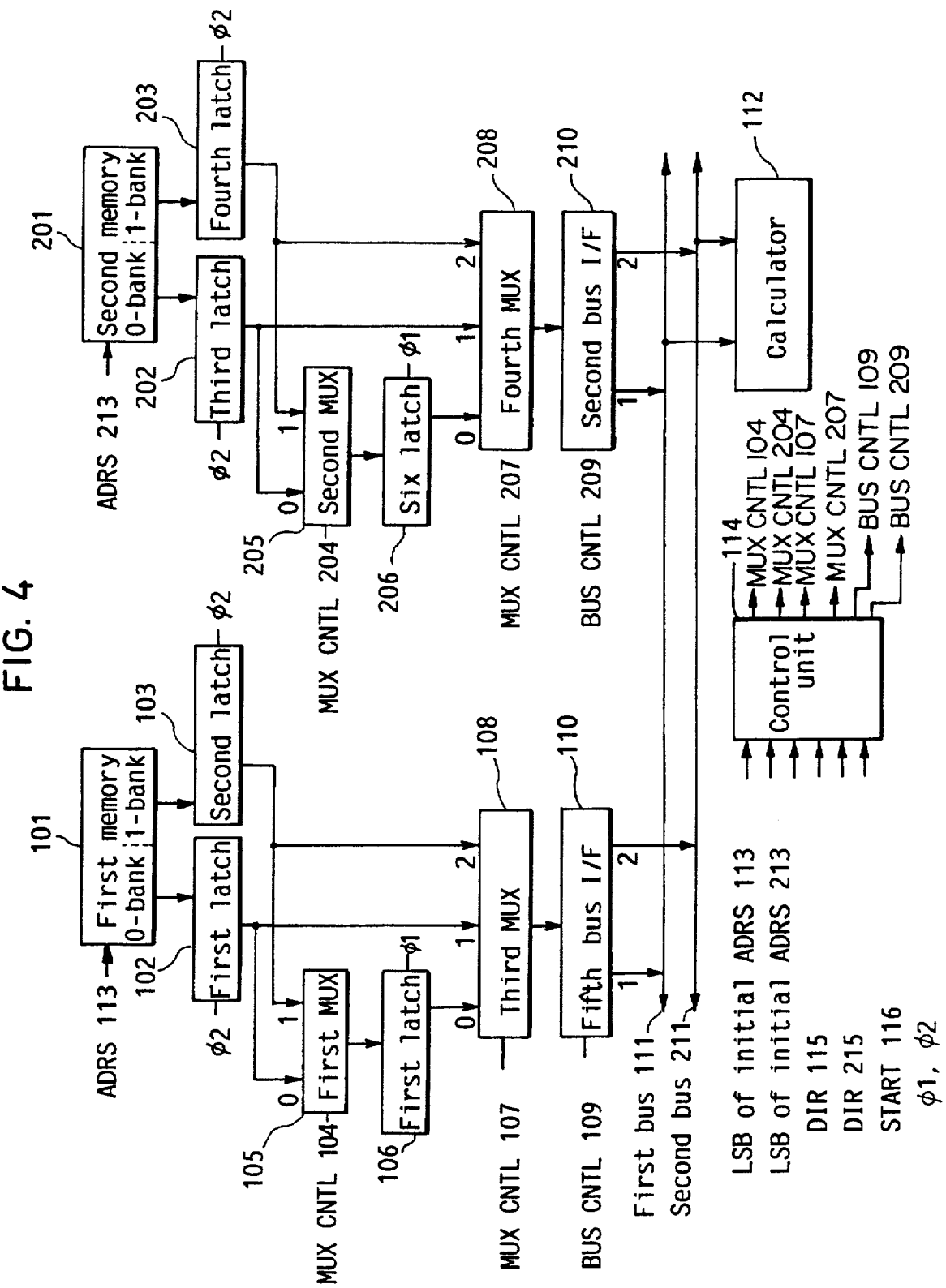
FIG. 4 is a diagram of an interleaving memory in accordance with Embodiment I of the present invention.

The construction of an interleaving memory for 2-way in accordance with Embodiment I is described with referring to FIG. 4. The explanation of a calculator 112 and a control unit 114 is omitted, as the construction thereof is a well-known art.

The interleaving memory comprises the following components: a first memory 101 and a second memory 201, each of which consisting of a 0-bank and a 1-bank for storing data at even-numbered addresses and odd-numbered addresses respectively; a first latch 102 which latches data from the 0-bank of the first memory 101 at the high level of CLK 2; a second latch 103 which latches data from the 1-bank of the first memory 101 at the high level of CLK 2; a third latch 202 which latches data from the 0-bank of the second memory 201 at the high level of CLK 2; a fourth latch 203 which latches data from the 1-bank of the second memory 201 at the high level of CLK 2; a first multiplexer 105(MUX 105) which selects data from either the first latch 102 or second latch 103; a fifth latch 106 which latches data from MUX 105 at the high level of CLK 1; a second multiplexer 205(MUX 205) which selects data from either the third latch 202 or fourth latch 203; a sixth latch 206 which latches data from MUX 205 at the high level of CLK 1; a third multiplexer 108(MUX 108) which selects data from either the fifth latch 106, first latch 102, or second latch 103; a fourth multiplexer 208(MUX 208) which selects data from either the sixth latch 206, third latch 202, or fourth latch 203; a first bus output-unit 110(B__I/F 110) which sends data to either a first bus 111 or a second bus 211, or to neither of them; a second bus output-unit 210(B__I/F 210) which sends data to either the first bus 111 or second bus 211, or to neither of them; the first bus 111 which sends data from B__I/F 110 and B__I/F 210 to the calculator 112; and the second bus 211 which sends data from B__I/F 110 and B__I/F 210 to the calculator 112. The calculator 112 carries out arithmetic operations of the data inputted thereto from the first bus 111 and second bus 211. All these components are controlled by the control unit 114 with signals inputted thereinto and outputted therefrom as set forth in Table 1.

TABLE 1

INPUT/OUTPUT SIGNALS OF CONTROL UNIT 114

OUTPUT

| | |
|---|---|
| 1 | First multiplexer controlling signal 104 (MUX CNTL 104) |
| 2 | Second multiplexer controlling signal 204 (MUX CNTL 204) |
| 3 | Third multiplexer controlling signal 107 (MUX CNTL 107) |
| 4 | Fourth multiplexer controlling signal 207 (MUX CNTL 207) |
| 5 | First bus output-unit controlling signal 109 (BUS CNTL 109) |
| 6 | Second bus output-unit controlling signal 209 (BUS CNTL 209) |

INPUT

| | |
|---|---|
| 1 | LSB(Least Significant Bit) of initial ADRS 113 |
| 2 | LSB of initial ADRS 213 |
| 3 | First direction modifying signal 115(DIR 115) |
| 4 | Second direction modifying signal 215(DIR 215) |
| 5 | Operation starting signal 116(START 116) |
| 6 | Clocks φ1, φ2 (CLK 1, CLK2) |

The control unit 114 controls the components with these output signals as follows:

1) MUX CNTL 104 controls MUX 105—when it has 0, MUX 105 selects data from the first latch 102, and those from the second latch 103 when 1,
2) MUX CNTL 204 controls MUX 205—when it has 0, MUX 205 selects data from the third latch 202, and those from the fourth latch 203 when 1,
3) MUX CNTL 107 controls MUX 108—when it has 0, MUX 108 selects data from the fifth latch 106, those from the first latch 102 when 1, and those from the second latch 103 when 2,
4) MUX CNTL 207 controls MUX 208—when it has 0, MUX 208 selects data from the six latch 206, those from the third latch 202 when 1, and those from the fourth latch 203 when 2,
5) BUS CNTL 109 controls B__I/F 110—when it has 0, B__I/F 110 outputs data to neither buses, to the first bus 111 when 1, and to the second bus 211 when 2,
6) BUS CNTL 209 controls B__I/F 210—when it has 0, B__I/F 210 outputs data to neither buses, to the first bus 111 when 1, and to the second bus 211 when 2.

Figure 6:
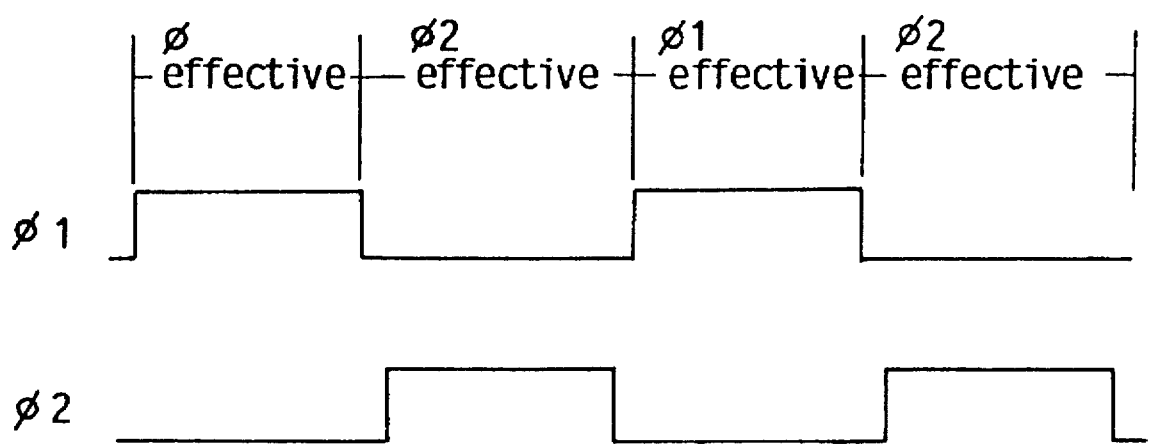
FIG. 6 is an illustration of clock signals φ1 and φ2 used in Embodiments I and II.

As well, the control unit 114 controls the components with these input signals as follows:

1) LSB of the initial ADRS 113, or ADRS 113 accessed to the first memory 101 when the interleaving memory starts its operation; when it has 0, ADRS 113 accesses to the 0-bank thereof, and to the 1-bank when 1,
2) LSB of the initial ADRS 213, or ADRS 213 accessed to the second memory 201 when the interleaving memory starts its operation; when it has 0, ADRS 213 accesses to the 0-bank thereof, and to the 1-bank when 1,
3) DIR 115 increments ADRS 113 when it has 0 and decrements when 1,
4) DIR 215 increments ADRS 213 when it has 0 and decrements when 1,
5) START 116 starts the arithmetic operations of the calculator 112 when it turns to 1,
6) CLK 1 and CLK2 regulate data-output timing of the first memory 101 and second memory 201; they effect other signals at their high levels, and have reverse phases as is shown in FIG. 6; one cycle thereof corresponds to one TC.

With the interleaving memory constructed as above, how data are read out and inputted sequentially into the calculator 112 is explained by showing details of control unit 114's input and output signals with referring to FIGS. 7–10, and the data-output timing with FIGS. 11–26. For explanation's convenience, the arithmetic operations are divided into four cases by data-output timing, and each case is further divided into 4 sub-cases by directions of address sequence and the number of starting addresses. More precisely, data are read out in the same Tc in Case 1, and data are read out in the same Tc as well, but data at one of the addresses accessed in the first Tc in each memory are not inputted into the calculator 112 in Case 2. Data from the second memory 201 are read out one Tc behind in Case 3, and those from the first memory 101 are read out one Tc behind in Case 4. Each case is sub-divided by whether the addresses are to be incremented or decremented, and the starting addresses have an even-number or an odd-number. Particulars of all these 16 sub-cases are set forth as in Table 2.

TABLE 2

| | Starting Address | | Modifying Direction | | |
|---|---|---|---|---|---|
| Case # | Memory 101 | Memory 201 | ADRS 113 | ADRS 213 | Read out timing |
| 1 - 1 | 2 | 2 | + | + | Same Tc |
| - 2 | 5 | 5 | − | − | |
| - 3 | 2 | 5 | + | − | |
| - 4 | 5 | 2 | − | + | |
| 2 - 1 | 3 | 3 | + | + | Same Tc |
| - 2 | 4 | 4 | − | − | |
| - 3 | 3 | 4 | + | − | |
| - 4 | 4 | 3 | − | + | |
| 3 - 1 | 2 | 3 | + | + | Data fm 201 lag 1 Tc |
| - 2 | 5 | 4 | − | − | |
| - 3 | 2 | 4 | + | − | |
| - 4 | 5 | 3 | − | + | |
| 4 - 1 | 3 | 2 | + | + | Data fm 101 lag 1 Tc |
| - 2 | 4 | 5 | − | − | |
| - 3 | 3 | 5 | + | − | |
| - 4 | 4 | 2 | − | + | |

(+ : increment  − : decrement)

(CASE 1)

The calculator 112 carries out the arithmetic operations of data read out in the same Tc from each memory in this case.

Figure 11:
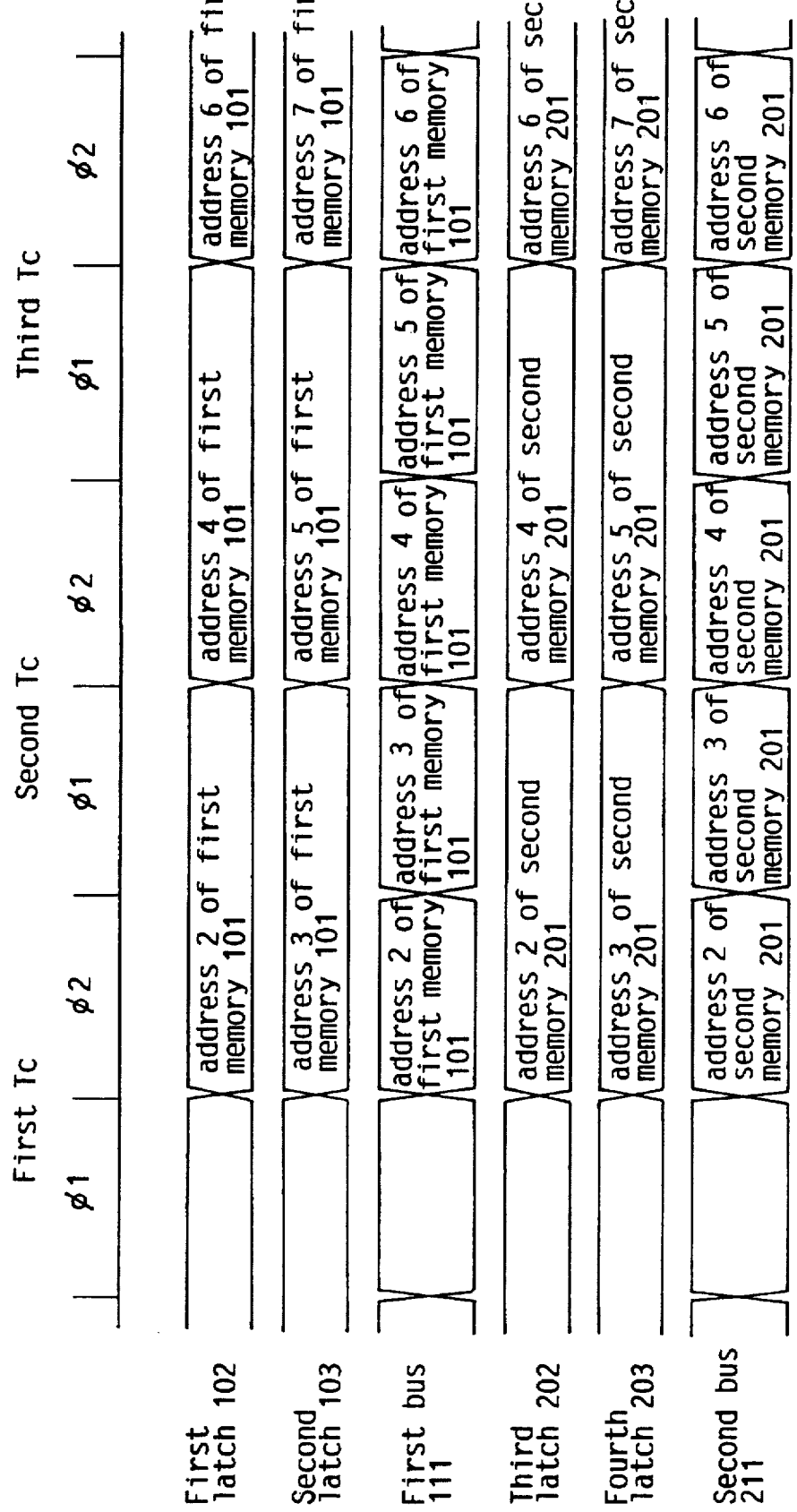
FIG. 11 is a view showing data-output timing in Case 1-1 of Embodiment I and Case 5-1 of Embodiment II.

(1-1) This is the case when the starting addresses of both the memories have even-numbers, and both of ADRS 113 and ADRS 213 are incremented by 2 at the rising edge of CLK 1 by an unillustrated addressing unit. Particulars of the input/output signals and data-output timing hereof are shown in FIGS. 7 and 11 respectively.

Let the starting addresses of both the memories be address 2's, then the initial ADRS 113 and ADRS 213 have 2's with 0-LSB's. Thus, data at address 2's of the 0-banks and those at the following address 3's of the 1-banks of both the memories are read out in the first Tc. Then, at the timing of CLK 2 in the first Tc, data at address 2 and address 3 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB's of the initial ADRS 113 and ADRS 213 having 0's, and DIR 115 and DIR 215 having 0's. Then, the control unit 114 outputs MUX CNTL 107 and MUX CNTL 207 having 2's at CLK 1, and 1's at CLK 2 in every Tc; BUS CNTL 109 having 0 at CLK 1 in the first Tc, and 1 at CLK 2 in the first Tc and afterwards; BUS CNTL 209 having 0 at CLK 1 in the first Tc, and 2 at CLK 2 in the first Tc and afterwards.

Under the control of the control unit 114 with these signals, data at address 2 of the first memory 101 are inputted into the first bus 111 by way of the first latch 102, MUX 108, and B__I/F 110, while those at address 2 of the second memory 201 into the second bus 211 by way of the third latch 202, MUX 208, and B__I/F 210 at CLK 2 in the first Tc.

On the other hand, data at address 3 of the first memory 101 are inputted into the first bus 111 by way of the second latch 103, MUX 108, and B__I/F 110, while those at address 3 of the second memory 201 into the second bus 211 by way of the fourth latch 203, MUX 208, and B__I/F 210 at CLK 1 in the second Tc.

In this way, data at even-numbered addresses of the first memory 101 are inputted into the first bus 111 and those at even-numbered addresses of the second memory 201 into the second bus 211 at CLK 2 in every Tc; data at odd-numbered addresses of the first memory 101 are inputted into the first bus 111 and those at odd-numbered addresses of the second memory 201 into the second bus 211 at CLK 1 in every Tc except the first Tc.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 12:
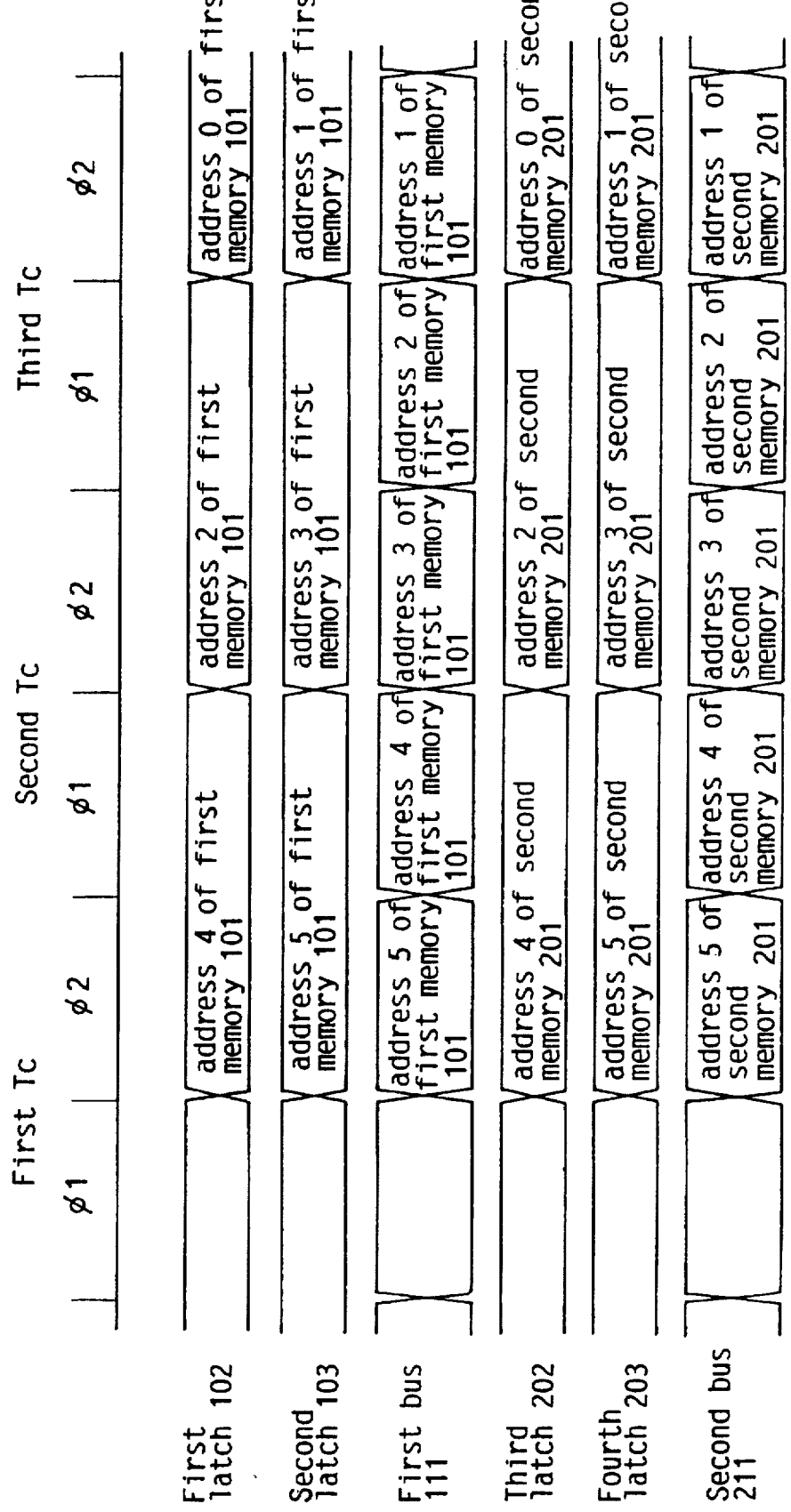
FIG. 12 is a view showing data-output timing in Case 1-2 of Embodiment I and Case 5-2 of Embodiment II.

(1-2) This is the case when the starting addresses of both the memories have odd-numbers, both of ADRS 113 and ADRS 213 are decremented by 2 at the rising edge of CLK 1 by the unillustrated addressing unit. Particulars of the input/output signals and data-output timing hereof are shown in FIGS. 7 and 12 respectively.

Let the starting addresses of both the memories be address 5's, then the initial ADRS 113 and ADRS 213 have 5's with 1-LSB's. Thus, data at address 5's of the 1-banks and those at the following address 4's of the 0-banks of both the memories are read out in the first Tc. Then, at the timing of CLK 2 in the first Tc, data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB's of the initial ADRS 113 and ADRS 213 having 1's, and DIR 115 and DIR 215 having 1's. Then, the control unit 114 outputs MUX CNTL 107 and MUX CNTL 207 having 1's at CLK 1, and 2's at CLK 2 in every Tc; BUS CNTL 109 having 0 at CLK 1 in the first Tc, and 1 at CLK 2 in the first Tc and afterwards; BUS CNTL 209 having 0 at CLK 1 in the first Tc, and 2 at CLK 2 in the first Tc and afterwards.

Under the control of the control unit 114 with these signals, data at address 5 of the first memory 101 are inputted into the first bus 111 by way of the second latch 103, MUX 108, and B__I/F 110, while those at address 5 of the second memory 201 into the second bus 211 by way of the fourth latch 203, MUX 208, and B__I/F 210 at CLK 2 in the first Tc.

On the other hand, data at address 4 of the first memory 101 are inputted into the first bus 111 by way of the first latch 102, MUX 108, and B__I/F 110, while those of the second memory 201 into the second bus 211 by way of the third latch 202, MUX 208, and B__I/F 210 at CLK 1 in the second Tc.

In this way, data at odd-numbered addresses of the first memory 101 are inputted into the first bus 111 and those at odd-numbered addresses of the second memory 201 into thesecond bus 211 at CLK 2 in every Tc; data at even-numbered addresses of the first memory 101 are inputted into the first bus 111 and those at even-numbered addresses of the second memory 201 into the second bus 211 at CLK 1 in every Tc except the first Tc.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 13:
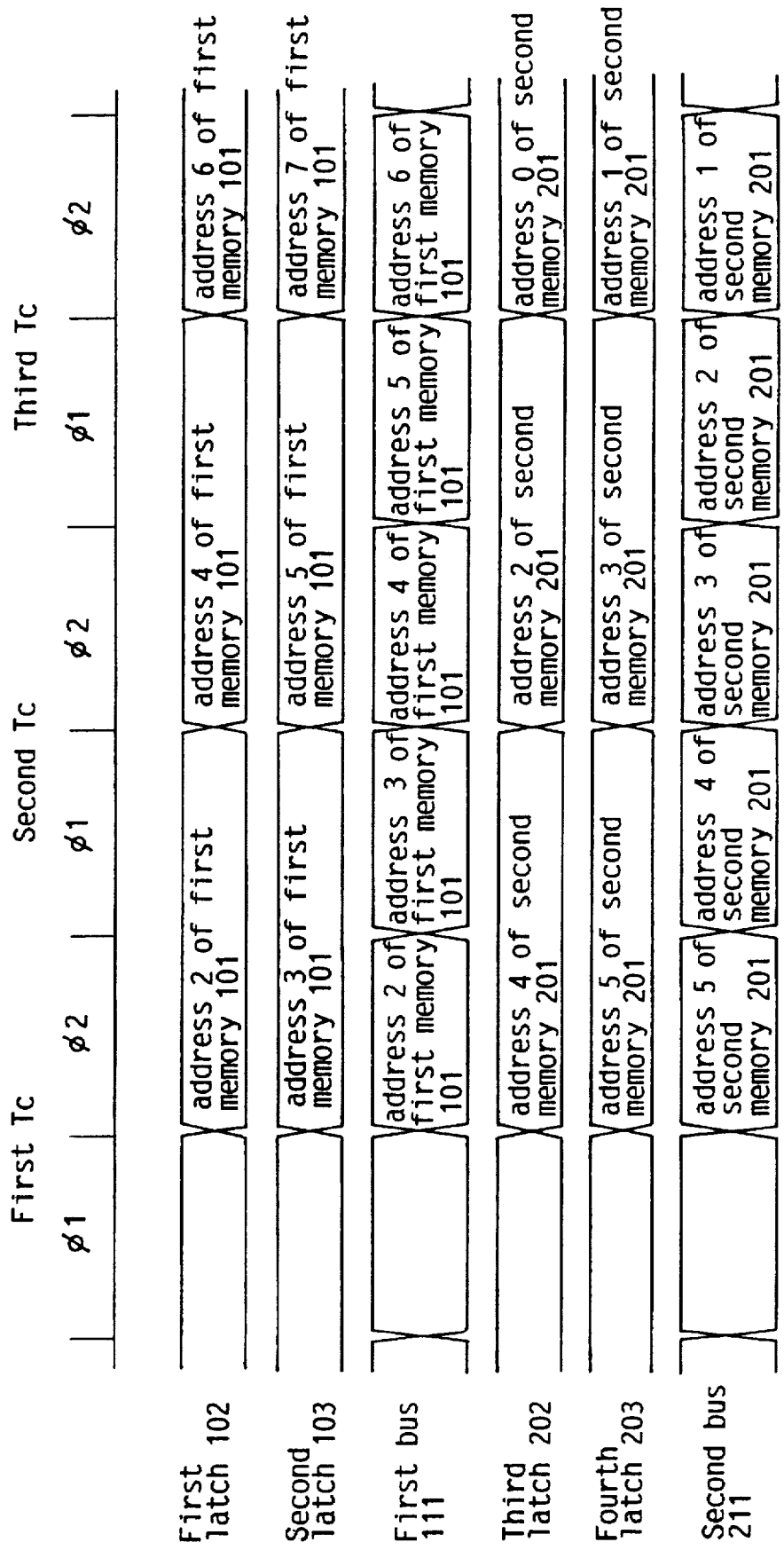
FIG. 13 is a view showing data-output timing in Case 1-3 of Embodiment I and Case 5-3 of Embodiment II.

(1-3) This is the case when the starting address of the first memory 101 has an even-number while that of the second memory 201 has an odd-number, and ADRS 113 is incremented by 2 while the initial ADRS 213 decremented by 2 at the rising edge of CLK 1 by the unillustrated addressing unit. Particulars of the input/output signals and data-output timing hereof are shown in FIGS. 7 and 13 respectively.

Let the starting address of the first memory 101 be address 2, and that of second memory 201 be address 5, then the initial ADRS 113 has 2 with 0-LSB and the initial ADRS 213 has 5 with 1-LSB. Thus, data at address 2 of the 0-bank of the first memory 101 and those at the address 5 of the 1-bank of the second memory 201, as well as those at the following address 3 of the 1-bank of the first memory 101 and those at the following address 4 of the 0-bank of the second memory 201 are read out in the first Tc. Then, at the timing of CLK 2 in the first Tc, data at address 2 and address 3 of the first memory 101 are latched by the first latch 102 and second latch 103 respectively, while those at address 4 and address 5 from the second memory 201 are done so by the third latch 202 and fourth latch 203 respectively.

In the meantime, START 116 turns to 1, and the control unit 114 receives LSB of the initial ADRS 113 having 0 and LSB of the initial ADRS 213 having 1, and DIR 115 having 0 and DIR 215 having 1. Then, the control unit 114 outputs MUX CNTL 107 having 2 and MUX CNTL 207 having 1 at CLK 1, and respectively 1 and 2 at CLK 2 in every Tc; BUS CNTL 109 having 0 at CLK 1 in the first Tc, and 1 at CLK 2 in the first Tc and afterwards; BUS CNTL 209 having 0 at CLK 1 in the first Tc, and 2 at CLK 2 in the first Tc and afterwards.

Under the control with these signals, data at address 2 of the first memory 101 are inputted into the first bus 111 by way of the first latch 102, MUX 108, and B_I/F 110, while those at address 5 of the second memory 201 into the second bus 211 by way of the fourth latch 203, MUX 208, and B_I/F 210 at CLK 2 in the first Tc.

On the other hand, data at address 3 of the first memory 101 are inputted into the first bus 111 by way of the second latch 103, MUX 108 and B_I/F 110, while those at address 4 of the second memory 201 into the second bus 211 by way of the third latch 202, MUX 208, and B_I/F 210 at CLK 1 in the second Tc.

In this way, data at even-numbered addresses of the first memory 101 are inputted into the first bus 111 and those at odd-numbered addresses of the second memory 201 into the second bus 211 at CLK 2 in every Tc; data at odd-numbered addresses of the first memory 101 are inputted into the first bus 111 and those at even-numbered addresses of the second memory 201 into the second bus 211 at CLK 1 in every Tc except the first Tc.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 14:
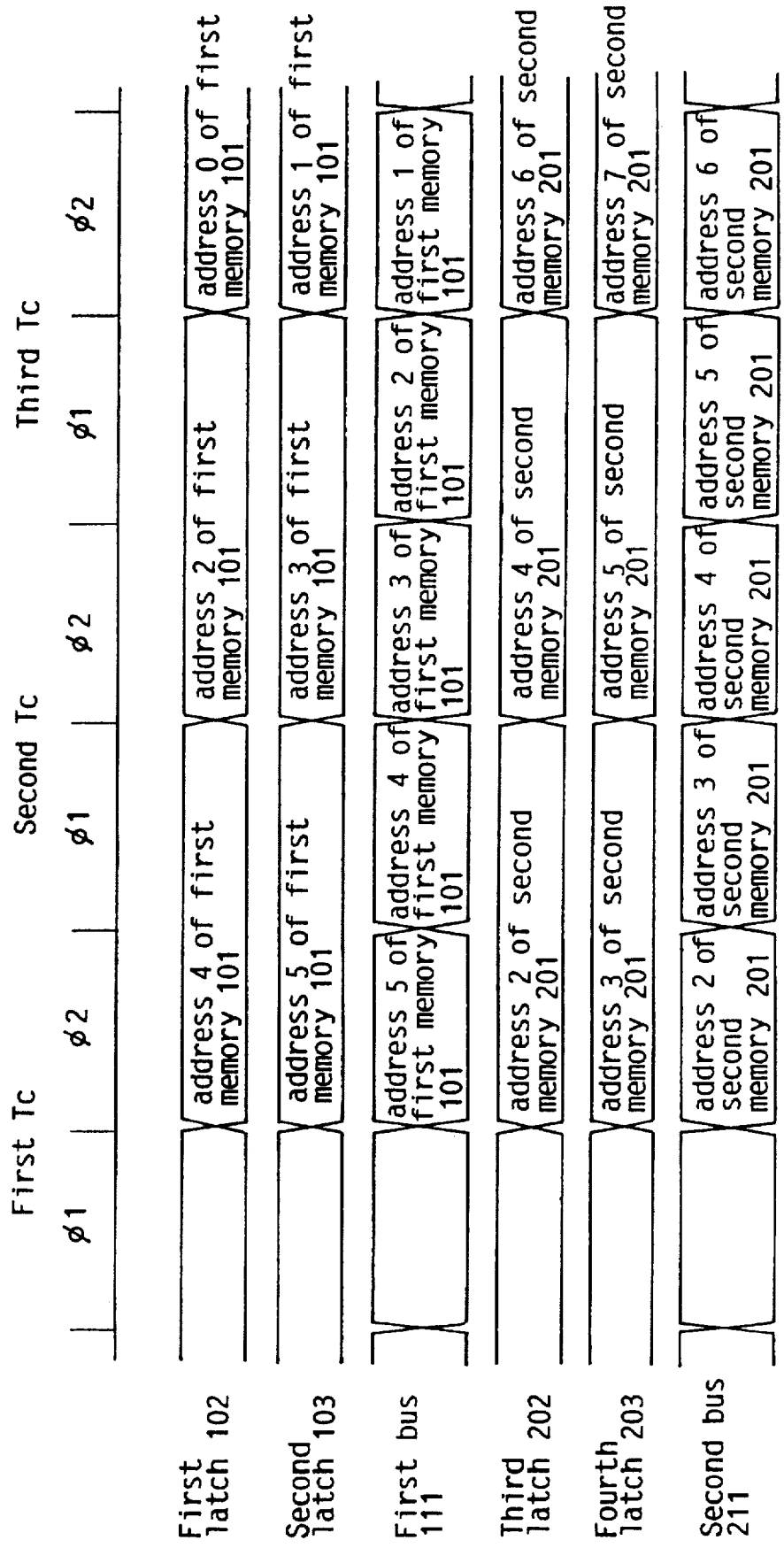
FIG. 14 is a view showing data-output timing in Case 1-4 of Embodiment I and Case 5-4 of Embodiment II.

(1-4) This is the case when the starting address of the first memory 101 has an odd-number while that of the second memory 201 has an even-number, and ADRS 113 is decremented while the initial ADRS 213 incremented by 2 at the rising edge of CLK 1 by the unillustrated addressing unit. Particulars of the input/output signals and data-output timing hereof are shown in FIGS. 7 and 14.

Let the starting address of the first memory 101 be address 5, and that of second memory 201 be address 2, then the initial ADRS 113 has 5 with 1-LSB and the initial ADRS 213 has 2 with 0-LSB. Thus, data at address 5 of the 1-bank of the first memory 101 and those at address 2 of the 0-bank of the second memory 201, as well as those at the following address 4 of the 0-bank of the first memory 101 and those at the following address 3 1of the 1-bank of the second memory 201 are read out in the first Tc. Then, at the timing of CLK 2 in the first Tc, the data at address 4 and address 5 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB of the initial ADRS 113 having 1 and LSB of the initial ADRS 213 having 0, and DIR 115 having 1 and DIR 215 having 0. Then, the control unit 114 outputs MUX CNTL 107 having 1 and MUX CNTL 207 having 2 at CLK 1, and respectively 2 and 1 at CLK 2 in every Tc; BUS CNTL 109 having 0 at CLK 1 in the first Tc, and 1 at CLK 2 in the first Tc and afterwards; BUS CNTL 209 having 0 at CLK 1 in the first Tc, and 2 at CLK 2 in the first Tc and afterwards.

Under the control of the control unit 114 with these signals, data at address 5 of the first memory 101 are inputted into the first bus 111 by way of the second latch 103, MUX 108, and B_I/F 110, while those at address 2 of the second memory 201 into the second bus 211 by way of the third latch 202, MUX 208, and B_I/F 210 at CLK 2 in the first Tc.

On the other hand, data at address 4 of the first memory 101 are inputted into the first bus 111 by way of the first latch 102, MUX 108, and B_I/F 110, while those at address 3 of the second memory 201 into the second bus 211 by way of the fourth latch 203, MUX 208, and B_I/F 210 at CLK 1 in the second Tc.

In this way, data at odd-numbered addresses of the first memory 101 are inputted into the first bus 111 and those at even-numbered addresses of the second memory 201 into the second bus 211 at CLK 2 in every Tc; data at the even-numbered addresses of the first memory 101 are inputted into the first bus 111 and those at the odd-numbered addresses of the second memory 201 into the second bus 211 at CLK 1 in every Tc except the first Tc.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

(Case 2)

The calculator 112 carries out the arithmetic operations of data read out in the same Tc from each memory, although the data at one of the addresses accessed in the first Tc in each memory are not inputted into the calculator 112.

Figure 15:
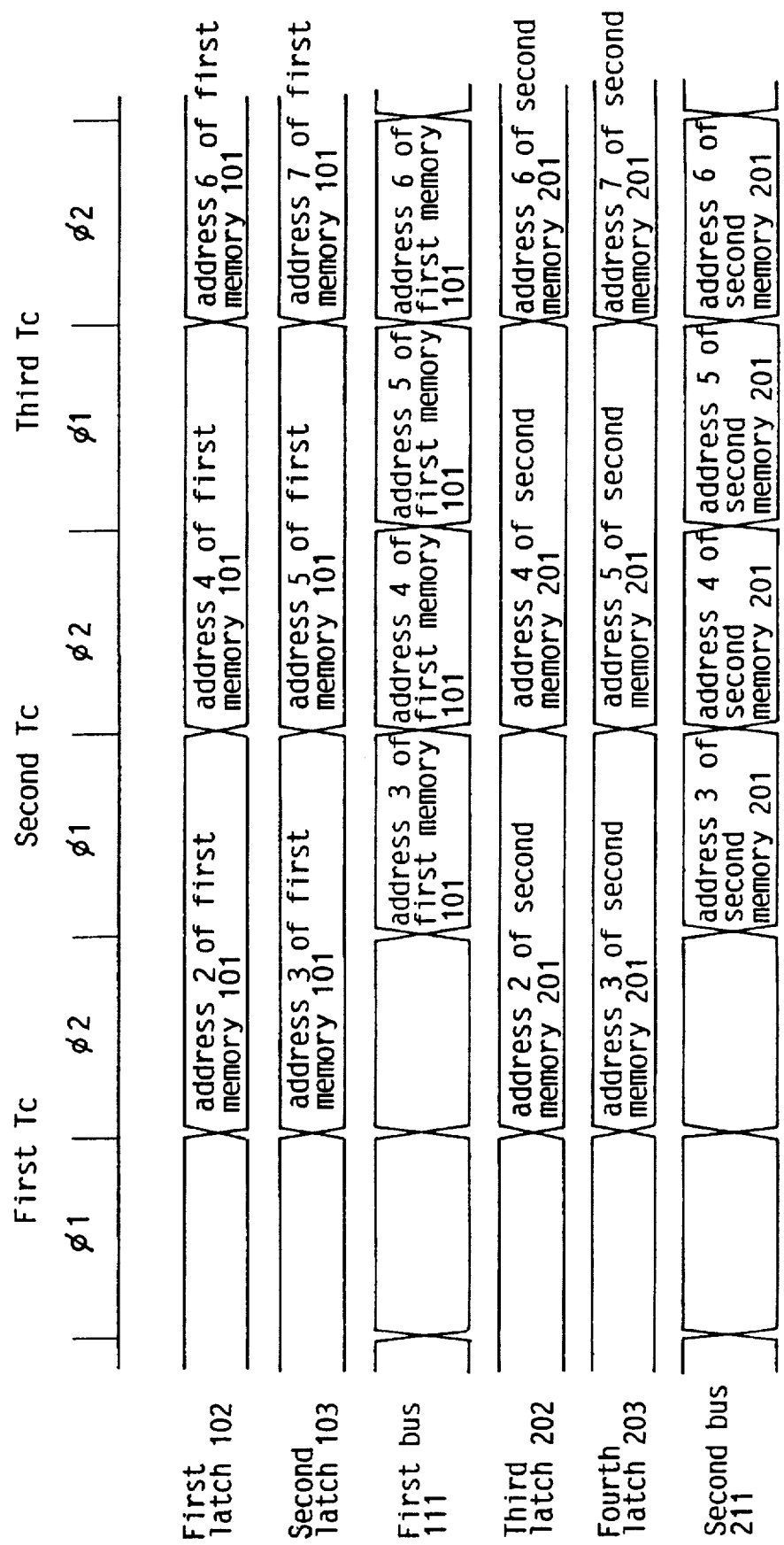
FIG. 15 is a view showing data-output timing in Case 2-1 of Embodiment I and Case 6-1 of Embodiment II.

(2-1) This is the case when the starting addresses of both the memories have odd-numbers, and both ADRS 113 and ADRS 213 are incremented by 2 at the rising edge of CLK 1 by the unillustrated addressing unit. Particulars of the input/output signals and data-output timing hereof are shown in FIGS. 8 and 15 respectively.

Let the starting addresses be address 3's, then both of the initial ADRS 113 and ADRS 213 have 3's with 1-LSB's. Thus, data at the preceding address 2's of the 0-banks and those at address 3's of the 1-banks of both the memories are read out in the first Tc. Then, at the timing of CLK 2 in the first Tc, data at address 2 and address 3 of the first memory 101 are latched by the first latch 102 and second latch 103 respectively, while the data address 2 and address 3 of the second memory 201 are done so by the third latch 202 and fourth latch 203 respectively.

In the meantime, START 116 turns to 1, and the control unit 114 receives LSB's of the initial ADRS 113 and ADRS 213 having 1's, and DIR 115 and DIR 215 having 0's. Then, the control unit 114 outputs MUX CNTL 107 and MUX CNTL 207 having 2's at CLK 1, and 1's at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at the preceding address 2's of both the memories are inputted into neither the first bus 111 nor second bus 211; data at address 3 of the first memory 101 are inputted into the first bus 111 by way of the second latch 103, MUX 108 and B_I/F 110, while those at address 3 of the second memory 201 into the second bus 211 by way of the fourth latch 203, MUX 208, and B_I/F 210 at CLK 1 in the second Tc.

On the other hand, data at the following address 4 of the first memory 101, which have been read out at the second Tc, are inputted into the first bus 111 by way of the first latch 102, MUX 108, and B_I/F 110, while those at address 4 of the second memory 201 into the second bus 211 by way of the third latch 202, MUX 208, and B_I/F 210 at CLK 2 in the second Tc.

In this way, data at odd-numbered addresses of the first memory 101 are inputted into the first bus 111 and data at odd-numbered addresses of the second memory 201 into the second bus 211 at CLK 1 in the second and the following Tc's; data at even-numbered addresses of the first memory 101 are inputted into the first bus 111 and data at even-numbered addresses of the second memory 201 into the second bus 211 at CLK 2 in the second and the following Tc's.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 16:
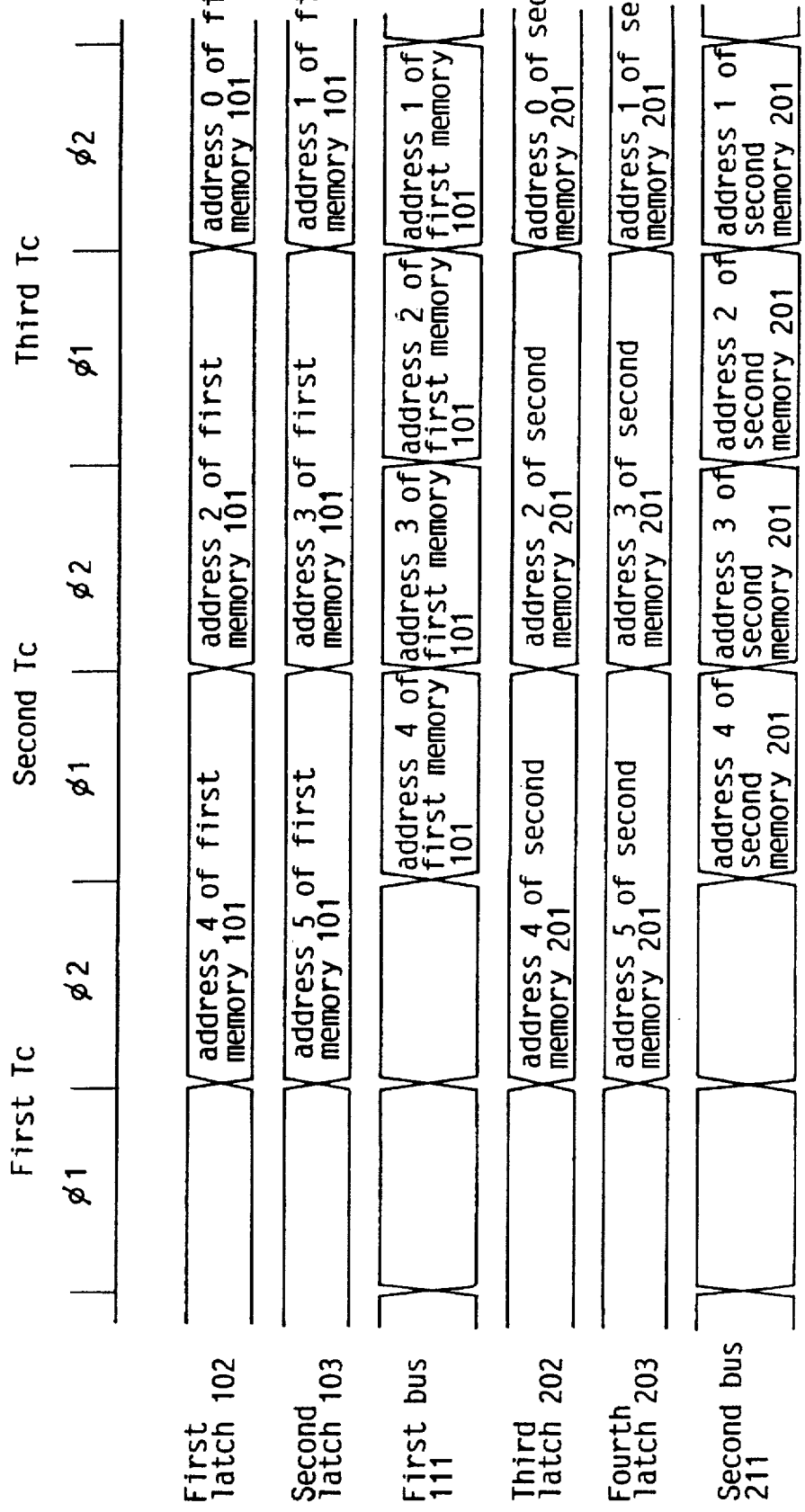
FIG. 16 is a view showing data-output timing in Case 2-2 of Embodiment I and Case 6-2 of Embodiment II.

(2-2) The starting addresses of both the memories have even-numbers, and both ADRS 113 and ADRS 213 are decremented by 2 at the rising edge of CLK 1 by the unillustrated addressing unit. Particulars of input/output signals and data-output timing hereof are shown in FIGS. 8 and 16 respectively.

Let the starting addresses be address 4's, then the initial ADRS 113 and ADRS 213 have 4's with 0-LSB's. Thus, data at the preceding address 5's of the 1-banks and those at address 4's of the 0-banks of both the memories are read out in the first Tc. Then, at the timing of CLK 2 in the first Tc, data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB's of the initial ADRS 113 and ADRS 213 having 0's, and DIR 115 and DIR 215 having 1's. Then, the control unit 114 outputs MUX CNTL 107 and MUX CNTL 207 having 1's at CLK 1, and 2's at CLK 2 in every Tc; BUS CNTL 109 having 0 in the first Tc, and 1 in second Tc and afterwards; BUS CNTL 209 having 0 in the first Tc, and 2 in the second Tc and afterwards.

Under the control of the control unit 114 with these signals, data at the preceding address 5's of both the memories are inputted into neither the first bus 111 nor second bus 211; data at address 4 of the first memory 101 are inputted into the first bus 111 by way of the first latch 102, MUX 108, and B_I/F 110, while those at address 4 of the second memory 201 are inputted into the second bus 211 by way of the third latch 202, MUX 208, and B_I/F 210 data at CLK 1 in the second Tc.

On the other hand, data at the following address 3 of the first memory 101, which have been read out in the second Tc, are inputted into the first bus 111 by way of the second latch 103, MUX 108, and B_I/F 110, while those at address 3 of the second memory 201 are inputted into the second bus 211 by way of the fourth latch 203, MUX 208, B_I/F 210 at CLK 2 in the second Tc.

In this way, data at even-numbered addresses of the first memory 101 are inputted into the first bus 111 and those at even-numbered addresses of the second memory 201 into the second bus 211 at CLK 1 in the second and the following Tc's; data at odd-numbered addresses of the first memory 101 are inputted into the first bus 111 and those at odd-numbered addresses of the second memory 201 into the second bus 211 at CLK 2 in the second and the following Tc's.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 17:
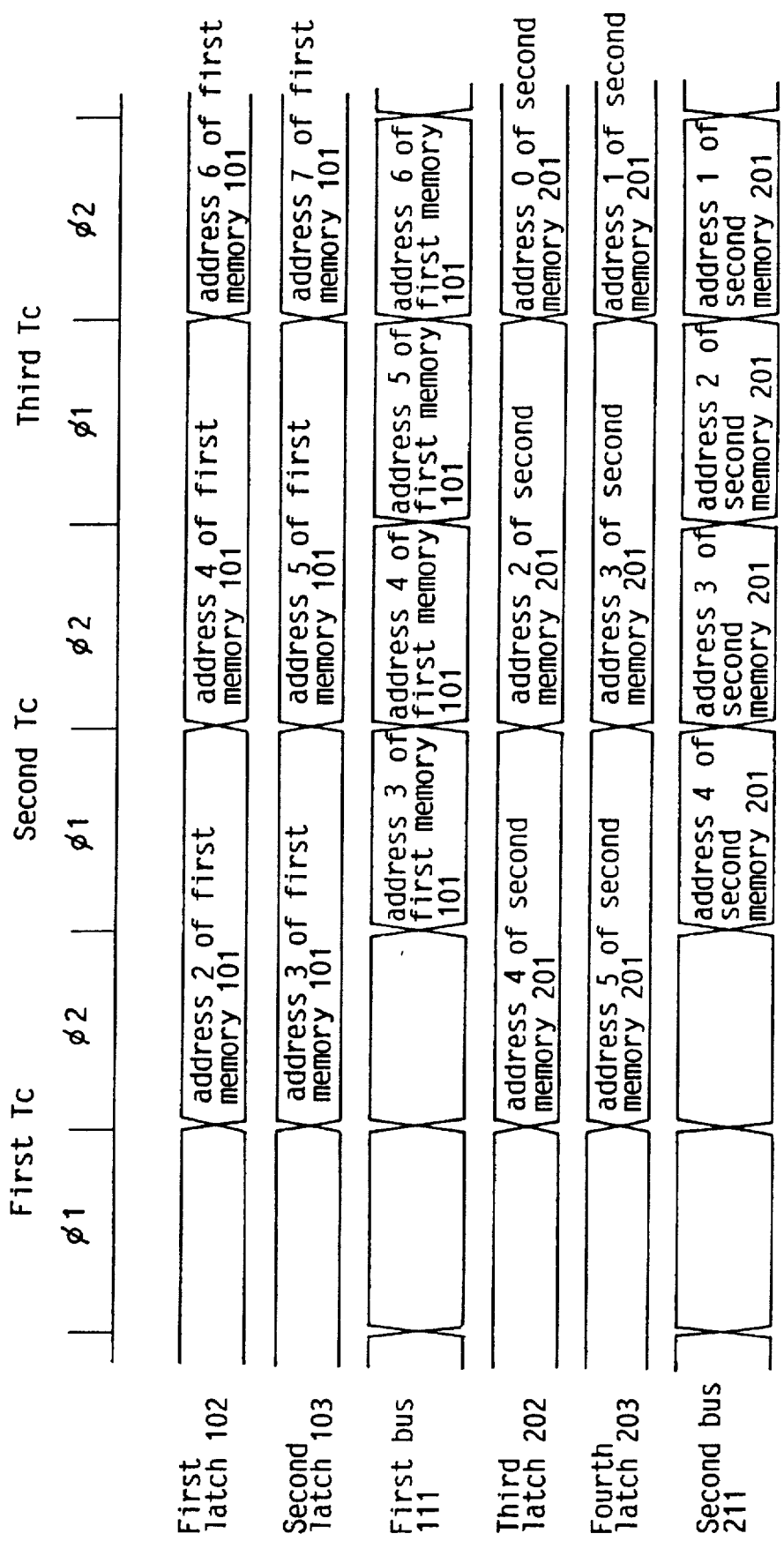
FIG. 17 is a view showing data-output timing in Case 2-3 of Embodiment I and Case 6-3 of Embodiment II.

(2-3) This is the case when the starting address of the first memory 101 has an odd-number while that of the second memory 201 has an even-number, and ADRS 113 is incremented while the initial ADRS 213 decremented by 2 at the rising edge of CLK 1 by the unillustrated addressing unit. Particulars of the input/output signals and data-output timing hereof are shown in FIGS. 8 and 17 respectively.

Let the starting address of the first memory 101 be address 3 and that of second memory 201 be address 4, then the initial ADRS 113 has 3 with 1-LSB and the initial ADRS 213 has 4 with 0-LSB. Thus, data at the preceding address 2 of the 0-bank of the first memory 101 and those at the preceding address 5 of the 1-bank of the second memory 201, and those at address 3 of the 1-bank of the first memory 101 and those at address 4 of the 0-bank of the second memory 201 are read out in the first Tc. Then, at the timing of CLK 2 in the first Tc, data at address 2 and address 3 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB of the initial ADRS 113 having 1 and LSB of the initial ADRS 213 having 0, and DIR 115 having 0 and DIR 215 having 1. Then, the control unit 114 outputs MUX CNTL 107 having 2 and MUX CNTL 207 having 1 at CLK 1, and respectively 1 and 2 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control with these signals, data at the preceding address 2 of the first memory 101 and at the preceding address 5 of the second memory 201 are inputted into neither the first bus 111 nor second bus 211; data at address 3 of the first memory 101 are inputted into the first bus 111 by way of the second latch 103, MUX 108, and B_I/F 110, while those at address 4 of the second memory 201 into the second bus 211 by way of the third latch 202, MUX 208, and B_I/F 210 at CLK 1 in the second Tc.

On the other hand, data at the following address 4 of the first memory 101, which have been read out in the second Tc, are inputted into the first bus 111 by way of the first latch 102, MUX 108 and B_I/F 110, while data at the following address 3 of the second memory 201 into the second bus 211 by way of the fourth latch 203, MUX 208, and B_I/F 210 at CLK 2 in the second Tc.

In this way, data at odd-numbered addresses of the first memory 101 are inputted into the first bus 111 and those at even-numbered addresses of the second memory 201 into the second bus 211 at CLK 1 in the second and the following Tc's; data at even-numbered addresses of the first memory 101 are inputted into the first bus 111 and data at odd-numbered addresses of the second memory 201 into the second bus 211 at CLK 2 in the second and the following Tc's.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

Figure 18:
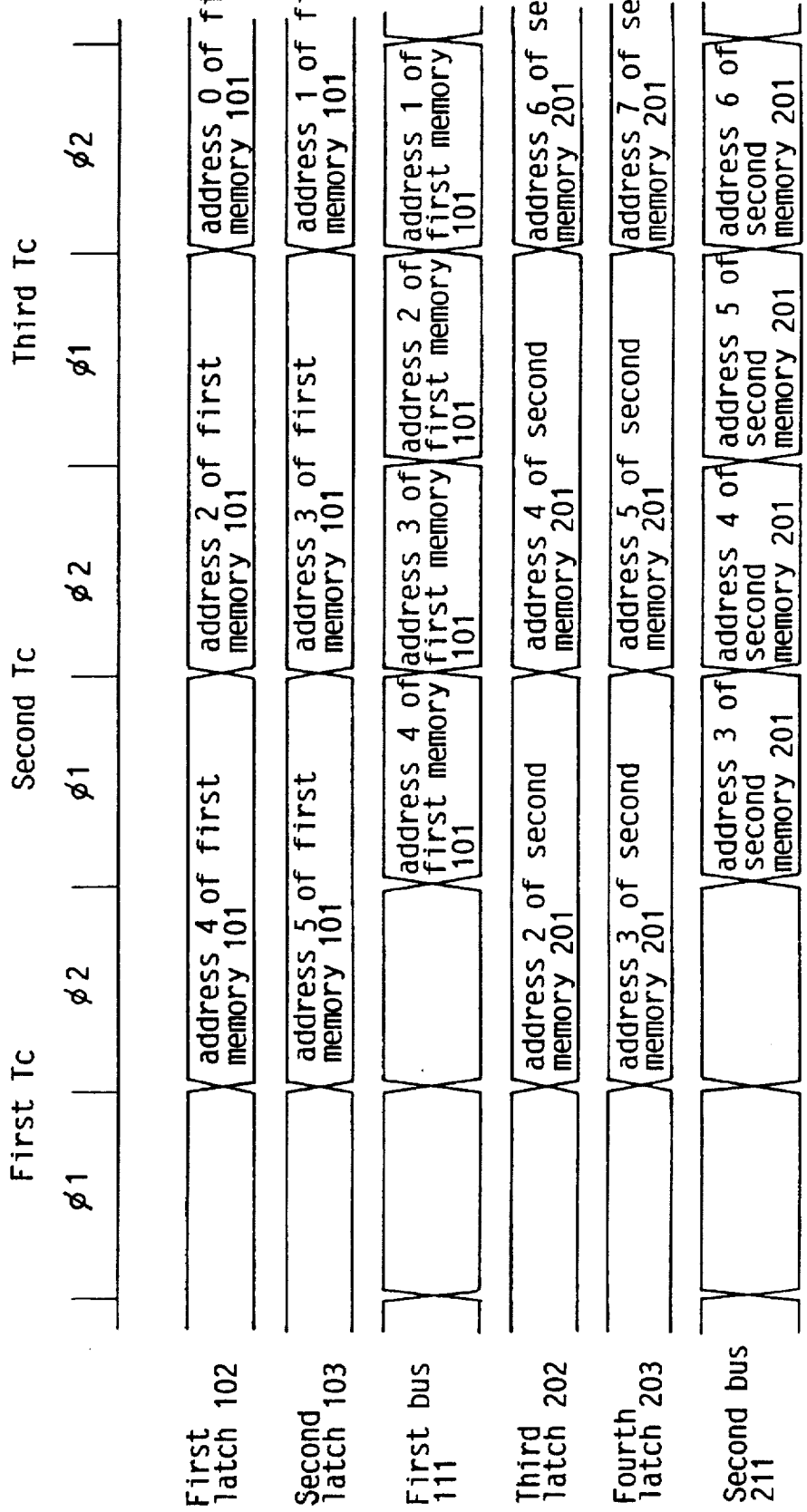
FIG. 18 is a view showing data-output timing in Case 2-4 of Embodiment I and Case 6-4 of Embodiment II.

(2-4) This is the case when the starting address of the first memory 101 has an even-number while that of the second memory 201 has an odd-number, and ADRS 113 is decremented while the initial ADRS 213 incremented by 2 at the rising edge of CLK 1 by the unillustrated addressing unit. Particulars of the input/output signals and data-output timing hereof are shown in FIGS. 8 and 18 respectively.

Let the starting address of the first memory 101 be address 4, and that of second memory 201 be address 3, then the initial ADRS 113 has 4 with 0-LSB, and the initial ADRS 213 has 3 with 1-LSB. Thus, data at the preceding address 5 of the 1-bank of the first memory 101 and those at the preceding address 2 of the 0-bank of the second memory 201, and those at address 4 of the 0-bank of the first memory 101 and those at address 3 of the 1-bank of the second memory 201 are read out in the first Tc. Thus, at the timing of CLK 2 in the first Tc, the data address 4 and address 5 of the first memory 101 are latched by the first latch 102 and second latch 103 respectively, while those at address 2 and address 3 of the second memory 201 are done so by the third latch 202 and, fourth latch 203 respectively.

In the meantime, START 116 turns to 1, and the control unit 114 receives LSB of the initial ADRS 113 having 0 and LSB of the initial ADRS 213 having 1, and DIR 115 having 1 and DIR 215 having 0. Then, the control unit 114 outputs MUX CNTL 107 having 1 and MUX CNTL 207 having 2 at CLK 1, and respectively 2 and 1 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at the preceding address 5 of the first memory 101 and those at the preceding address 2 of the second memory 201 are inputted into neither the first bus 111 nor second bus 211; data at address 4 of the first memory 101 are inputted into the first bus 111 by way of the first latch 102, MUX 108, and B_I/F 110, while those at address 3 of the second memory 201 into the second bus 211 by way of the fourth latch 203, MUX 208, and B_I/F 210 at CLK 1 in the second Tc.

On the other hand, data at the following address 3 of the first memory 101, which have been read out in the second Tc, are inputted into the first bus 111 by way of the second latch 103, MUX 108, and B_I/F 110, while those at address 4 of the second memory 201 into the second bus 211 by way of the third latch 202, MUX 208, and B_I/F 210 at CLK 2 in the second Tc.

In this way, data at even-numbered addresses of the first memory 101 are inputted into the first bus 111 and those at odd-numbered addresses of the second memory 201 into the second bus 211 at CLK 1 in the second and the following Tc's; data at odd-numbered addresses of the first memory 101 are inputted into the first bus 111 and those at even-numbered addressees of the second memory 201 into the second bus 211 at CLK 2 in the second and the following Tc's.

As a result, the interleaving memory allows both the memories to output data at contiguous addresses into the first bus 111 and second bus 211 in matching Tc's, thereby enabling the calculator 112 to carry out arithmetic operations sequentially twice as fast as the non-interleaving memories.

(CASE 3)

In this case, the calculator 112 carries out the arithmetic operations of data read out from each memory in different Tc's: data from the second memory 201 are read out one Tc behind.

Figure 19:
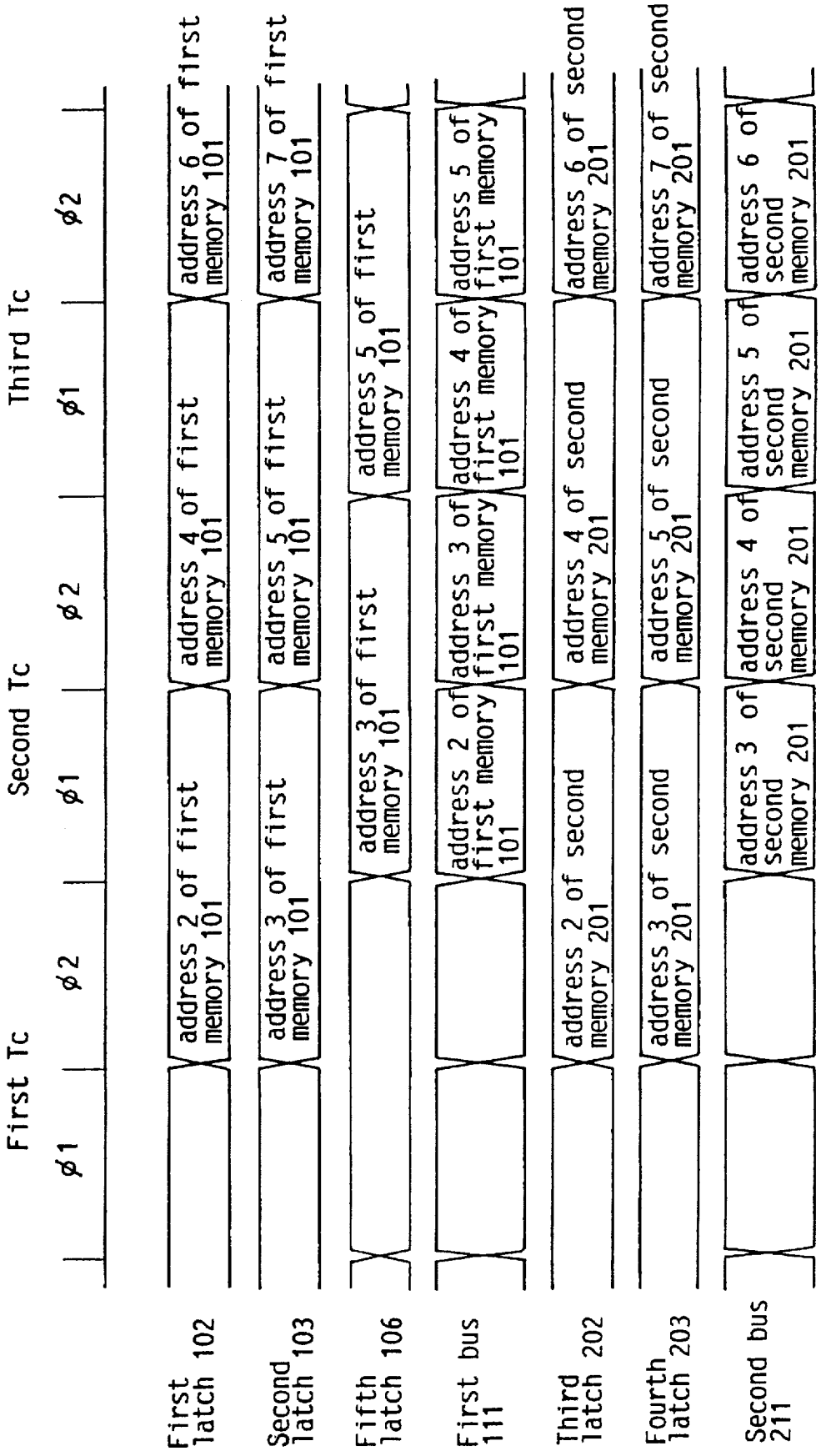
FIG. 19 is a view showing data-output timing in Case 3-1 of Embodiment I.

(3-1) This is the case when the starting address of the first memory 101 has an even-number while that of the second memory 201 has an odd-number, and both of the initial ADRS 113 and ADRS 213 are incremented by 2 at the rising edge of CLK 1 by the unillustrated addressing unit. Particulars of the input/output signals and data-output timing hereof are shown in FIGS. 9 and 19 respectively.

Let the starting address of the first memory 101 be address 2 and that of the second memory 201 be address 3, then the initial ADRS 113 has 2 with 0-LSB, and the initial ADRS 213 has 3 with 1-LSB. Thus, data at address 2 of the 0-bank of the first memory 101 and those at address 3 of the 1-bank of the second memory 201, and those at the following address 3 of the 1-bank of the first memory 101 and those at the following address 4 of the 0-bank of the second memory 201 are read out in the first Tc. Then, at the timing of CLK 2 in the first Tc, data at address 2 and address 3 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB of the initial ADRS 113 having 0, and LSB of the initial ADRS 213 having 1, and DIR 115 and DIR 215 having 0's. Then, the control unit 114 outputs MUX CNTL 104 having 1; MUX CNTL 107 having 1 and MUX CNTL 207 having 2 at CLK 1, and respectively 0 and 1 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 2 of the first memory 101 are inputted into the first bus 111 by way of the first latch 102, MUX 108, and B_I/F 110, while those at address 3 of the second memory 201 into the second bus 211 by way of the fourth latch 203, MUX 208, and B_I/F 210 at CLK 1 in the second Tc; data at address 2 thereof are inputted into neither the first bus 111 nor second bus 211.

On the other hand, data at address 3 of the first memory 101 are inputted into MUX 105 by way of the second latch 103, and thence latched by the fifth latch 106 at CLK 1 in the second Tc, and finally inputted into the first bus 111 by way of MUX 108 and B_I/F 110 at CLK 2 in the second Tc; data at the following address 4 of the second memory 201, which have been read out in the second Tc, are inputted into the second bus 211 by way of the third latch 202, MUX 208, and B_I/F 210 at CLK 2 in the second Tc.

In this way, data at even-numbered addresses of the first memory 101 are inputted into the first bus 111 and those at odd-numbered addresses of the second memory 201 into the second bus 211 at CLK 1 in the second and the following Tc's; data at odd-numbered addresses of the first memory 101 are inputted into the first bus 111 and those at even-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Figure 20:
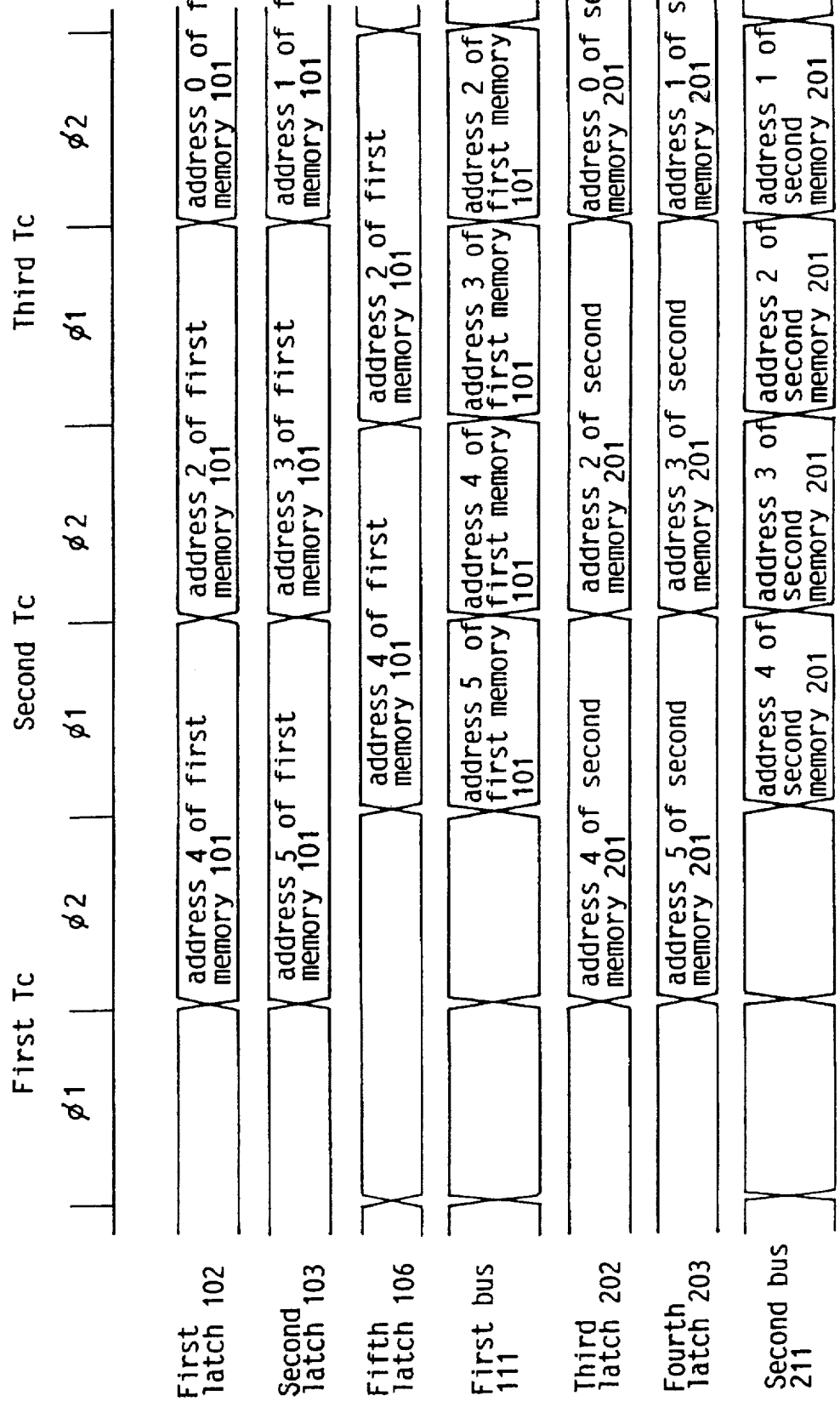
FIG. 20 is a view showing data-output timing in Case 3-2 of Embodiment I.

(3-2) This is the case when the starting address of the first memory 101 has an odd-number while that of the second memory 201 has an even-number, and both ADRS 113 and ADRS 213 are decremented by 2 at the rising edge of CLK 1 by the unillustrated addressing unit. Particulars of the input/output signals and data-output timing hereof are shown in FIGS. 9 and 20 respectively.

Let the starting address of the first memory 101 be address 5 and that of the second memory 201 be address 4, then the initial ADRS 113 has 5 with 1-LSB, and the initial ADRS 213 has 4 with 0-LSB. Thus, data at address 5 of the 1-bank of the first memory 101 and those at address 4 of the 0-bank of the second memory 201, and those at the following address 4 of the 0-bank of the first memory 101 and those at the preceding address 5 of the 1-bank of the second memory 201 are read out in the first Tc. Then, at the timing of CLK 2 in the first Tc, data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB of the initial ADRS 113 having 1 and LSB of the initial ADRS 213 having 0, and DIR 115 and DIR 215 having 1's. Then, the control unit 114 outputs MUX CNTL 104 having 0; MUX CNTL 107 having 2 and MUX CNTL 207 having 1 at CLK 1, and respectively 0 and 2 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 5 of the first memory 101 are inputted into the first bus 111 by way of the second latch 103, MUX 108, and B_I/F 110, while those at address 4 of the second memory 201 into the second bus 211 by way of the third latch 202, MUX 208, and B_I/F 210 at CLK 1 in the second Tc and afterwards; data at address 5 thereof are inputted into neither the first bus 111 nor second bus 211.

On the other hand, data at address 4 of the first memory 101 are inputted into MUX 105 by way of the first latch 102, and thence latched by the fifth latch 106 at CLK 1 in the second Tc, and finally inputted into the first bus 111 by way of MUX 108 and B_I/F 110 at CLK 2 in the second Tc; data at address 3 of the second memory 201, which have been read out in the second Tc, are inputted into the second bus 211 by way of the fourth latch 203, MUX 208, and B_I/F 210 at CLK 2 in the second Tc.

In this way, data at odd-numbered addresses of the first memory 101 are inputted into the first bus 111 and those at even-numbered addresses of the second memory 201 into the second bus 211 at CLK 1 in the second and the following Tc's; data at even-numbered addresses of the first memory 101 are inputted into the first bus 111 and those at odd-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations twice sequentially as fast as the non-interleaving memories.

Figure 21:
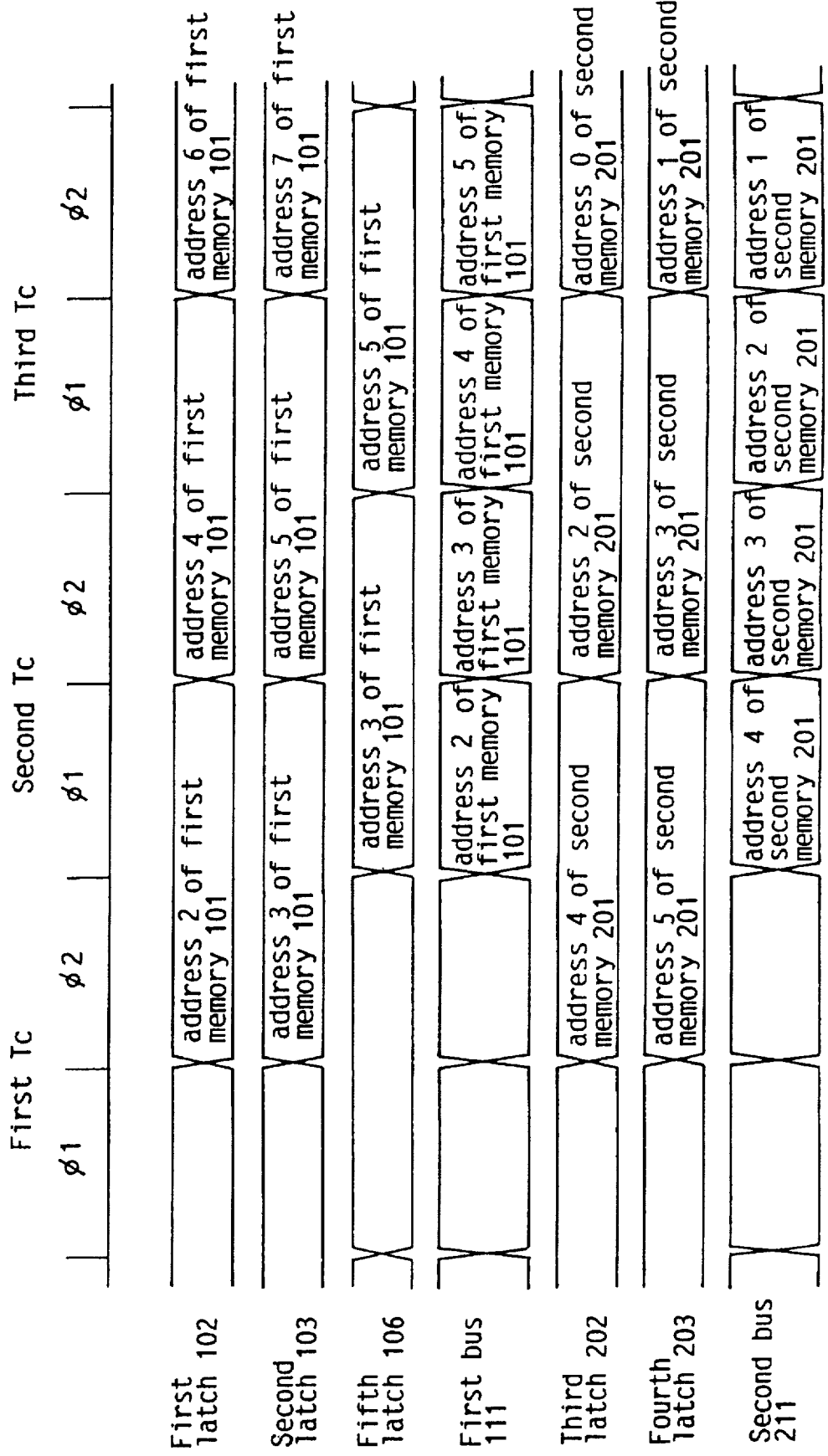
FIG. 21 is a view showing data-output timing in Case 3-3 of Embodiment I.

(3-3) This is the case when the starting addresses of both memories have even-numbers, and ADRS 113 is incremented while ADRS 213 decremented by 2 at the rising edge of CLK 1 by the unillustrated addressing unit. Particulars of the input/output signals and data-output timing hereof are shown in FIGS. 9 and 21 respectively.

Let the starting address of the first memory 101 be address 2 and that of the second memory 201 be address 4, then the initial ADRS 113 has 2 and the initial ADRS 213 has 4 with 0-LSB's. Thus, data at address 2 of the 0-bank of the first memory 101 and those at address 3 of the 1-bank of the second memory 201, and those at the following address 4 of the 0-bank of the first memory 101 and those at the preceding address 5 of the 1-bank of the second memory 201 are read out in the first Tc. Then, at the timing of CLK 2 in the first Tc, data at address 2 and address 3 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB's of the initial ADRS 113 and ADRS 213 having 0's, and DIR 115 having 0 and DIR 215 having 1. Then, the control unit 114 outputs MUX CNTL 104 having 1; MUX CNTL 107 and MUX CNTL 207 having 1's at CLK 1, and respectively 0 and 2 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 2 of the first memory 101 are inputted into the first bus 111 by way of the first latch 102, MUX 108, and B_I/F 110, while those at address 4 of the second memory 201 into the second bus 211 by way of the third latch 202, MUX 208, and B_I/F 210 at CLK 1 in the second Tc; data at address 5 thereof are inputted into neither the first bus 111 nor second bus 211.

On the other hand, data at address 3 of the first memory 101 are inputted into MUX 105 by way of the second latch 103, and thence latched by the fifth latch 106 at CLK 1 in the second Tc, and finally inputted into the first bus 111 by way of MUX 108 and B_I/F 110 at CLK 2 in the second Tc; data at address 3 of the second memory 201, which have been read out in the second Tc, are inputted into the second bus 211 by way of the fourth latch 203, MUX 208, and B_I/F 210 at CLK 2 in the second Tc.

In this way, data at even-numbered addresses of the first memory 101 are inputted into the first bus 111 and those at even-numbered addresses of the second memory 201 into the second bus 211 at CLK 1 in the second and the following Tc's; data at odd-numbered addresses of the first memory 101 are inputted into the first bus 111 and those at the odd-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Figure 22:
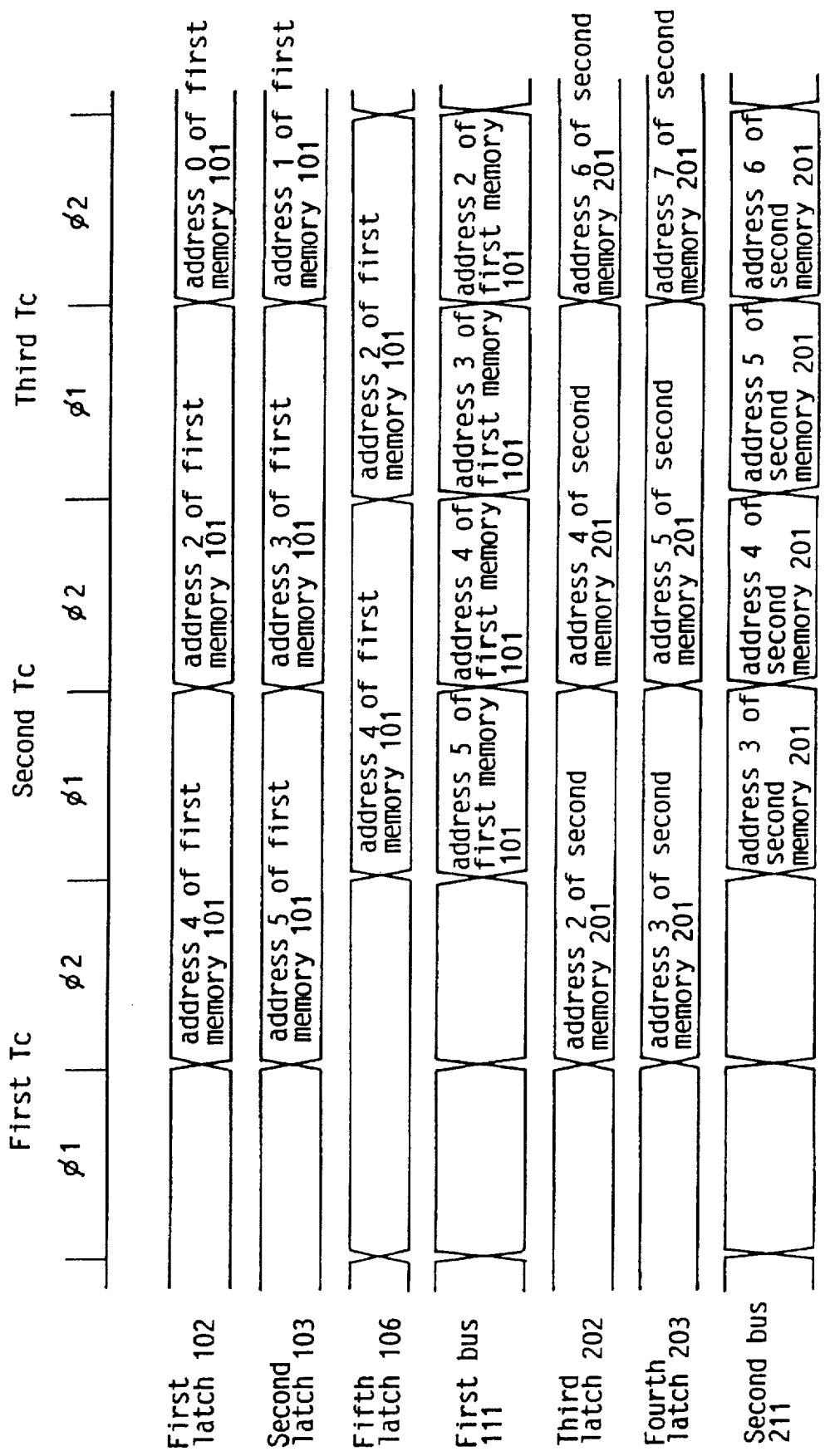
FIG. 22 is a view showing data-output timing in Case 3-4 of Embodiment I.

(3-4) This is the case when the starting addresses of the both memories have odd-numbers, and ADRS 113 is decremented while ADRS 213 incremented by 2 at the rising edge of CLK 1 by the unillustrated addressing unit. Particulars of the input/output signals and data-output timing hereof are shown in FIGS. 9 and 22 respectively.

Let the starting address of the first memory 101 be address 5 and that of the second memory 201 be address 3, then the initial ADRS 113 has 5 and the initial ADRS 213 has 3 with 1-LSB's. Thus, data at address 5 of the 1-bank of the first memory 101 and those at address 3 of the 1-bank of the second memory 201, and those at the following address 4 of the 0-bank of the first memory 101 and those at the preceding address 2 of the 0-bank of the second memory 201 are read out in the first Tc. Then, at the timing of CLK 2 in the first Tc, data at address 4 and address 5 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB's of ADRS 113 and ADRS 213 having 1's, and DIR 115 having 1 and DIR 215 having 0. Then, the control unit 114 outputs MUX CNTL 104 having 0; MUX CNTL 107 and MUX CNTL 207 having 2's at CLK 1, and respectively 0 and 1 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 5 of the first memory 101 are inputted into the first bus 111 by way of the second latch 103, MUX 108, and B_I/F 110, while those at address 3 of the second memory 201 into the second bus 211 by way of the fourth latch 203, MUX 208, and B_I/F 210 at CLK 1 in the second Tc; data at address 2 thereof are inputted into neither the first bus 111 nor second bus 211.

On the other hand, data at address 4 of the first memory 101 are inputted into the MUX 105 by way of the first latch 102, and thence latched by the fifth latch 106 at CLK 1 in the second Tc, and finally inputted into the first bus 111 by way of MUX 108 and B_I/F 110 at CLK 2 in the second Tc; data at address 4 of the second memory 201, which have been read out in the second Tc, are inputted into the second bus 211 by way of the third latch 202, MUX 208, and B_I/F 210 at CLK 2 in the second Tc.

In this way, data at odd-numbered addresses of the first memory 101 are inputted into the first bus 111 and those at odd-numbered addresses of the second memory 201 into the second bus 211 at CLK 1 in the second and the following Tc's; data at even-numbered addresses of the first memory 101 are inputted into the first bus 111 and those at even-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

(CASE 4)

In this case, the calculator 112 carries out the arithmetic operations of data read out from each memory in different Tc's: data from the first memory 101 are read out 1 Tc behind.

Figure 23:
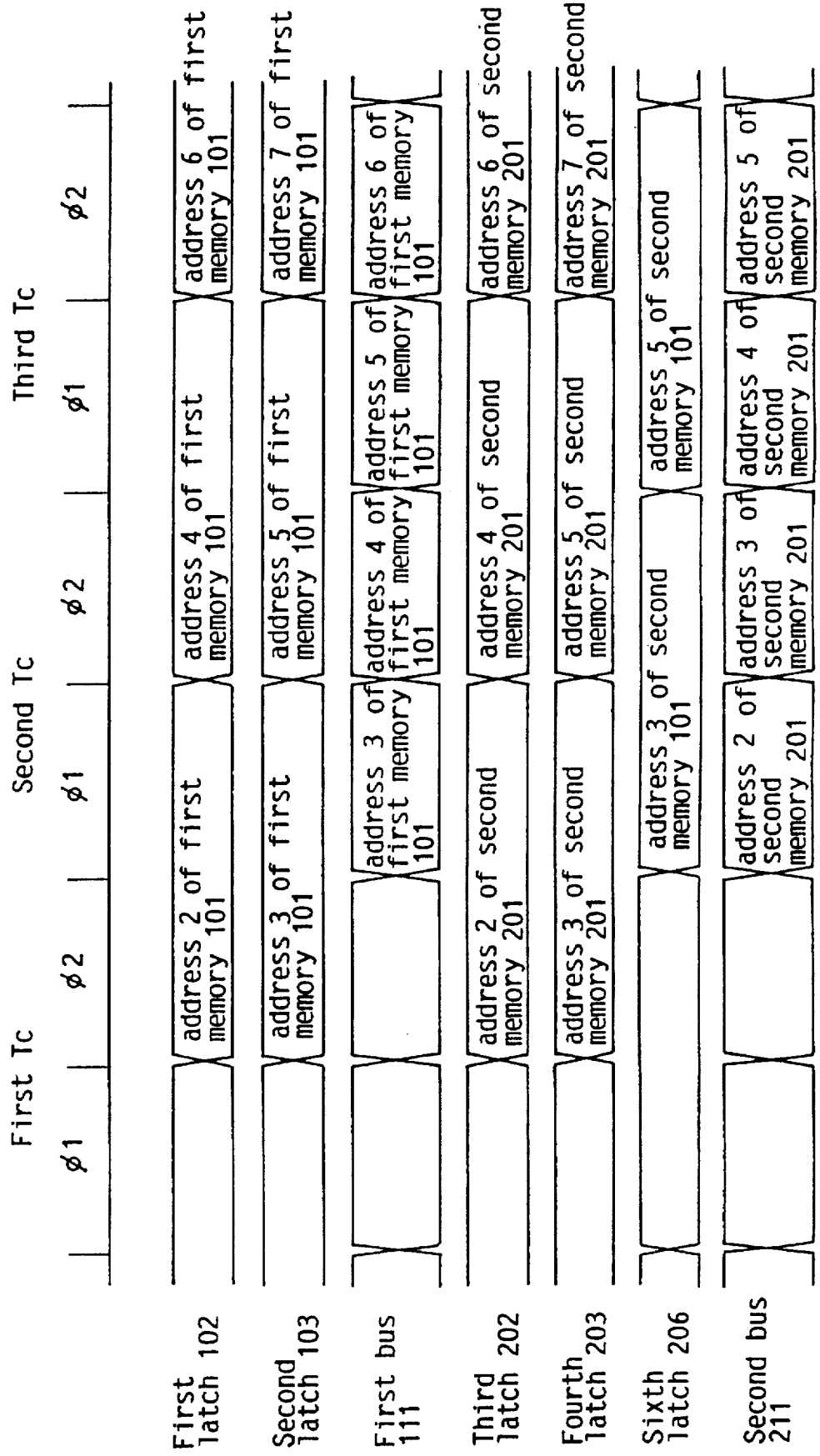
FIG. 23 is a view showing data-output timing in Case 4-1 of Embodiment I.

(4-1) This is the case when the starting address of the first memory 101 has an odd-number while that of the second memory 201 has an even-number, and both ADRS 113 and ADRS 213 are incremented by 2 at the rising edge of CLK 1 by the unillustrated addressing unit. Particulars of the input/output signals and data-output timing hereof are shown in FIGS. 10 and 23 respectively.

Let the starting address of the first memory 101 be address 3 and that of the second memory 201 be address 2, then the initial ADRS 113 has 3 with 1-LSB, and the initial ADRS 213 has 2 with 0-LSB. Thus, data at address 3 of the 1-bank of the first memory 101 and those at address 2 of the 0-bank of the second memory 201, and those at the preceding address 2 of the 0-bank of the first memory 101 and those at the following address 3 of the 1-bank of the second memory 201 are read out in the first Tc. Then, at the timing of CLK 2 in the first Tc, data at address 2 and address 3 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB of the initial ADRS 113 having 1 and LSB of the initial ADRS 213 having 0, and DIR 115 having 1 and DIR 215 having 0. Then, the control unit 114 outputs MUX CNTL 204 having 1; MUX CNTL 107 having 2 and MUX CNTL 207 having 1 at CLK 1, and respectively 1 and 0 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 2 are inputted into neither the first bus 111 nor second bus 211; data at address 3 of the first memory 101 are inputted into the first bus 111 by way of the second latch 103, MUX 108, and B_I/F 110, while those at address 2 of the second memory 201 into the second bus 211 by way of the third latch 202, MUX 208, and B_I/F 210 at CLK 1 in the second Tc.

On the other hand, data at address 4 of the first memory 101, which have been read out in the second Tc, are inputted into the first bus 111 by way of the first latch 102, MUX 108 and B_I/F 110, while those at address 3 of the second memory 201 are inputted into MUX 205 by way of the fourth latch 203, and thence latched by the sixth latch 206 at CLK 1 in the second Tc, and finally inputted into the second bus 211 by way of MUX 108 and B_I/F 210 at CLK 2 in the second Tc.

In this way, data at odd-numbered addresses of the first memory 101 are inputted into the first bus 111 and those at even-numbered addresses of the second memory 201 into the second bus 211 at CLK 1 in the second and the following Tc's; data at even-numbered addresses of the first memory 101 are inputted into the first bus 111 and those at odd-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Figure 24:
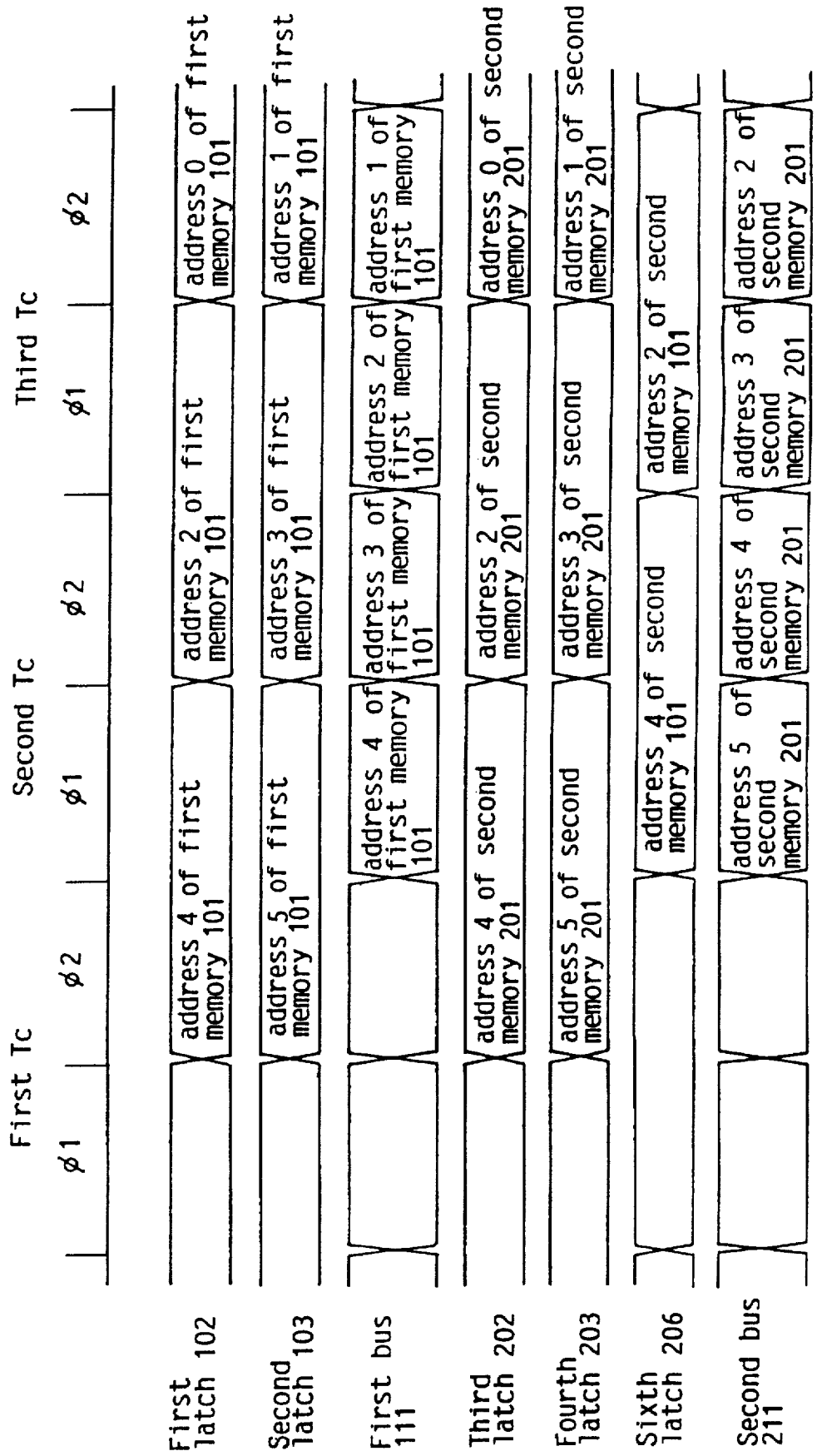
FIG. 24 is a view showing data-output timing in Case 4-2 of Embodiment I.

(4-2) This is the case when the starting address of the first memory 101 has an even-number while that of the second memory 201 has an odd-number, and both ADRS 113 and ADRS 213 are decremented by 2 at the rising edge of CLK 1 by the unillustrated addressing unit. Particulars of the input/output signals and data-output timing hereof are shown in FIGS. 10 and 24 respectively.

Let the starting address of the first memory 101 be address 4 and that of the second memory 201 be address 5, then the initial ADRS 113 has 4 with 0-LSB and the initial ADRS 213 has 5 with 1-LSB. Thus, data at address 4 of the 0-bank of the first memory 101 and those at address 5 of the 1-bank of the second memory 201, and those at the preceding address 5 of the 1-bank of the first memory 101 and those at the following address 4 of the 0-bank of the second memory 201 are read out in the first Tc. Then, at the timing of CLK 2 in the first Tc, data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB of the initial ADRS 113 having 0 and LSB of the initial ADRS 213 having 1, and DIR 115 and DIR 215 having 1's. Then, the control unit 114 outputs MUX CNTL 204 having 0; MUX CNTL 107 having 1 and MUX CNTL 207 having 2 at CLK 1, and respectively 2 and 0 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 5 are inputted into neither the first bus 111 nor second bus 211; data at address 4 of the first memory 101 are inputted into the first bus 111 by way of the first latch 102, MUX 108, and B__I/F 110, while those at address 3 of the second memory 201 into the second bus 211 by way of the fourth latch 203, MUX 208, and B__I/F 210 at CLK 1 in the second Tc.

On the other hand, data at address 3 of the first memory 101, which have been read out in the second Tc, are inputted into the first bus 111 by way of the second latch 103, MUX 108 and B__I/F 110 at CLK 2 in the second Tc, while those at address 4 of the second memory 201 are inputted into MUX 205 by way the third latch 202, and thence latched by the sixth latch 206 at CLK 1 in the second Tc, and finally inputted into the second bus 211 by way of MUX 208 and B__I/F 210 at CLK 2 in the second Tc.

In this way, data at even-numbered addresses of the first memory 101 are inputted into the first bus 111 and those at odd-numbered addresses of the second memory 201 into the second bus 211 at CLK 1 in the second and the following Tc's; data at odd-numbered addresses of the first memory 101 are inputted into the first bus 111 and those at even-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Figure 25:
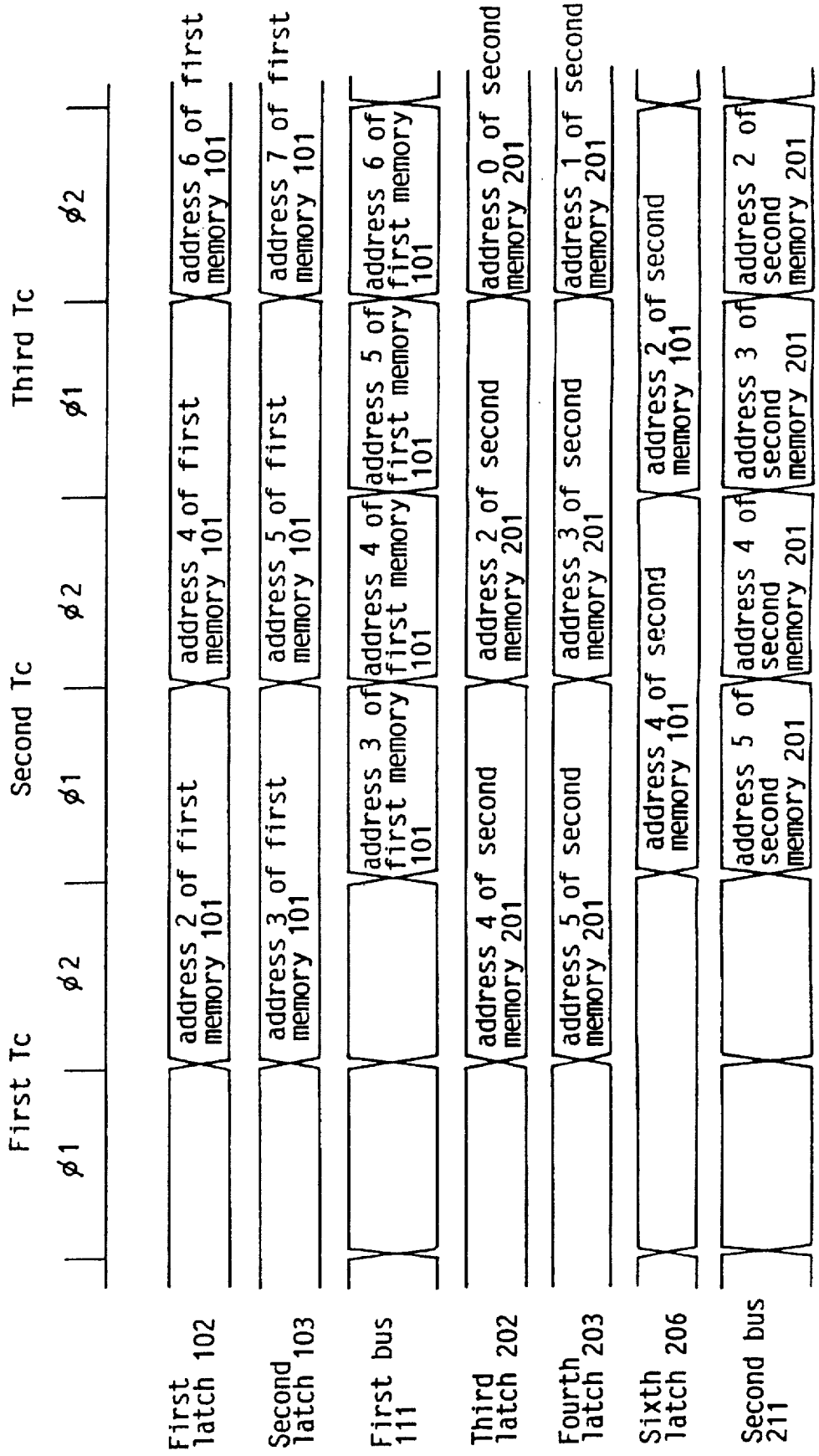
FIG. 25 is a view showing data-output timing in Case 4-3 of Embodiment I.

(4-3) This is the case when the starting address of both the memories have odd-numbers, and ADRS 113 is incremented while ADRS 213 decremented by 2 at the rising edge of CLK 1 by the unillustrated addressing unit. Particulars of the input/output signals and data-output timing hereof are shown in FIGS. 10 and 25.

Let the starting address of the first memory 101 be address 3 and that of the second memory 201 be address 5, then the initial ADRS 113 has 3 and the initial ADRS 213 has 5 with 1-LSB's. Thus, data at address 3 of the 1-bank of the first memory 101 and those at address 5 of the 1-bank of the second memory 201, and those at the preceding address 2 of the 0-bank of the first memory 101 and those at the following address 4 of the 0-bank of the second memory 201 are read out in the first Tc. Then, at the timing of CLK 2 in the first Tc, data at address 2 and address 3 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 114 receives LSB's of ADRS 113 and ADRS 213 having 1's, and DIR 115 having 0 and DIR 215 having 1. Then, the control unit 114 outputs MUX CNTL 204 having 0; MUX CNTL 107 and MUX CNTL 207 having 2's at CLK 1, and respectively 1 and 0 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 2 of the first memory 101 are inputted into neither the first bus 111 nor second bus 211; data at address 3 of the first memory 101 are inputted into the first bus 111 by way of the second latch 103, MUX 108, and B__I/F 110, while those at address 5 of the second memory 201 into the second bus 211 by way of the fourth latch 203, MUX 208, and B__I/F 210 at CLK 1 in the second Tc.

On the other hand, data at address 4 of the first memory 101, which have been read out in the second Tc, are inputted into the first bus 111 by way of the first latch 102, MUX 108 and B__I/F 110 at CLK 2 in the second Tc; data at address 4 of the second memory 201 are inputted into MUX 205 by way of third latch 202, and thence latched by the sixth latch 206 at CLK 1 in the second Tc, and finally inputted into the second bus 211 by way of MUX 208 and B__I/F 210 at CLK in the second Tc.

In this way, data at odd-numbered addresses of the first memory 101 are inputted into the first bus 111 and those at odd-numbered addresses of the second memory 201 into the second bus 211 at CLK 1 in the second and the following Tc's; data at even-numbered addresses of the first memory 101 are inputted into the first bus 111 and those at the even-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Figure 26:
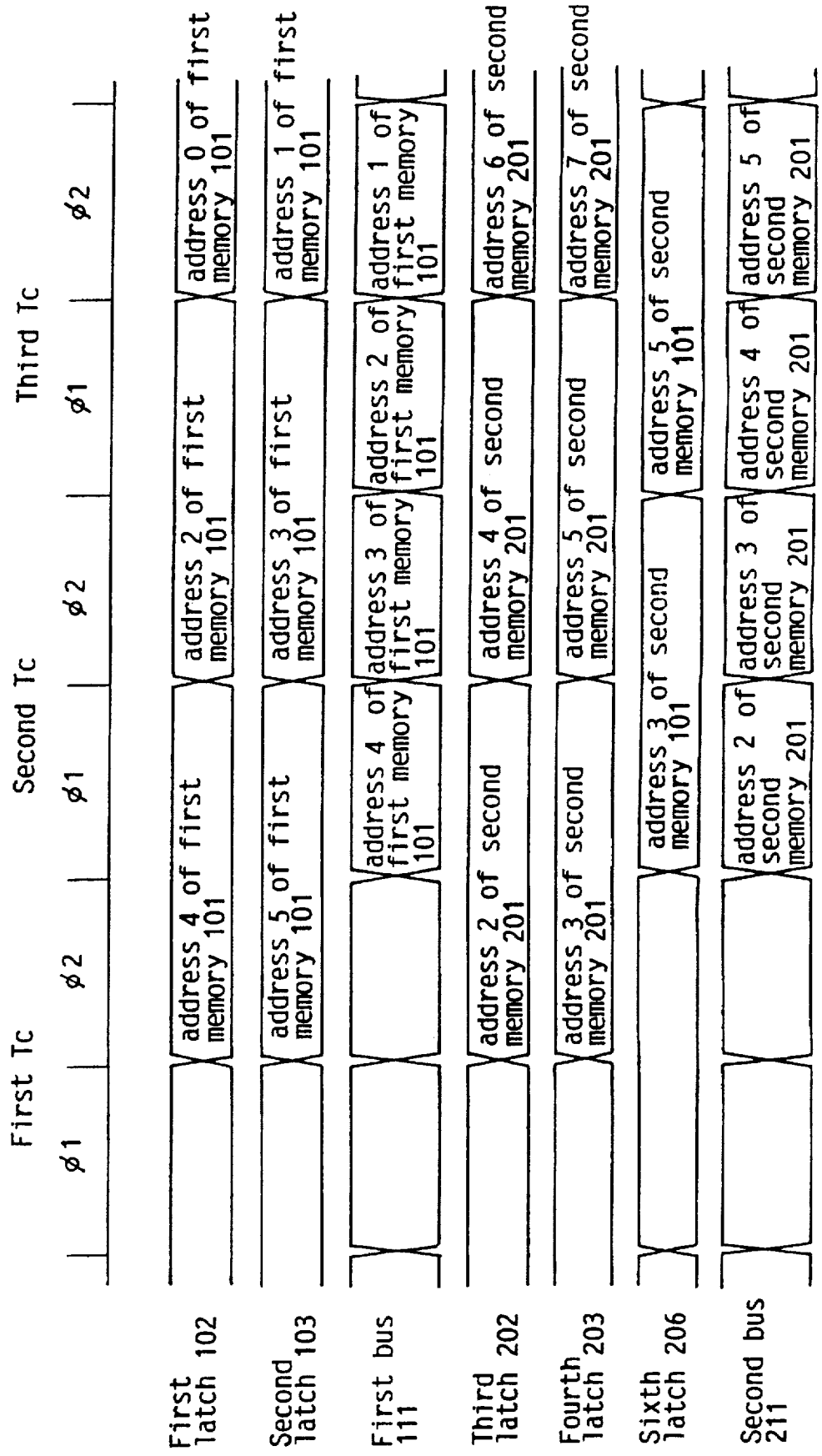
FIG. 26 is a view showing data-output timing in Case 4-4 of Embodiment I.

(4-4) This is the case when the starting addresses of both the memories have even-numbers, and ADRS 113 is decremented while ADRS 213 incremented by 2 at the rising edge of CLK 1 by the unillustrated addressing unit. Particulars of the input/output signals and data-output timing hereof are shown in FIGS. 10 and 26 respectively.

Let the starting address of the first memory 101 be address 4 and that of the second memory 201 be address 2, then the initial ADRS 113 has 4 and the initial ADRS 213 has 2 with 0-LSB's. Thus, data at address 4 of the 0-bank of the first memory 101 and those at address 2 of the 0-bank of the second memory 201, and those at the preceding address 5 of the 1-bank of the first memory 101 and those at the following address 5 of the 1-bank of the second memory 201 are read out in the first Tc. Then, at the timing of CLK 2 in the first Tc, data at address 4 and address 5 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 114 receives LSB's of ADRS 113 and ADRS 213 having 0's, and DIR 115 having 1 and DIR 215 having 0. Then, the control unit 114 outputs MUX CNTL 204 having 1; MUX CNTL 107 and MUX CNTL 207 having 1's at CLK 1, and respectively 2 and 0 at CLK 2 in every Tc; BUS CNTL 109 having 0 in the first Tc, and 1 in the second Tc and afterwards; BUS CNTL 209 having 0 in the first Tc, and 2 in the second Tc and afterwards.

Under the control of the control unit 114 with these signals, data at address 5 are inputted into neither the first bus 111 nor second bus 211; data at address 4 of the first memory 101 are inputted into the first bus 111 by way of the first latch 102, MUX 108, and B_I/F 110, while those at address 2 of the second memory 201 into the second bus 211 by way of the third latch 202, MUX 208, and B_I/F 210 at CLK 1 in the second Tc.

On the other hand, data at address 3 of the first memory 101, which have been read out in the second Tc, are inputted into the first bus 111 by way of the second latch 103, MUX 108 and B_I/F 110 at CLK 2 in the second Tc; data at address 4 of the second memory 201 are inputted into MUX 205 by way of the fourth latch 203, and thence latched by the sixth latch 206 at CLK 1 in the second Tc, and finally inputted into the second bus 211 by way of MUX 208 and B_I/F 210 at CLK 2 in the second Tc.

In this way, data at even-numbered addresses of the first memory 101 are inputted into the first bus 111 and those at even-numbered addresses of the second memory 201 into the second bus 211 at CLK 1 in the second and the following Tc's; data at odd-numbered addresses of the first memory 101 are inputted into the first bus 111 and those at the odd-numbered addresses of the second memory 201 into the second bus 211 at CLK 2 in the second and the following Tc's.

As a result, unlike conventional interleaving memories, the interleaving memory of the present invention allows both the memories to output data at contiguous addresses into the first bus 111 and second bus 211 in matching Tc's regardless of data-readout timing, thereby enabling the calculator 112 to carry out arithmetic operations sequentially twice as fast as the non-interleaving memories.

Effects shown in Cases 1-1 to 2-4 have been already known by the conventional interleaving memories; however, they can not realize the effects shown in Cases 3-1 to 4-4. It is the fifth latch 106, sixth latch 206, and the multiplexers under the control of the control unit 114's input and output signals that enable the interleaving memory of the present invention to realize such effects.

(Embodiment II)

Figure 5:
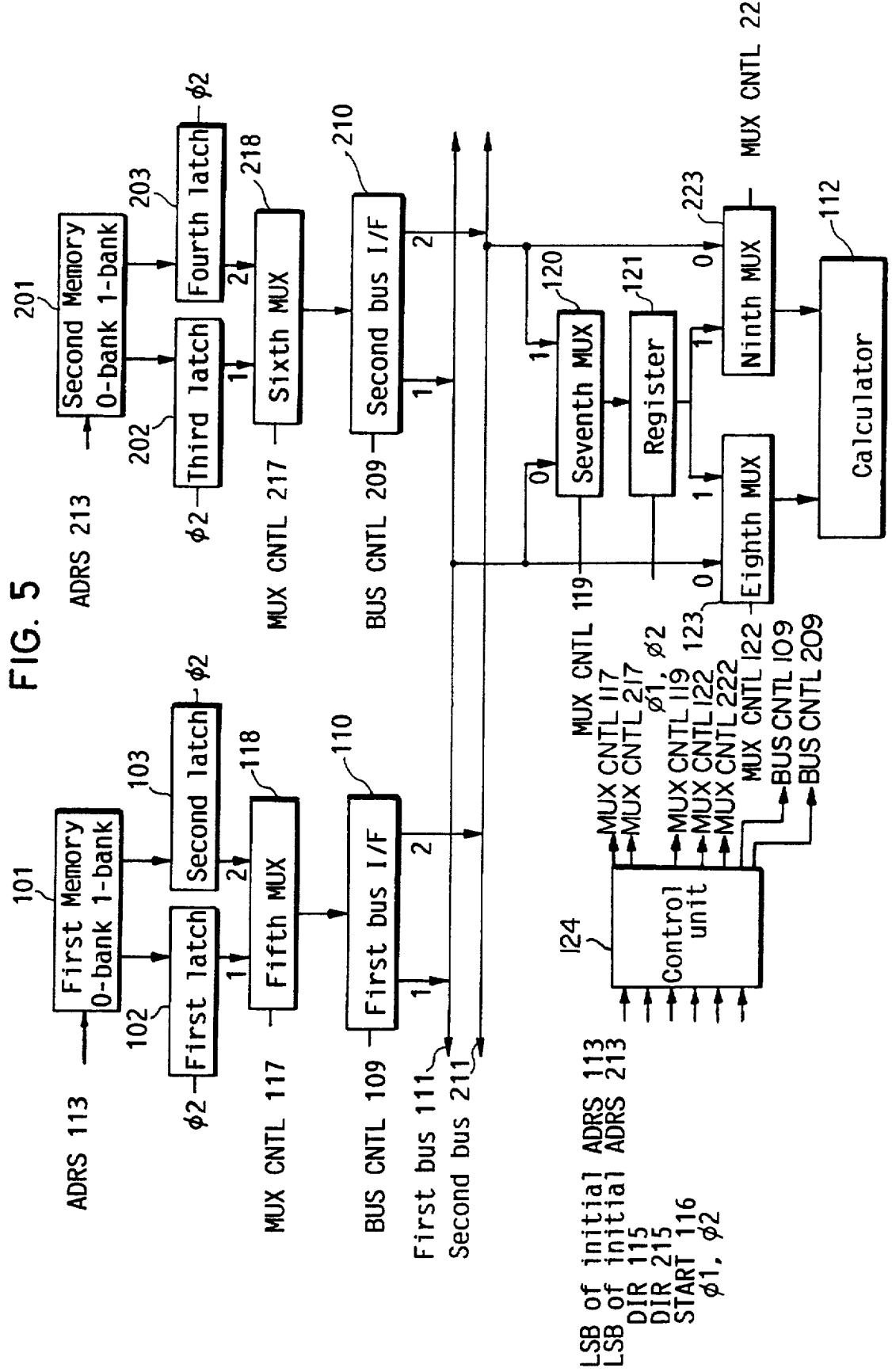
FIG. 5 is a diagram of an interleaving memory in accordance with Embodiment II of the present invention.

The construction of an interleaving memory in accordance with Embodiment II is explained with referring to FIG. 5. In this embodiment, three latches are installed instead of the fifth 106 and sixth latches 206 of Embodiment I. Hereinafter, like components are labeled with like reference numerals with respect to the Embodiment I, and the description of these components is not repeated.

The interleaving memory comprises the following components in addition to the components of Embodiment 1 except the fifth latch 106 and sixth latch 206; a fifth multiplexer 118 (MUX 118) which selects data from either the first latch 102 or second latch 103; a six multiplexer 217 (MUX 217) which selects data from either the third latch 202 or fourth latch 203; a seventh multiplexer 120(MUX 120) which sends data from either the first bus 111 or second bus 211; a register 121 which latches the data from MUX 120 at the rising edges of CLK 1 and CLK 2; an eighth multiplexer 123(MUX 123) which selects data from either the first bus 111, the second bus 211 or the register 121; and a ninth multiplexer 223(MUX 223) which selects data from either the second bus 211 or register 121.

All these components are controlled by the control unit 124 with signals inputted thereinto and outputted therefrom as set forth in Table 3.

TABLE 3

| INPUT/OUTPUT SIGNAL OF CONTROL UNIT 124 | |
|---|---|
| OUTPUT | |
| 1 | Fifth multiplexer controlling signal 117 (MUX CNTL 117) |
| 2 | Sixth multiplexer controlling signal 217 (MUX CNTL 217) |
| 3 | Seventh multiplexer controlling signal 119 (MUX CNTL 119) |
| 4 | Eighth multiplexer controlling signal 122 (MUX CNTL 122) |
| 5 | Ninth multiplexer controlling signal 222 (MUX CNTL 222) |
| 6 | First bus output unit controlling signal 109 (BUS CNTL 109) |
| 7 | Second bus output unit controlling signal 209 (BUS CNTL 209) |
| INPUT | |
| 1 | LSB(Least Significant Bit) of initial ADRS 113 |
| 2 | LSB of initial ADRS 213 |
| 3 | First sequence modifying signal 115(DIR 115) |
| 4 | Second sequence modifying signal 215(DIR 215) |
| 5 | Operation starting signal 116(START 116) |
| 6 | Clocks $\phi 1, \phi 2$ (CLK 1, CLK2) |

The control unit 124 controls the components with these output signals as follows:

1) MUX CNTL 117 controls MUX 118—when it has 1, MUX 118 selects data from the first latch 102, and those from the second latch 103 when 2,
2) MUX CNTL 217 controls MUX 218—when it has 1, MUX 218 selects data from the third latch 202, and those from the fourth latch 203 when 2,
3) MUX CNTL 119 controls MUX 120—when it has 0, MUX 120 selects data from the first bus 111, those from the second bus 211 when 1,
4) MUX CNTL 122 controls MUX 123—when it has 0, MUX 123 selects data from the first bus 111, those from the register 121 when 1,
5) MUX CNTL 222 controls MUX 223—when it has 0, MUX 223 selects data from the second bus 211, those from the register 121 when 1,
6) BUS CNTL 109 controls B_I/F 110—when it has 0, B_I/F 110 outputs data to neither buses, to the first bus 111 when 1, and to the second bus 211 when 2,
7) BUS CNTL 209 controls B_I/F 210—when it has 0, B_I/F 210 outputs data to neither buses, to the first bus 111 when 1, and to the second bus 211 when 2.

As well, the control unit 124 controls the components with these input signals in the same manner as explained in Embodiment I.

As well, the arithmetic operations are divided into 4 cases and each case is further divided into 4 sub-cases in the same manner as was explained in Embodiment I, which is set forth in Table 4.

TABLE 4

| Case # | Starting Address | | Modifying Direction | | Read out timing |
|---|---|---|---|---|---|
| | Memory 101 | Memory 201 | ADRS 113 | ADRS 213 | |
| 5 - 1 | 2 | 2 | + | + | Same Tc |
| - 2 | 5 | 5 | − | − | |
| - 3 | 2 | 5 | + | − | |
| - 4 | 5 | 2 | − | + | |
| 6 - 1 | 3 | 3 | + | + | Same Tc |
| - 2 | 4 | 4 | − | − | |
| - 3 | 3 | 4 | + | − | |
| - 4 | 4 | 3 | − | + | |
| 7 - 1 | 2 | 3 | + | + | Data fm 201 lag 1 Tc |
| - 2 | 5 | 4 | − | − | |
| - 3 | 2 | 4 | + | − | |
| - 4 | 5 | 3 | − | + | |
| 8 - 1 | 3 | 2 | + | + | Data fm 101 lag 1 Tc |
| - 2 | 4 | 5 | − | − | |
| - 3 | 3 | 5 | + | − | |
| - 4 | 4 | 2 | − | + | |

(+ : increment  − : decrement)

Since particulars of the control unit 124's input/output signals for Cases 5-1 to 6-4 in FIGS. 27 and 28, and data-output timing thereof are identical to those for Cases 1-1 to 2-4 in FIGS. 11–18 respectively, the explanation thereof are not repeated herein.

However, it should be added that the data inputted into the first bus 111 and second bus 211 are further inputted into the calculator 112 by way of MUX 123 and MUX 223 with MUX CNTL 122 and MUX CNTL 222 having 0's respectively in Cases 5-1 to 6-4.

(CASE 7)

In this case, the calculator 112 carries out the arithmetic operations of data read out from each memory in different Tc's: data from the second memory 201 are read out 1 Tc behind.

Figure 31:
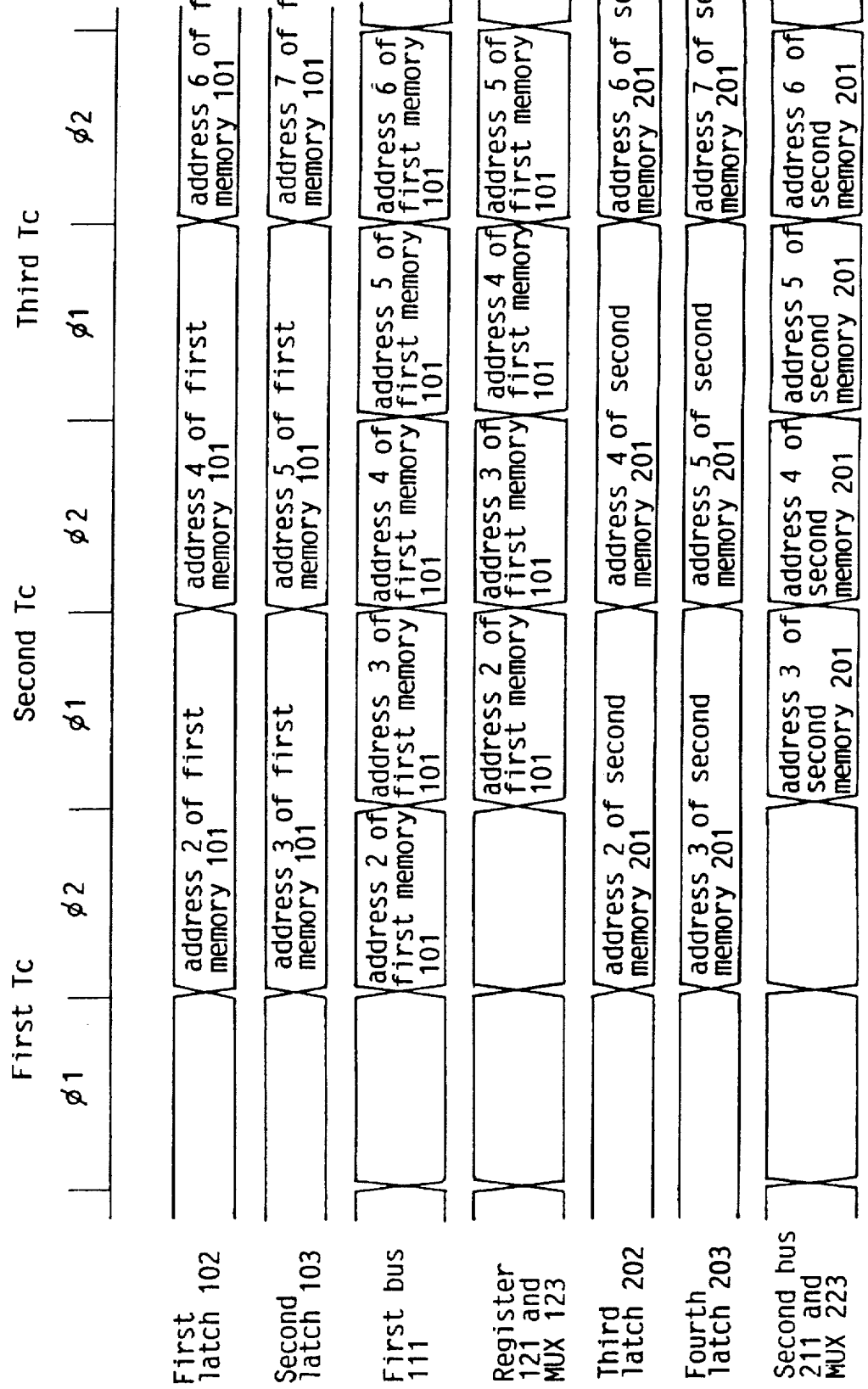
FIG. 31 is a view showing data-output timing in Case 7-1 of Embodiment II.

(7-1) This is the case when the starting address of the first memory 101 has an even-number and that of the second memory 201 has an odd-number, and both ADRS 113 and ADRS 213 are incremented by 2 at the rising edge of CLK 1 by an unillustrated addressing unit. Particulars of the input/output signals and data-output timing hereof are shown in FIGS. 29 and 31 respectively.

Let the starting address of the first memory 101 be address 2 and that of the second memory 201 be address 3, then the initial ADRS 113 has 2 with 0-LSB while the initial ADRS 213 has 3 with 1-LSB. Thus, data at address 2 of the 0-bank of the first memory 101 and those at address 3 of the 1-bank of the second memory 201, and those at the following address 3 of the 1-bank of the first memory 101 and the preceding address 2 of the 0-bank of the second memory 201 are read out in the first Tc. Then, at the timing of CLK 2 in the first Tc, the data at address 2 and address 3 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 124 receives LSB of the initial ADRS 113 having 0 and LSB of the initial ADRS 213 having 1, and DIR 115 and DIR 215 having 0's. Then, the control unit 124 outputs MUX CNTL 117 and MUX CNTL 217 having 2's at CLK 1, and 1's at CLK 2 in every Tc; BUS CNTL 109 having 0 at CLK 1 in the first Tc, and 1 at CLK 2 in the first Tc and afterwards; BUS CNTL 209 having 0 in the first Tc, and 2 in the second Tc and afterwards. As well, it outputs MUX CNTL 119 having 0, MUX CNTL 122 having 1, and MUX CNTL 222 having 0.

Under the control of the control unit 124 with these signals, data at address 2 of the first memory 101 are inputted into the first bus 111 by way of the first latch 102, MUX 118, and B_I/F 110 at the timing of CLK 2 in the first Tc, and those at address 3 thereof are inputted into the first bus 111 by way of the second latch 103, MUX 118, and B_I/F 110 at the timing of CLK 1 in the second Tc. With MUX CNTL 119 and MUX CNTL 122, data at address 2 and address 3 inputted sequentially into the first bus 111 are further inputted into MUX 120, and thence into the register 121 to delay the output thereof for ½ Tc, and finally into the calculator 112 by way of MUX 123 at CLK 1 and CLK 2 in the second Tc respectively.

On the other hand, data at address 2 of the second memory 201 are inputted into neither the first bus 111 nor second bus 211; data at address 3 of the second memory 201 are inputted into the second bus 211 by way of the fourth latch 203, MUX 218, and B_I/F 210 at the timing of CLK 1 in the second Tc, and those at address 4 thereof, which have been read out in the second Tc, are inputted into the second bus 211 by way of the third latch 202, MUX 218, and B_I/F 210 at the timing of CLK 2 in the second Tc. With MUX CNTL 222, data at addresses 3 and 4 inputted sequentially into the second bus 211 are further inputted into the calculator 112 by way of MUX 223 at CLK 1 and CLK 2 in the second Tc respectively.

In this way, data at even-numbered addresses and odd-numbered addresses of the first memory 101 are inputted into the first bus 111 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively; data at the odd-numbered addresses and even-numbered addresses of the second memory 201 are inputted into the calculator 112 at CLK 1 and CLK 2 respectively in the second and the following Tc's.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

Figure 32:
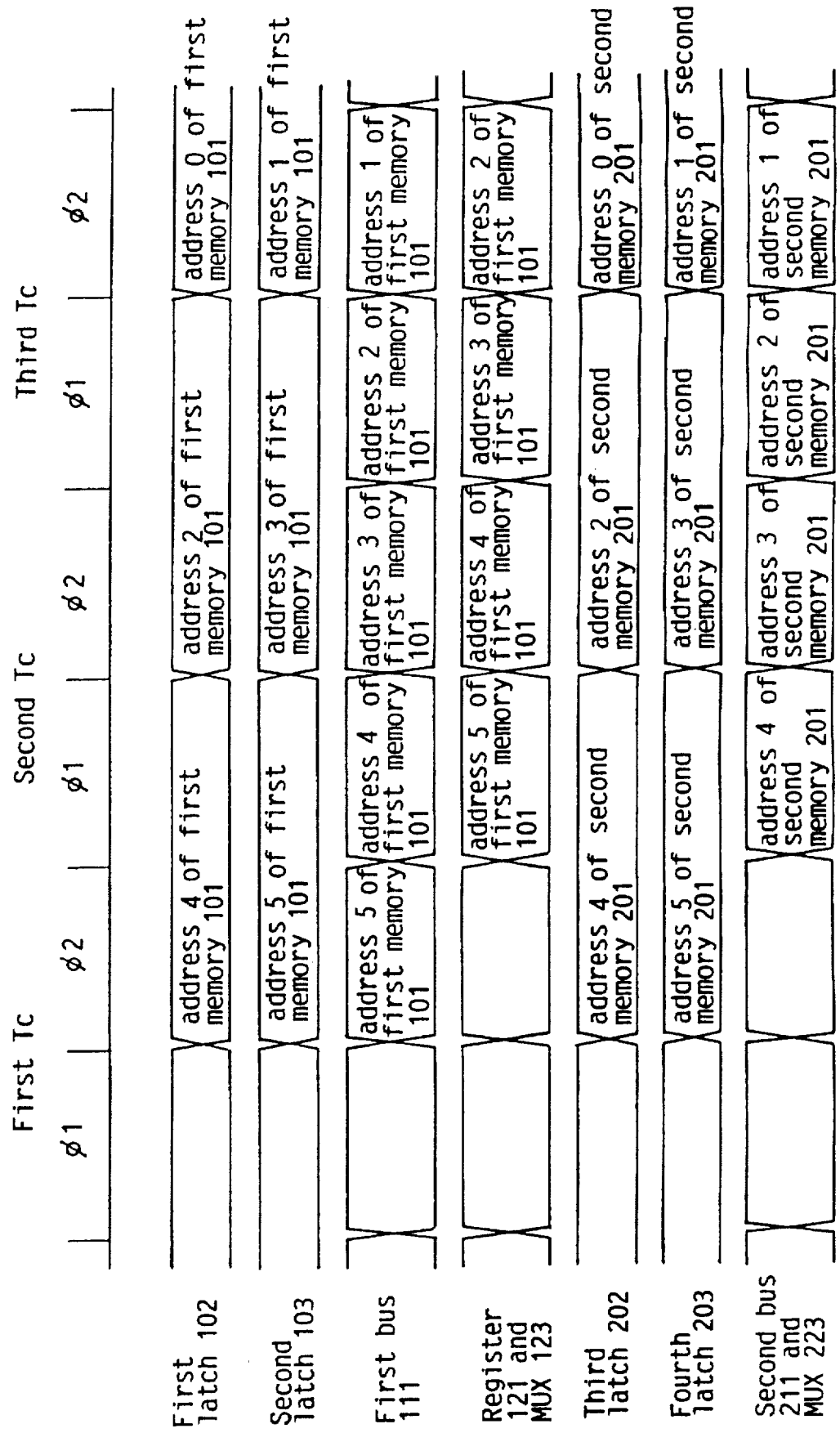
FIG. 32 is a view showing data-output timing in Case 7-2 of Embodiment II.

(7-2) This is the case when the starting address of the first memory 101 has an odd-number and that of the second memory 201 has an even-number, and both ADRS 113 and ADRS 213 are decremented by 2 at the rising edge of CLK 1 by the unillustrated addressing unit. Particulars of the input/output signals and data-output timing hereof are shown in FIGS. 29 and 32 respectively.

Let the starting address of the first memory 101 be address 5 and that of the second memory 201 be address 4, then the initial ADRS 113 has 5 with 1-LSB while the initial ADRS 213 has 4 with 0-LSB. Thus, data at address 5 of the 1-bank of the first memory 101 and those at address 4 of the 0-bank of the second memory 201, and those at the following address 4 of the 0-bank of the first memory 101 and the preceding address 5 of the 1-bank of the second memory 201 are read out in the first Tc. Then, at the timing of CLK 2 in the first Tc, the data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 124 receives LSB of the initial ADRS 113 having 1 and LSB of the initial ADRS 213 having 0, and DIR 115 and DIR 215 having 1's. Then, the control unit 124 outputs MUX CNTL 117 and MUX CNTL 217 having 1's at CLK 1 and having 2's at CLK 2 in every Tc; BUS CNTL 109 having 0 at CLK 1 in the first Tc, and 1 at CLK 2 in the first Tc and afterwards; BUS CNTL 209 having 0 in the first Tc, and 2 in the second Tc and afterwards. As well, it outputs MUX CNTL 119 having 0, MUX CNTL 122 having 1, and MUX CNTL 222 having 0.

Under the control of the control unit 124 with these signals, data at address 5 of the first memory 101 are inputted into the first bus 111 by way of the second latch 103, MUX 118, and B__I/F 110 at the timing of CLK 2 in the first Tc, while data at address 4 thereof are inputted into the first bus 111 by way of the first latch 102, MUX 118, and B__I/F 110 at the timing of CLK 1 in the second Tc. With MUX CNTL 119 and MUX CNTL 122, data at address 5 and address 4 inputted sequentially into the first bus 111 are further inputted into MUX 120, and thence into the register 121 to delay the output thereof for ½ Tc, and finally into the calculator 112 by way of MUX 123 at CLK 1 and CLK 2 in the second Tc respectively.

On the other hand, data at address 5 of the second memory 201 are inputted into neither the first bus 111 nor second bus 211; data at address 4 of the second memory 201 are inputted into the second bus 211 by way of the third latch 202, MUX 218, and B__I/F 210 at the timing of CLK 1 in the second Tc, and those at address 3 thereof, which have been read out in the second Tc, are inputted into the second bus 211 by way of the fourth latch 203, MUX 218, and B__I/F 210 at the timing of CLK 2 in the second Tc. With MUX CNTL 222, data at address 4 and address 3 inputted sequentially into the.second bus 211 are further inputted into the calculator 112 by way of MUX 223 at CLK 1 and CLK 2 in the second Tc respectively.

In this way, data at odd-numbered addresses and even-numbered addresses of the first memory 101 are inputted into the first bus 111 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively; data at the even-numbered addresses and odd-numbered addresses of the second memory 201 are inputted into the calculator 112 at CLK 1 and CLK 2 respectively in the second and the following Tc's.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

Figure 33:
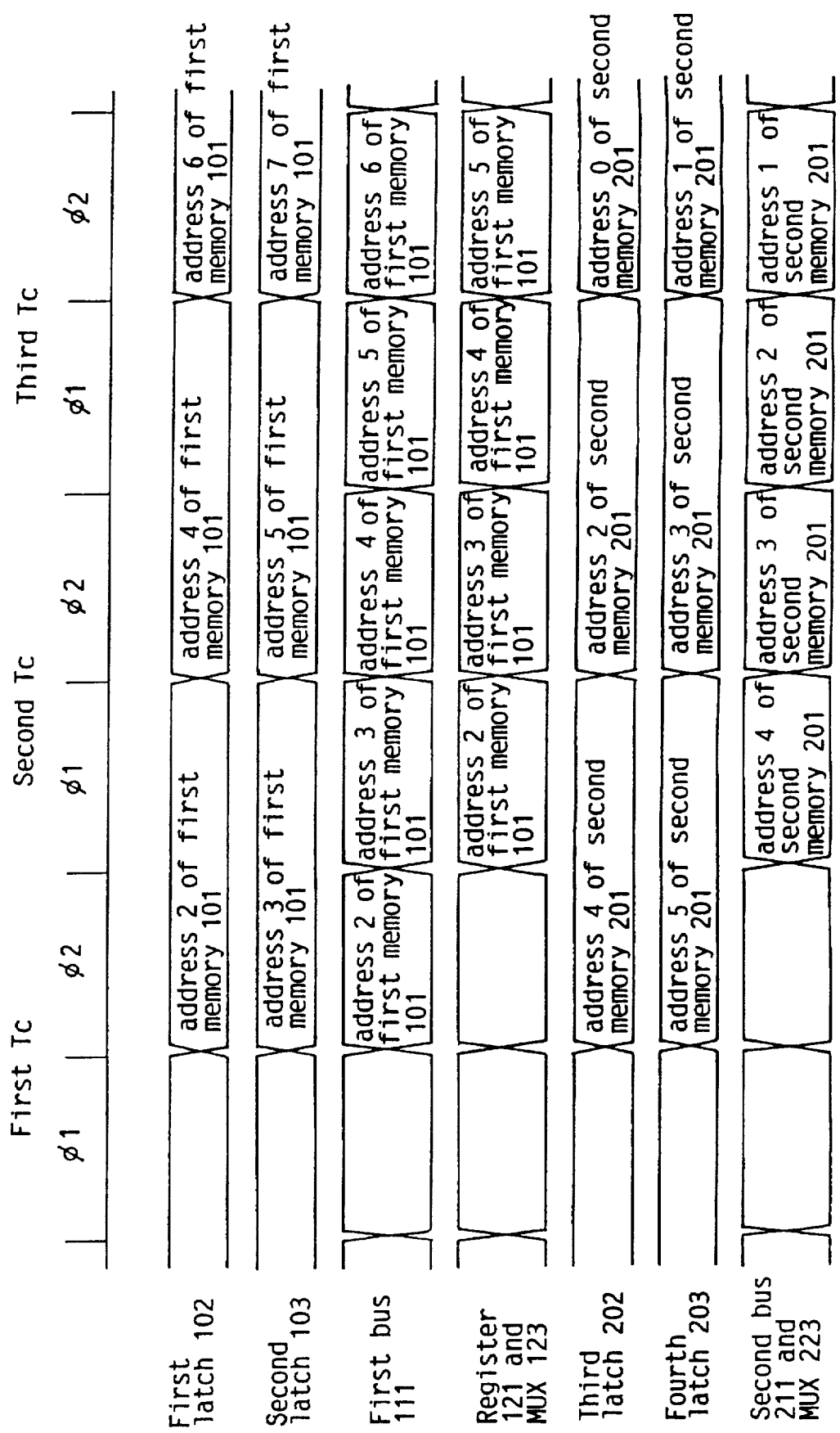
FIG. 33 is a view showing data-output timing in Case 7-3 of Embodiment II.

(7-3) This is the case when the starting addresses of both the memories have even-numbers, and ADRS 113 is incremented while ADRS 213 decremented by 2 at the rising edge of CLK 1 by the unillustrated addressing unit. Particulars of the input/output signals and data-output timing hereof are shown in FIGS. 29 and 33 respectively.

Let the starting address of the first memory 101 be address 2 and that of the second memory 201 be address 4, then the initial ADRS 113 has 2 while the initial ADRS 213 has 4 with 0-LSB's. Thus, data at address 2 of the 0-bank of the first memory 101 and those at address 4 of the 0-bank of the second memory 201, and those at the following address 3 of the 1-bank of the first memory 101 and the preceding address 5 of the 1-bank of the second memory 201 are read out in the first Tc. Then, at the timing of CLK 2 in the first Tc, data at address 2 and address 3 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 124 receives LSB's of the initial ADRS 113 and ADRS 213 having 0's, and DIR 115 having 0 and DIR 215 having 1. Then, the control unit 124 outputs MUX CNTL 117 having 2 and MUX CNTL 217 having 1 at CLK 1, and respectively 1 and 2 at CLK 2 in every Tc; BUS CNTL 109 having 0 at CLK 1 in the first Tc, and 1 at CLK 2 in the second Tc and afterwards; BUS CNTL 209 having 0 in the first Tc, and 2 in the second Tc and afterwards. As well, it outputs MUX CNTL 119 having 0, MUX CNTL 122 having 1, and MUX CNTL 222 having 0.

Under the control of the control unit 124 with these signals, data at address 2 of the first memory 101 are inputted into the first bus 111 by way of the first latch 102, MUX 118, and B__I/F 110 at the timing of CLK 2 in the first Tc, while data at address 3 thereof are inputted into the first bus 111 by way of the second latch 103, MUX 118, and B__I/F 110 at the timing of CLK 1 in the second Tc. With MUX CNTL 119 and MUX CNTL 122, data at address 2 and address 3 inputted sequentially into the first bus 111 are further inputted into MUX 120, and thence into the register 121 to delay the output thereof for ½ Tc, and finally into the calculator 112 by way of MUX 123 at CLK 1 and CLK 2 in the second Tc respectively.

On the other hand, data at address 5 of the second memory 201 are inputted into neither the first bus 111 nor second bus 211; data at address 4 of the second memory 201 are inputted into the second bus 211 by way of the third latch 202, MUX 218, and B__I/F 210 at the timing of CLK 1 in the second Tc, and data at address 3 thereof, which have been read out in the second Tc, are inputted into the second bus 211 by way of the fourth latch 203, MUX 218, and B__I/F 210 at the timing of CLK 2 in the second Tc. With MUX CNTL 222, data at address 4 and address 3 inputted sequentially into the second bus 211 are further inputted into the calculator 112 by way of MUX 223 at CLK 1 and CLK 2 in the second Tc respectively.

In this way, data at even-numbered addresses and odd-numbered addresses of the first memory 101 are inputted into the first bus 111 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively; data at even-numbered addresses and odd-numbered addresses of the second memory 201 are inputted into the calculator 112 at CLK 1 and CLK 2 respectively in the second and the following Tc's.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

Figure 34:
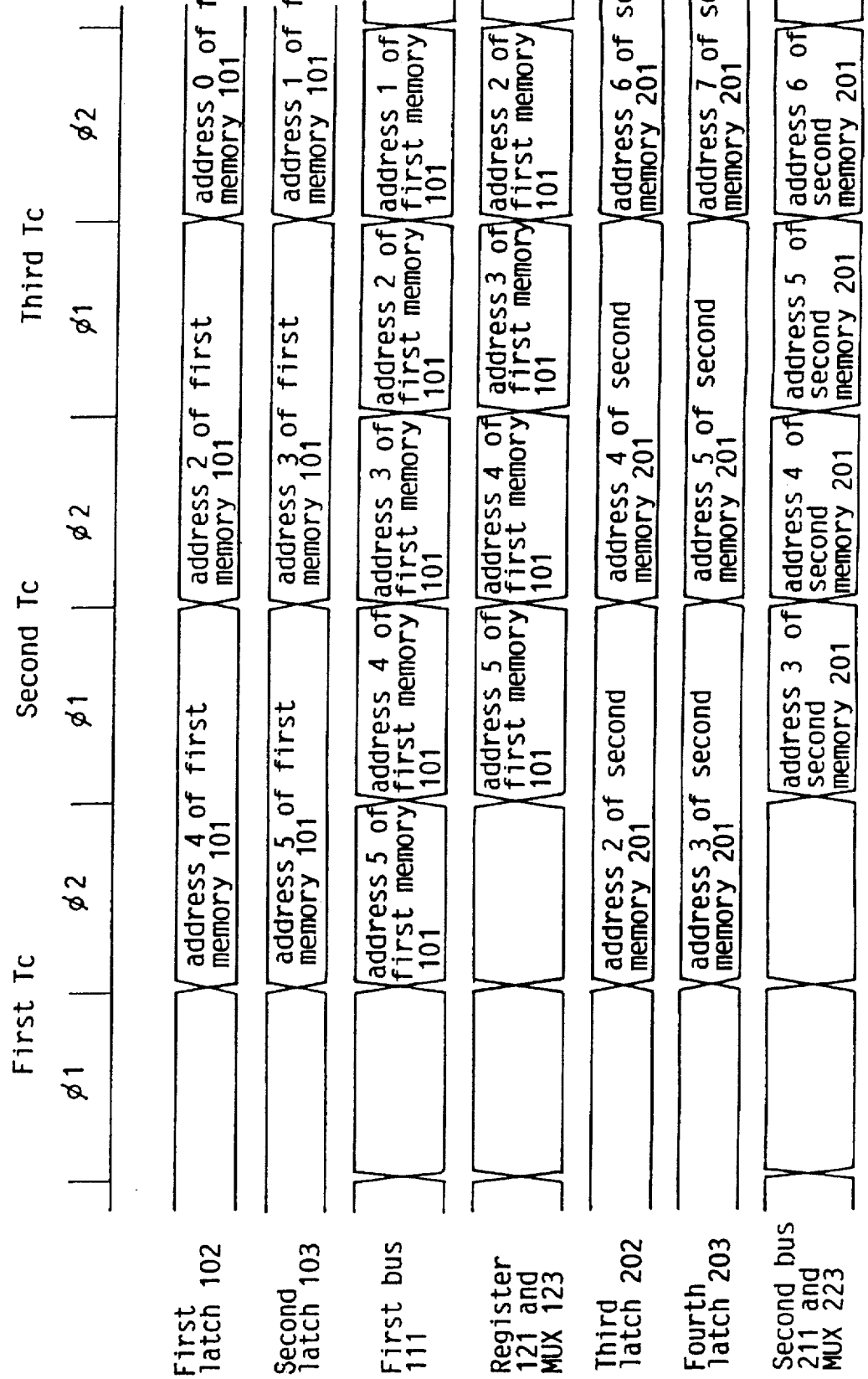
FIG. 34 is a view showing data-output timing in Case 7-4 of Embodiment II.

(7-4) This is the case when the starting addresses of both the memories have odd-numbers, and ADRS 113 is decremented while ADRS 213 incremented by 2 at the rising edge of CLK 1 by the unillustrated addressing unit. Particulars of the input/output signals and data-output timing hereof are shown in FIGS. 29 and 34 respectively.

Let the starting address of the first memory 101 be address 5 and that of the second memory 201 be address 3, then the initial ADRS 113 has 5 and the initial ADRS 213 has 3 with 1-LSB's. Thus, data at address 5 of the 1-bank of the first memory 101 and those at address 3 of the 1-bank of the second memory 201, and those at the following address 4 of the 0-bank of the first memory 101 and the preceding address 2 of the 0-bank of the second memory 201 are read out in the first Tc. Then, at the timing of CLK 2 in the first Tc, data at address 4 and address 5 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 124 receives LSB's of the initial ADRS 113 and ADRS 213 having 1's, and DIR 115 having 1 and DIR 215 having 0. Then, the control unit 124 outputs MUX CNTL 117 having 1 and MUX CNTL 217 having 2 at CLK 1, and respectively 2 and 1 at CLK 2 in every Tc; BUS CNTL 109 having 0 at CLK 1 in the first Tc, and 1 at CLK 2 in the first Tc and afterwards; BUS CNTL 209 having 0 in the first Tc, and 2 in the second Tc and afterwards. As well, it outputs MUX CNTL 119 having 0, MUX CNTL 122 having 1, and MUX CNTL 222 having 0.

Under the control of the control unit 124 with these signals, data at address 5 of the first memory 101 are inputted into the first bus 111 by way of the second latch 103, MUX 118, and B_I/F 110 at the timing of CLK 2 in the first Tc, while data at address 4 thereof are inputted into the first bus 111 by way of the first latch 102, MUX 118, and B_I/F 110 at the timing of CLK 1 in the second Tc. With MUX CNTL 119 and MUX CNTL 122, data at address 5 and address 4 inputted sequentially into the first bus 111 are further inputted into MUX 120, and thence into the register 121 to delay the output thereof for ½ Tc, and finally into the calculator 112 by way of MUX 123 at CLK 1 and CLK 2 in the second Tc respectively.

On the other hand, data at address 2 of the second memory 201 are inputted into neither the first bus 111 nor second bus 211; data at address 3 of the second memory 201 are inputted into the second bus 211 by way of the fourth latch 203, MUX 218, and B_I/F 210 at the timing of CLK 1 in the second Tc, and data at address 4 thereof, which have been read out in the second Tc, are inputted into the second bus 211 by way of the third latch 202, MUX 218, and B_I/F 210 at the timing of CLK 2 in the second Tc. With MUX CNTL 222, data at address 3 and address 4 inputted into the second bus 211 are further inputted into the calculator 112 by way of MUX 223 at CLK 1 and CLK 2 in the second Tc respectively.

In this way, data at odd-numbered addresses and even-numbered addresses of the first memory 101 are inputted into the first bus 111 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively; data at odd-numbered addresses and even-numbered addresses of the second memory 201 are inputted into the calculator 112 at CLK 1 and CLK 2 respectively in the second and the following Tc's.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

(CASE 8)

In this case, the calculator 112 carries out the arithmetic operations of data read out from each memory in different Tc's: data from the first memory 101 are read out 1 Tc behind.

Figure 35:
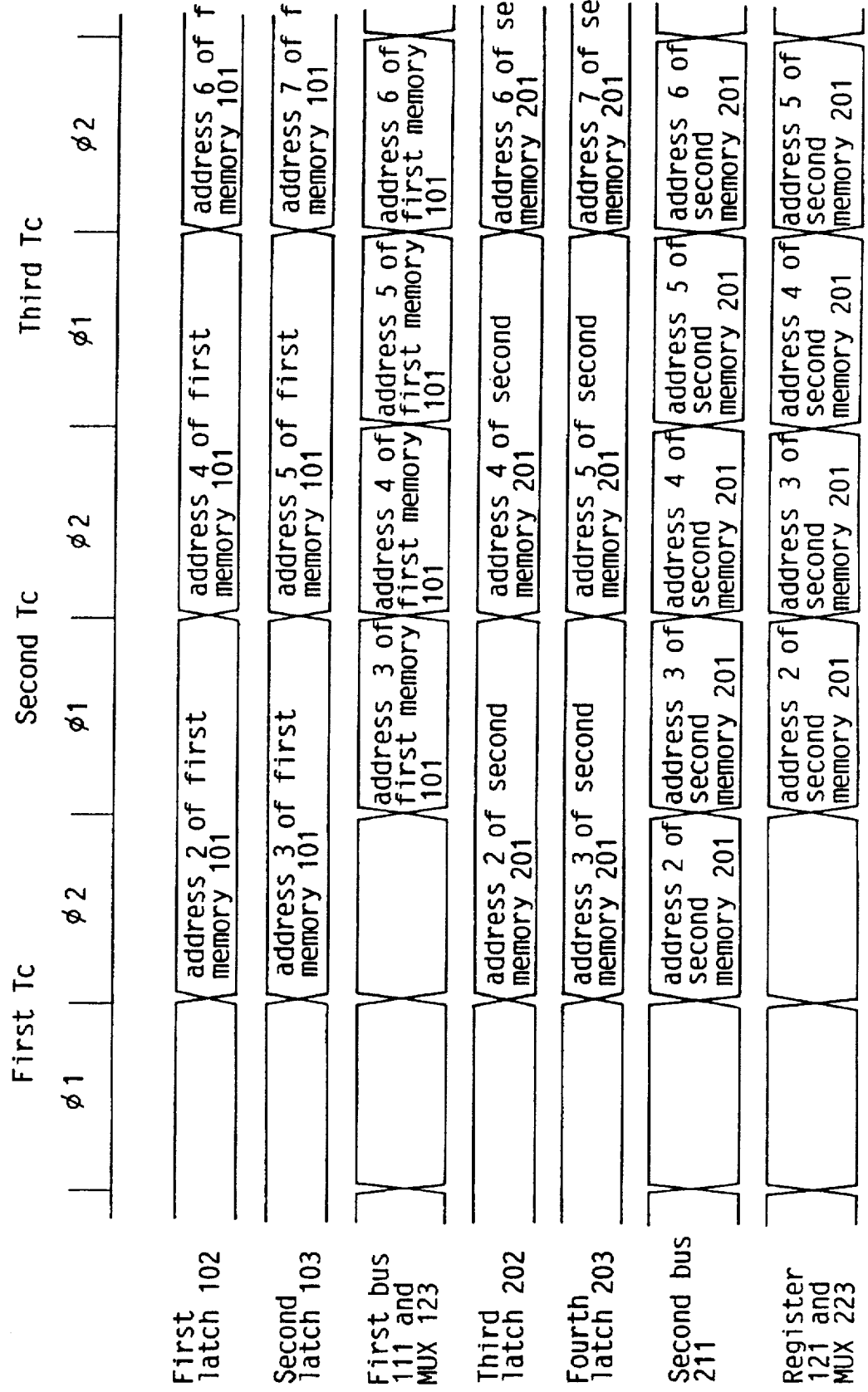
FIG. 35 is a view showing data-output timing in Case 8-1 of Embodiment II.

(8-1) This is the case when the starting address of the first memory 101 has an odd-number and that of the second memory 201 has an even-number, and both ADRS 113 and ADRS 213 are incremented by 2 at the rising edge of CLK 1 by the unillustrated addressing unit. Particulars of the input/output signals and data-output timing hereof are shown in FIGS. 30 and 35 respectively.

Let the starting address of the first memory 101 be address 3 and that of the second memory 201 be address 2, then the initial ADRS 113 has 3 with 1-LSB while the initial ADRS 213 has 2 with 0-LSB. Thus, data at address 3 of the 1-bank of the first memory 101 and those at address 2 of the 0-bank of the second memory 201, and those at the preceding address 2 of the 0-bank of the first memory 101 and the those at following address 3 of the 1-bank of the second memory 201 are read out in the first Tc. Then, at the timing of CLK 2 in the first Tc, data at address 2 and address 3 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 124 receives LSB of the initial ADRS 113 having 1, and LSB of the initial ADRS 213 having 0, and DIR 115 and DIR 215 having 0's. Then, the control unit 124 outputs MUX CNTL 117 and MUX CNTL 217 having 2's at CLK 1, and 1's at CLK 2 in the first and following Tc's; BUS CNTL 109 having 0 in the first Tc, and 1 in the second Tc and afterwards; BUS CNTL 209 having 0 at CLK 1 in the first Tc, and 2 at CLK 2 in the first Tc and afterwards. As well, it outputs MUX CNTL 119 having 1, MUX CNTL 122 having 0, and MUX CNTL 222 having 1.

Under the control of the control unit 124 with these signals, data at address 2 of the first memory 101 are inputted into neither the first bus 111 nor second bus 211; data at address 3 thereof are inputted into the first bus 111 by way of the second latch 103, MUX 118, and B_I/F 110 at the timing of CLK 1 in the second Tc, while those at address 4 thereof, which have been read out in the second Tc, are inputted into the first bus 111 by way of the first latch 102, MUX 118, and B_I/F 110 at the timing of CLK 2 in the second Tc. With MUX CNTL 122, data at address 3 and address 4 inputted sequentially into the first bus 111 are further inputted into the calculator 112 by way of MUX 123 at CLK 1 and CLK 2 in the second Tc respectively.

On the other hand, data at address 2 of the second memory 201 are inputted into the second bus 211 by way of the third latch 202, MUX 218, and B__I/F 210 at the timing of CLK 2 in the first Tc, while data at address 3 thereof are inputted into the second bus 211 by way of the fourth latch 203, MUX 218, and B__I/F 210 at the timing of CLK 1 in the second Tc. With MUX CNTL 119 and MUX CNTL 222, data at address 2 and address 3 inputted sequentially into the second bus 211 are further inputted into MUX 120, and thence into the register 121 to delay the output thereof for ½ Tc, and finally inputted into the calculator 112 by way of MUX 223 at CLK 1 and CLK 2 in the second Tc respectively.

In this way, data at odd-numbered addresses and even-numbered addresses of the first memory 101 are inputted into the first bus 111 and further into the calculator 112 at CLK 1 and CLK 2 in the second Tc and the following Tc's respectively; data at even-numbered addresses and odd-numbered addresses of the second memory 201 are inputted into the second bus 211 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

Figure 36:
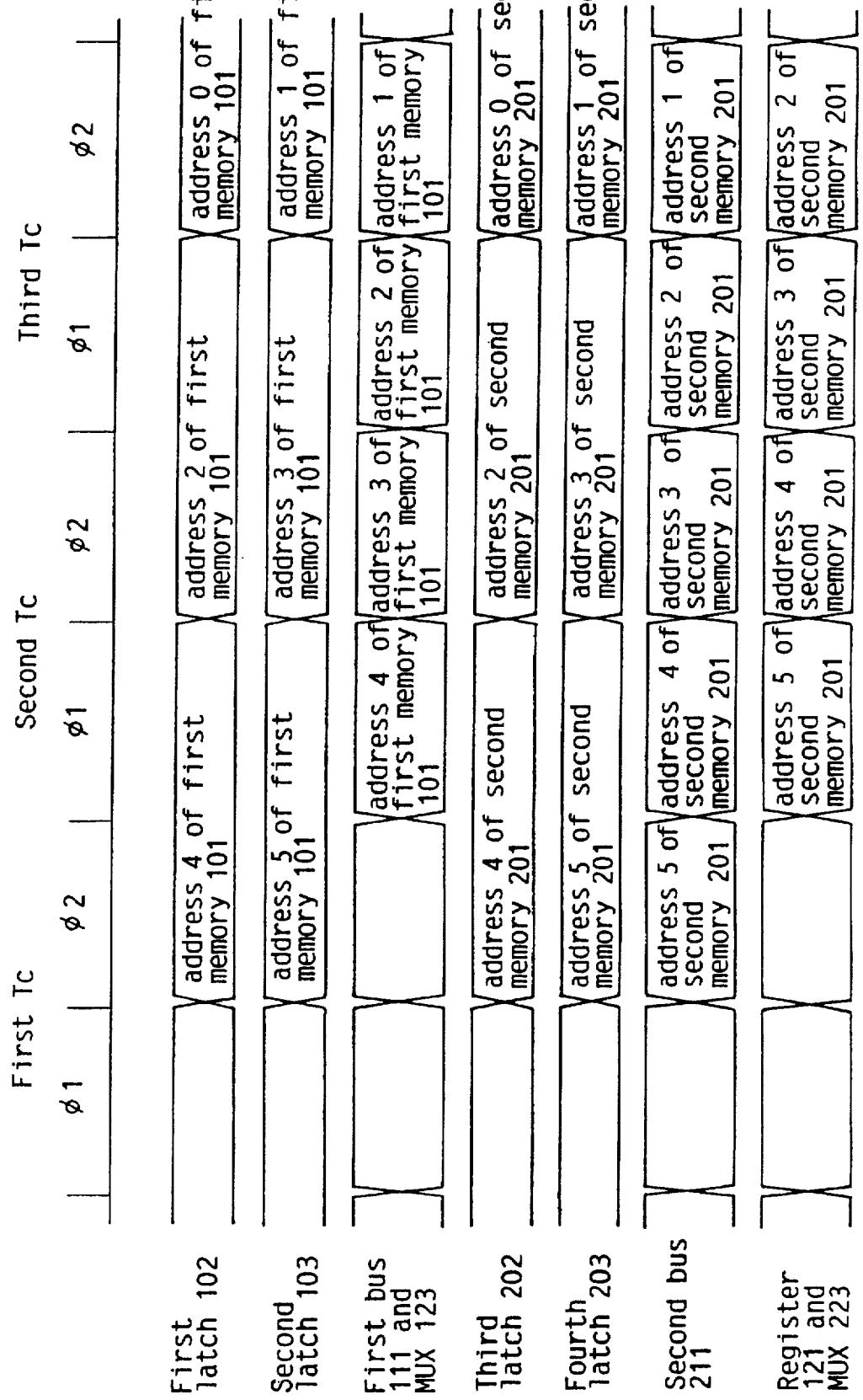
FIG. 36 is a view showing data-output timing in Case 8-2 of Embodiment II.

(8-2) This is the case when the starting address of the first memory 101 has an even-number and that of the second memory 201 has an odd-number, and both ADRS 113 and ADRS 213 are decremented by 2 at the rising edge of CLK 1 by the unillustrated addressing unit. Particulars of the input/output signals and data-output timing hereof are shown in FIGS. 30 and 36 respectively.

Let the starting address of the first memory 101 be address 4 and that of the second memory 201 be address 5, then the initial ADRS 113 has 4 with 0-LSB while the initial ADRS 213 has 5 with 1-LSB. Thus, data at address 4 of the 0-bank of the first memory 101 and those at address 5 of the 1-bank of the second memory 201, and those at the preceding address 5 of the 1-bank of the first memory 101 and the following address 4 of the 0-bank of the second memory 201 are read out in the first Tc. Then, at the timing of CLK 2 in the first Tc, the data at address 4 and address 5 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 124 receives LSB of the initial ADRS 113 having 0 and LSB of the initial ADRS 213 having 1, and DIR 115 and DIR 215 having 1's. Then, the control unit 124 outputs MUX CNTL 117 and MUX CNTL 217 having 1's at CLK 1, and having 2's at CLK 2 in every Tc; BUS CNTL 109 having 0 in the first Tc, and 1 in the second Tc and afterwards; BUS CNTL 209 having 0 at CLK 1 in the first Tc, and 2 at CLK 2 in the first Tc and afterwards. As well, it outputs MUX CNTL 119 having 1, MUX CNTL 122 having 0, and MUX CNTL 222 having 1 at the first Tc and afterwards.

Under the control of the control unit 124 with these signals, data at address 5 of the first memory 101 are inputted into neither the first bus 111 nor second bus 211; data at address 4 thereof are inputted into the first bus 111 by way of the first latch 102, MUX 118, and B__I/F 110 at the timing of CLK 1 in the second Tc, while those at address 3 thereof, which have been read out in the second Tc, are inputted into the first bus 111 by way of the second latch 103, MUX 118, and B__I/F 110 at the timing of CLK 2 in the second Tc. With MUX CNTL 122, data at address 4 and address 3 inputted sequentially into the first bus 111 are further inputted into the calculator 112 by way of MUX 123 at CLK 1 and CLK 2 in the second Tc respectively.

On the other hand, data at address 5 of the second memory 201 are inputted into the second bus 211 by way of the fourth latch 203, MUX 218, and B__I/F 210 at the timing of CLK 2 in the first Tc, while data at address 4 thereof are inputted into the second bus 211 by way of the third latch 202, MUX 218, and B__I/F 210 at the timing of CLK 1 in the second Tc. With MUX CNTL 119 and MUX CNTL 222, data at address 5 and address 4 inputted sequentially into the second bus 211 are further inputted into MUX 120, and thence into the register 121 to delay the output thereof for ½ Tc, and finally inputted into the calculator 112 by way of MUX 223 at CLK 1 and CLK 2 in the second Tc respectively.

In this way, data at even-numbered addresses and odd-numbered addresses of the first memory 101 are inputted into the first bus 111 and further into the calculator 112 at CLK 1 and CLK 2 in the second Tc and the following Tc's respectively; data at odd-numbered addresses and even-numbered addresses of the second memory 201 are inputted into the second bus 211 at CLK 2 and CLK 1 in the first and second Tc's and the following Tc's respectively, further into the register 121 to delay the output thereof for ½ Tc, and finally into the calculator 112 at CLK 1 and CLK 2 in the second and the following Tc's respectively.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

Figure 37:
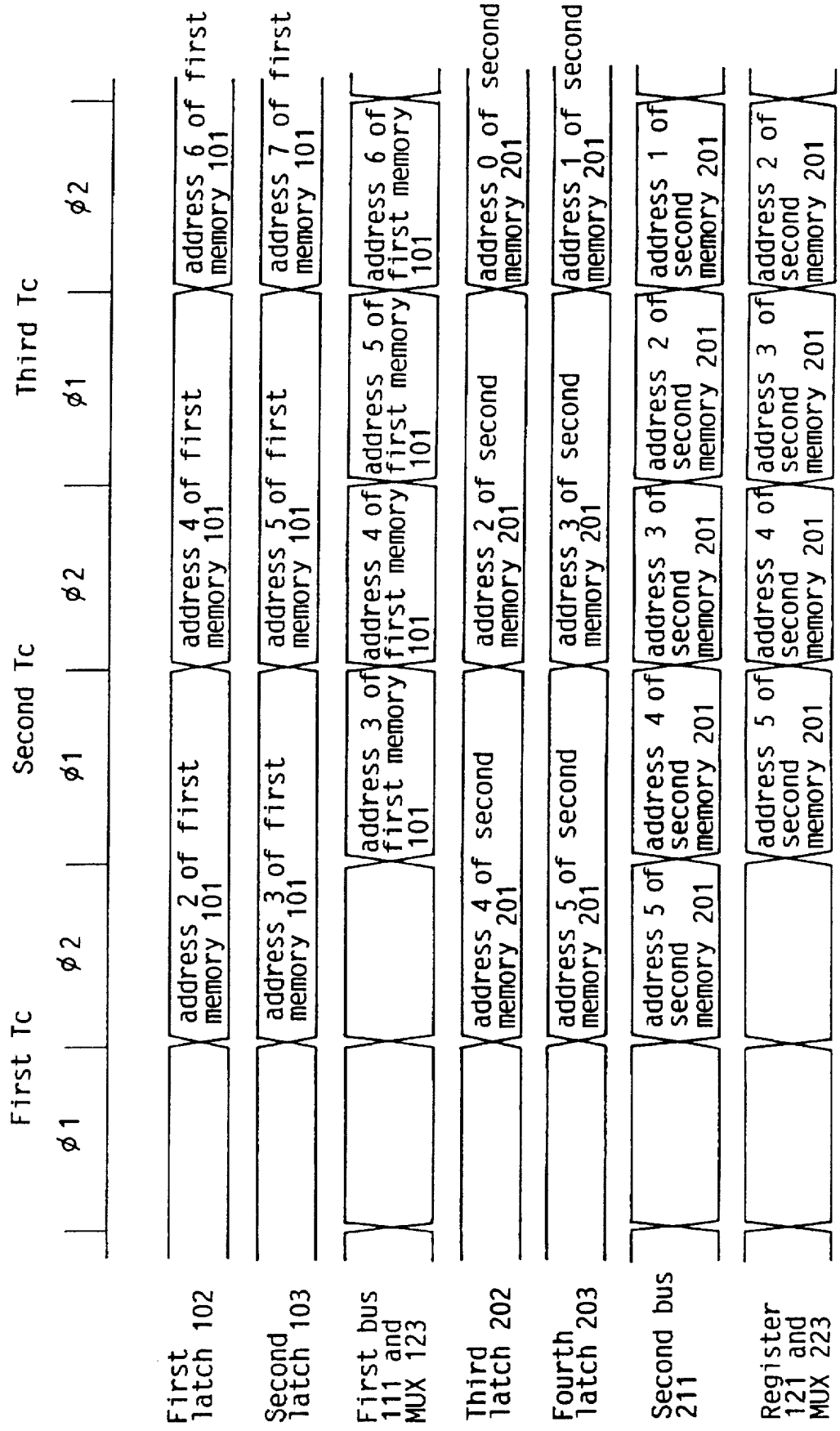
FIG. 37 is a view showing data-output timing in Case 8-3 of Embodiment II.

(8-3) This is the case when the starting addresses of the first memory 101 and the second memory 201 have odd-numbers, and ADRS 113 is incremented and ADRS 213 are decremented by 2 at the rising edge of CLK 1 by the unillustrated addressing unit. Particulars of the input/output signals and data-output timing hereof are shown in FIGS. 30 and 37.

Let the starting address of the first memory 101 be address 3 and that of the second memory 201 be address 5, then the initial ADRS 113 has 3 and the initial ADRS 213 has 5 with 1-LSB's. Thus, data at address 3 of the 1-bank of the first memory 101 and those at address 5 of the 1-bank of the second memory 201, and those at the preceding address 2 of the 0-bank of the first memory 101 and the following address 4 of the 0-bank of the second memory 201 are read out in the first Tc. Then, at the timing of CLK 2 in the first Tc, the data at address 4 and address 3 of the first memory 101 are latched by the first latch 102 and second latch 103 respectively, while those at address 4 and address 5 of the second memory 201 are done so by the third latch 202 and fourth latch 203 respectively.

In the meantime, START 116 turns to 1, and the control unit 124 receives LSB's of ADRS 113 and ADRS 213 having 1's, and DIR 115 having 0 and DIR 215 having 1. Then, the control unit 124 outputs MUX CNTL 117 having 2 and MUX CNTL 217 having 1 at CLK 1, and 1 and 2 at CLK 2 in the first and following Tc's; BUS CNTL 109 having 0 in the first Tc, and 1 in the first Tc and afterwards; BUS CNTL 209 having 0 at CLK 1 in the first Tc, and 2 at CLK 2 in-the second Tc and afterwards. As well, it outputs MUX CNTL 119 having 1, MUX CNTL 122 having 0, and MUX CNTL 222 having 1.

Under the control of the control unit 124 with these signals, data at address 2 of the first memory 101 are inputted into neither the first bus 111 nor second bus 211; data at address 3 thereof are inputted into the first bus 111 by way of the second latch 103, MUX 118, and B__I/F 110 at the timing of CLK 1 in the second Tc, while data at address 4 thereof, which have been read out in the second Tc, are inputted into the first bus 111 by way of the first latch 102, MUX 118, and B__I/F 110 at the timing of CLK 2 in the second Tc. With MUX CNTL 122, data at address 3 and address 4 inputted sequentially into the first bus 111 are further inputted into the calculator 112 by way of MUX 123 at CLK 1 and CLK 2 in the second Tc respectively.

On the other hand, data at address 5 of the second memory 201 are inputted into the second bus 211 by way of the fourth latch 203, MUX 218, and B__I/F 210 at the timing of CLK 2 in the first Tc, while data at address 4 thereof are inputted into the second bus 211 by way of the third latch 202, MUX 218, and B__I/F 210 at the timing of CLK 1 in the second Tc. With MUX CNTL 119 and MUX CNTL 222, data at address 5 and address 4 inputted sequentially into the second bus 211 are further inputted into MUX 120, and thence into the register 121 to delay the output thereof for ½ Tc, and finally inputted into the calculator 112 by way of MUX 223 at CLK 1 and CLK 2 in the second Tc respectively.

In this way, data at odd-numbered addresses and even-numbered addresses of the first memory 101 are inputted into the first bus 111 and further into the calculator 112 at CLK 1 and CLK 2 in the second Tc and the following Tc's respectively; data at odd-numbered addresses and even-numbered addresses of the second memory 201 are inputted into the second bus 211 at CLK 1 and CLK 2 in the first and second Tc's and the following Tc's respectively, and further into the register 121 to delay the output thereof for ½ Tc, and finally into the calculator 112 at CLK 1 and CLK 2 in the second and the following Tc's respectively.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

(8-4) This is the case when the starting addresses of both the memories have even-numbers, and ADRS 113 is decremented while ADRS 213 incremented by 2 at the rising edge of CLK 1 by the unillustrated addressing unit. Particulars of the input/output signals and data-output timing hereof are shown in FIGS. 30 and 38 respectively.

Let. the starting address of the first memory 101 be address 4 and that of the second memory 201 be address 2, then the initial ADRS 113 has 4 and the initial ADRS 213 has 2 with 0-LSB's. Thus, data at address 4 of the 0-bank of the first memory 101 and those at address 2 of the 0-bank of the second memory 201, and those at the preceding address 5 of the 1-bank of the first memory 101 and the following address 3 of the 1-bank of the second memory 201 are read out in the first Tc. Then, at the timing of CLK 2 in the first Tc, the data at address 4 and address 5 of the first memory 101 are latched by the first latch 102 and second latch 103 respectively, while those at address 2 and address 3 of the second memory 201 are done so by the third latch 202 and fourth latch 203 respectively.

In the meantime, START 116 turns to 1, and the control unit 124 receives LSB's of the initial ADRS 113 and ADRS 213 having 0's, and DIR 115 having 1, and DIR 215 having 0. Then, the control unit 124 outputs MUX CNTL 117 having 1 and MUX CNTL 217 having 2 at CLK 1, and 2 and 1 at CLK 2 in every Tc; BUS CNTL 109 having 0 in the first Tc, and 1 in the second Tc and afterwards; BUS CNTL 209 having 0 at CLK 1 in the first Tc, and 2 at CLK 2 in the first Tc and afterwards. As well, it outputs MUX CNTL 119 having 1, MUX CNTL 122 having 0, and MUX CNTL 222 having 1.

Under the control of the control unit 124 with these signals, data at address 5 of the first memory 101 are inputted into neither the first bus 111 nor second bus 211; data at address 4 thereof are inputted into the first bus 111 by way of the first latch 102, MUX 118, and B__I/F 110 at the timing of CLK 1 in the second Tc, while data at address 3 thereof, which have been read out in the second Tc, are inputted into the first bus 111 by way of the second latch 103, MUX 118, and B__I/F 110 at the timing of CLK 2 in the second Tc. With MUX CNTL 122, data at address 4 and address 3 inputted sequentially into the first bus 111 are further inputted into the calculator 112 by way of MUX 123 at CLK 1 and CLK 2 in the second Tc respectively.

On the other hand, data at address 2 of the second memory 201 are inputted into the second bus 211 by way of the third latch 202, MUX 218, and B__I/F 210 at the timing of CLK 2 in the first Tc, while those at address 3 thereof are inputted into the second bus 211 by way of the fourth latch 203, MUX 218, and B__I/F 210 at the timing of CLK 1 in the second Tc. With MUX CNTL 119 and MUX CNTL 222, data at address 2 and address 3 inputted sequentially into the second bus 211 are further inputted into MUX 120, and thence into the register 121 to delay the output thereof for ½ Tc, and finally inputted into the calculator 112 by way of MUX 223 at CLK 1 and CLK 2 in the second Tc respectively.

In this way, data at even-numbered addresses and odd-numbered addresses of the first memory 101 are inputted into the first bus 111 and further into the calculator 112 at CLK 1 and CLK 2 in the first and second Tc's and the following Tc's respectively; data at the even-numbered addresses and odd-numbered addresses of the second memory 201 are inputted into the second bus 211 at CLK 2 and CLK 1 in the first Tc and the second Tc and the following Tc's respectively, and further into the register 121 to delay the output thereof for ½ Tc, and finally into the calculator 112 at CLK 1 and CLK 2 in the second and the following Tc's respectively.

As a result, unlike conventional interleaving memories, the interleaving memory of the present invention allows both the memories to output data at contiguous addresses into the calculator 112 in matching Tc's regardless of data-readout timing, thereby enabling the calculator 112 to carry out arithmetic operations sequentially twice as fast as the non-interleaving memories.

As can be seen in the above, the interleaving memory in accordance with Embodiment II has the same effects as those with Embodiment I. It is the register 121 and the control of multiplexers by the control unit 124 with its input signals that make such effects possible.

The interleaving memory for 2-way is explained as an example hereof, but the interleaving memory the present invention it not restricted to 2-way. For example, an interleaving memory for n-way delays n−1 data out of n-data read out in the same Tc for one cycle.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An interleaving memory system comprising:

first memory means consisting of a 0-bank and a 1-bank for simultaneously outputting data at even-numbered addresses from the 0-bank and data at odd-numbered addresses from the 1-bank;

first holding means for holding data from one of the banks of the first memory to delay an output of the data for ½ cycle time;

first selecting means for selecting data from one of the 0-bank of the first memory means, the 1-bank of the first memory means and the first holding means at controlled time intervals;

second memory means consisting of a 0-bank and a 1-bank for simultaneously outputting data at even-numbered addresses from the 0-bank and data at odd-numbered addresses from the 1-bank;

second holding means for holding data from one of the banks of the second memory to delay an output of the data for ½ cycle time;

second selecting means for selecting data from one of the 0-bank of the second memory means, the 1-bank of the second memory means and the second holding means at controlled time intervals; and controlling means for controlling the first selecting means to select data to be output from contiguous addresses and for controlling the second selecting means to select data to be output from contiguous addresses, wherein the first selecting means alternatively selects the 0-bank and the 1-bank when data is outputted either in an ascending order of consecutive addresses from the even-numbered addresses in the first memory means, or in a descending order of consecutive addresses from the odd-numbered addresses in the first memory means, and the first selecting means alternatively selects the first holding means and a bank whose output is not held by the first holding means when data is outputted in either a descending order of consecutive addresses from the even-numbered addresses in the first memory means or in an ascending order of consecutive addresses from the odd-numbered addresses in the first memory means; and wherein the second selecting means alternatively selects the 0-bank and the 1-bank when data is outputted either in an ascending order of consecutive addresses from the even-numbered addresses in the second memory means, or in a descending order of consecutive addresses from the odd-numbered addresses in the second memory means, and the second selecting means alternatively selects the second holding means and a bank whose output is not held by the second holding means when data is outputted either in a descending order of consecutive addresses from the even-numbered addresses in the second memory means, or in an ascending order of consecutive addresses from the odd-numbered addresses in the second memory means.

2. An interleaving memory of claim 1, wherein addresses of the first memory means are sequenced in one of an ascending direction and a descending direction, and addresses of the second memory means are sequenced in one of the ascending direction and the descending direction wherein sequencing in one of the ascending direction and descending direction is controlled by a first access direction signal and a second access direction signal.

3. An interleaving memory of claim 1, wherein the first holding means includes:

a first multiplexer circuit for selecting data from one of the 0-bank and the 1-bank of the first memory means; and a first latch circuit for latching data from the first multiplexer circuit to delay an output of the data for ½ cycle time, and wherein the second holding means includes:

a second multiplexer circuit for selecting data from one of the 0-bank and the 1-bank of the second memory means; and a second latch circuit for latching data from the second multiplexer circuit to delay an output of the data for ½ cycle time.

4. An interleaving memory of claim 3, wherein the controlling means controls the first multiplexer circuit and the second multiplexer circuit to alternately select data from the 0-banks and 1-banks in every ½ cycle time upon receiving:

LSB (least significant bit) of an address signal accessed to the first memory means when the interleaving memory starts its operation;

LSB (least significant bit) of an address signal accessed to the second memory means when the interleaving memory starts its operation;

a first access direction signal indicating that data of the first memory means are read out by being addressed in one of an ascending direction and a descending direction; and a second access direction signal indicating that data of the second memory means are read out by being addressed in one of the ascending direction and the descending direction.

5. An interleaving memory comprising:

first memory means consisting of a 0-bank and a 1-bank for simultaneously outputting data at even-numbered addresses form the 0-bank and data at odd-numbered addresses from the 1-bank;

first selecting means for selecting data from one of the 0-bank and the 1-bank of the first memory means;

second memory means consisting of a 0-bank and a 1-bank for simultaneously outputting data at even-numbered addresses from the 0-bank and data at odd-numbered addresses from the 1-bank;

second selecting means for selecting data from one of the 0-bank and the 1-bank of the second memory means;

holding means for holding data from one of the 0-bank and the 1-bank of the first memory means and the 0-bank and the 1-bank of the second memory means to delay an output of the data for ½ cycle time;

third selecting means for selecting data from two of the first selecting means, the second selecting means, and the holding means; and controlling means for controlling the third selecting means to output data of the first memory means in one of an ascending direction and a descending direction, and to output data of the second memory means in one of the ascending direction and the descending direction wherein outputting data in one of the ascending direction and the descending direction is controlled by a first access direction signal and a second access direction signal.

6. An interleaving memory of claim 5, wherein the delaying means includes:
- a first multiplexer circuit for selecting data from one of the first selecting means and the second selecting means; and
- a register circuit for holding data from the first multiplexer circuit to delay an output of the data for ½ cycle time, and wherein the third selecting means includes;
- a second multiplexer circuit for selecting data from one of the first selecting means and the register circuit; and
- a third multiplexer circuit for selecting data from one of the second selecting means and the register circuit.

7. An interleaving memory of claim 6, wherein the controlling means controls the first multiplexer circuit, the second multiplexer circuit and the third multiplexer circuit to alternately select data from the first selecting means and the second selecting means, from the first selecting means and the register circuit, and from the second selecting means and the register circuit respectively in every ½ cycle time upon receiving:
- LSB (least significant bit) of an address signal accessed to the first memory means when the interleaving memory starts its operation;
- LSB (least significant bit) of an address signal accessed to the second memory means when the interleaving memory starts its operation;
- a first access direction signal indicating that data of the first memory means are read out by being addressed in one of the ascending direction and descending direction; and
- a second access direction signal indicating that data of the second memory means are read out by being addressed in one of the ascending direction and the descending direction.

8. An interleaving memory comprising:
- first memory means which is made up of $2^n$ banks, numbered bank-1 to bank-$2^n$, for having an upper-ranking address indicated by discarding lower-rank n bits of a first address and simultaneously outputting $2^n$ pieces of data from the $2^n$ banks corresponding to the upper-ranking address;
- first holding means for holding $(2^n-1)$ bank outputs out of outputs of the $2^n$ banks in the first memory means for at least $(2^n-1)/2^n$ memory cycle time;
- first selecting means for selecting one output out of the outputs of the $2^n$ banks in the first memory means and $(2^n-1)$ held bank outputs of the first holding means at intervals of $½^n$ memory cycles, selecting $2^n$ pieces of data to be outputted in order starting from an output of a bank specified by the lower-ranked n bits of the first address;
- second memory means which is made up of $2^n$ banks, numbered bank-1 to bank-$2^n$, for having an upper-ranking address indicated by discarding lower-rank n bits of a first address and simultaneously outputting $2^n$ pieces of data from the $2^n$ banks corresponding to the upper-ranking address;
- second holding means for holding $(2^n-1)$ bank outputs out of outputs of the $2^n$ banks in the second memory means for at least $(2^n-1)/2^n$ memory cycle time;
- second selecting means for selecting one output out of the outputs of the $2^n$ banks in the second memory means and $(2^n-1)$ held bank outputs of the second holding means at intervals of $½^n$ memory cycles, selecting $2^n$ pieces of data to be outputted in order starting from an output of a bank specified by the lower-ranked n bits of the second address; and
- control means for controlling a first access direction signal indicating one of an ascending and a descending order for the first address and for controlling the first selecting means so as to select data following the first address in order starting from a bank in the first memory means which is specified by the lower-ranked n bits of the first address and, in the same way, for controlling a second access direction signal indicating one of an ascending and a descending order for the second address and for controlling the second selecting means so as to select data following the second address starting from a bank in the second memory means which is specified by the lower-ranked n bits of the second address.

* * * * *